(12) United States Patent
Wang et al.

(10) Patent No.: US 12,322,859 B2
(45) Date of Patent: Jun. 3, 2025

(54) FOLDABLE ELECTRONIC DEVICE

(71) Applicant: Huawei Technologies Co., Ltd., Shenzhen (CN)

(72) Inventors: Jikang Wang, Shanghai (CN); Zhiyuan Xie, Shanghai (CN); Hangfei Tang, Shanghai (CN); Liang Xue, Shanghai (CN); Jiaming Wang, Shanghai (CN); Dong Yu, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 18/255,698

(22) PCT Filed: Dec. 3, 2021

(86) PCT No.: PCT/CN2021/135303
§ 371 (c)(1),
(2) Date: Jun. 2, 2023

(87) PCT Pub. No.: WO2022/117069
PCT Pub. Date: Jun. 9, 2022

(65) Prior Publication Data
US 2024/0380095 A1 Nov. 14, 2024

(30) Foreign Application Priority Data
Dec. 3, 2020 (CN) .......................... 202011409265.9

(51) Int. Cl.
*H01Q 1/24* (2006.01)
*H01Q 5/328* (2015.01)
(Continued)

(52) U.S. Cl.
CPC .............. *H01Q 1/245* (2013.01); *H01Q 5/328* (2015.01); *H01Q 5/335* (2015.01); *H01Q 5/385* (2015.01); *H01Q 9/42* (2013.01); *H04M 1/0216* (2013.01)

(58) Field of Classification Search
CPC ........ H01Q 1/243; H01Q 1/244; H01Q 1/245; H01Q 5/328; H01Q 5/335; H01Q 5/385; H01Q 9/42; H04M 1/0216
See application file for complete search history.

(56) References Cited

U.S. PATENT DOCUMENTS

| 9,608,331 B1* | 3/2017 | Rowson | H01Q 9/16 |
| 11,664,579 B2* | 5/2023 | Lee | H01Q 1/44 343/702 |

(Continued)

FOREIGN PATENT DOCUMENTS

| CN | 110729550 A | 1/2020 |
| CN | 110798766 A | 2/2020 |
| CN | 111613873 A | 9/2020 |

*Primary Examiner* — Daniel Munoz
(74) *Attorney, Agent, or Firm* — Conley Rose, P.C.

(57) ABSTRACT

A foldable electronic device includes a first device body, a second device body, an earpiece, an antenna, and a first switch control circuit. The antenna includes a main radiator and a first parasitic radiator. The main radiator is disposed on the first device body, and the first parasitic radiator and the earpiece are disposed on the second device body. When the foldable electronic device is in a folded state, the main radiator is disposed relative to the first parasitic radiator at a first interval and is coupled to the first parasitic radiator through the first interval. The first switch control circuit includes a first switch component and a plurality of different first matching branches disposed in parallel connection. One end of the first switch control circuit is connected to a ground of the second device body, and the other end is connected to the first parasitic radiator.

20 Claims, 17 Drawing Sheets

(51) Int. Cl.
*H01Q 5/335* (2015.01)
*H01Q 5/385* (2015.01)
*H01Q 9/42* (2006.01)
*H04M 1/02* (2006.01)

(56) References Cited

U.S. PATENT DOCUMENTS

| | | |
|---|---|---|
| 2003/0098812 A1 | 5/2003 | Ying et al. |
| 2018/0034148 A1 | 2/2018 | Nam et al. |
| 2018/0366813 A1* | 12/2018 | Kim .................. H01Q 9/04 |
| 2020/0045422 A1 | 2/2020 | Chiang et al. |
| 2022/0123469 A1* | 4/2022 | Hsu ................... H01Q 9/42 |

* cited by examiner

FOLDABLE ELECTRONIC DEVICE

CROSS-REFERENCE TO RELATED APPLICATIONS

This is a National Stage of International Patent Application No. PCT/CN2021/135303 filed on Dec. 3, 2021, which claims priority to Chinese Patent Application No. 202011409265.9 filed on Dec. 3, 2020, both of which are hereby incorporated by reference in their entireties.

TECHNICAL FIELD

This application relates to the antenna field, and in particular, to a foldable electronic device.

BACKGROUND

To bring a more comfortable visual effect to mobile phone users, a foldable mobile phone of a new form is a current development trend of mobile phones. As radio frequency specifications of the mobile phones are increasing, a quantity of supported antennas is also increasing. However, a new form of a mobile phone makes some space of the mobile phone unavailable. Therefore, it is important to design qualified antennas with better performance within limited space. With the development of communication technologies, how to improve antenna performance in various test scenarios (such as a head-hand holding scenario, a handheld scenario, and a free space scenario) has become a major concern in the industry.

SUMMARY

Embodiments of this application provide a foldable electronic device. In a folded state, antenna performance in a free space scenario or a handheld scenario can be improved. In addition, when an antenna is disposed on a top portion of the foldable electronic device, antenna performance in a head-hand holding scenario can be improved.

An embodiment of this application provides a foldable electronic device, including a first device body, a second device body, an earpiece, and an antenna. The first device body and the second device body are connected through a rotating shaft.

The antenna includes a main radiator and a first parasitic radiator. The main radiator is disposed on the first device body and is connected to a radio frequency source of the foldable electronic device. The first parasitic radiator and the earpiece are disposed on the second device body. When the foldable electronic device is in a folded state, the main radiator is disposed relative to the first parasitic radiator at a first interval and is coupled to the first parasitic radiator through the first interval.

The foldable electronic device further includes a first switch control circuit. The first parasitic radiator is electrically connected to the ground of the second device body through the first switch control circuit. The first switch control circuit includes a first switch component and a plurality of different first matching branches disposed in parallel connection.

The first switch component switches between the plurality of different first matching branches, to adjust a resonant frequency of the first parasitic radiator.

In a case in which the foldable electronic device is in the folded state, when the earpiece is in an off state, the resonant frequency of the first parasitic radiator and a resonant frequency of the main radiator are in a first frequency band; and when the earpiece is in an on state, the resonant frequency of the main radiator is in the first frequency band, and the resonant frequency of the first parasitic radiator is in a second frequency band. The first frequency band and the second frequency band are different frequency bands.

In this solution, different first matching branches are switch tod by the first switch component, to adjust the resonant frequency of the first parasitic radiator. In a case in which the resonant frequency of the first parasitic radiator and the resonant frequency of the main radiator are in the first frequency band, when the foldable electronic device is in the folded state, radiation energy of the main radiator is coupled to the first parasitic radiator, so that the first parasitic radiator radiates a signal outward, that is, the first parasitic radiator has a parasitic radiation effect on the main radiator. In this way, a body SAR value can be reduced, and transmit power of the antenna can be increased, increasing antenna efficiency, thereby improving antenna performance in a free space scenario or a handheld scenario when the foldable electronic device is in the folded state. SAR (specific absorption rate, full name in English "Specific Absorption Rate") refers to electromagnetic power absorbed by a human body tissue per unit mass, measured in W/kg. Internationally, an SAR value is commonly used to measure a thermal effect by radiation of a foldable electronic device. The body SAR value indicates an average specific absorption rate of a body when an antenna is close to the body.

In a case in which the resonant frequency of the main radiator is in the first frequency band, and the resonant frequency of the first parasitic radiator is in the second frequency band, when the foldable electronic device is in the folded state, the radiation energy of the main radiator is coupled to the first parasitic radiator in a very low coupling degree, or even cannot be coupled to the first parasitic radiator, that is, the first parasitic radiator has a very weak parasitic radiation effect on the main radiator, or even has no parasitic radiation effect on the main radiator. In this case, the first parasitic radiator can block and isolate radiation of the main radiator of the antenna toward the first parasitic radiator. Therefore, when the antenna is located on the top portion of the foldable electronic device, in a head-hand holding scenario, a head SAR value of the antenna is reduced, and a radiation performance attenuation degree of the foldable electronic device is reduced, that is, a head-hand holding reduction amplitude is reduced, thereby improving radiation performance of the foldable electronic device in the head-hand holding scenario, that is, improving antenna performance in the head-hand holding scenario when the foldable electronic device is in the folded state. The head SAR value indicates an average specific absorption rate of a body when an antenna is close to the head.

In some possible embodiments, both the main radiator and the first parasitic radiator are in a strip shape; and the main radiator and the first parasitic radiator are disposed relative to each other in a side direction at a first interval.

In some possible embodiments, one end of the first switch component forms a first end of the first switch control circuit, the other end of the first switch component switches to and is connected to an end of a plurality of different first matching branches, and other ends of the plurality of different first matching branches jointly form a second end of the first switch control circuit.

In some possible embodiments, the first switch component switches between the plurality of different first matching branches, to adjust the resonant frequency of the first parasitic radiator, so that the resonant frequency of the first parasitic radiator is close to or far away from the resonant frequency of the main radiator.

In a case in which the foldable electronic device is in the folded state, when the earpiece is in the off state, the resonant frequency of the first parasitic radiator is close to the resonant frequency of the main radiator; and when the earpiece is in the on state, the resonant frequency of the first parasitic radiator is far away from the resonant frequency of the main radiator.

In some embodiments, the plurality of different first matching branches include a first matching sub-branch and a second matching sub-branch, and each of the first matching sub-branch and the second matching sub-branch includes a 0-ohm resistor, an inductor, or a capacitor.

In some embodiments, the first matching sub-branch includes the 0-ohm resistor, and the second matching sub-branch includes the inductor.

When the first switch component switches to the first matching sub-branch, the resonant frequency of the first parasitic radiator is in the second frequency band.

When the first switch component switches to another first matching branch, the resonant frequency of the first parasitic radiator is in the first frequency band.

In this solution, when the first switch component switches to the first matching sub-branch including the 0-ohm resistor, the first parasitic radiator has no parasitic radiation effect on the main radiator, and the first parasitic radiator can block and isolate radiation of the main radiator of the antenna toward the first parasitic radiator. Therefore, when the antenna is located on the top portion of the foldable electronic device, in a head-hand holding scenario, a head SAR value of the antenna is reduced, and a radiation performance attenuation degree of the foldable electronic device is reduced, that is, a head-hand holding reduction amplitude is reduced, thereby improving radiation performance of the foldable electronic device in the head-hand holding scenario.

When the first switch component switches to the second matching sub-branch including the inductor, the first parasitic radiator has a parasitic radiation effect on the main radiator In this way, a body SAR value can be reduced, so that antenna efficiency is increased, and transmit power of the antenna is improved, thereby improving antenna performance in a free space scenario or a handheld scenario when the foldable electronic device is in the folded state.

In some possible embodiments, a trigger signal for switching, by the first switch component, from the second matching sub-branch including the inductor to the first matching sub-branch including the 0-ohm resistor may be triggered by transferring, to the processing apparatus, a signal indicating that the earpiece on the second device body is on (or the earpiece emits sound), or may be triggered by transferring, to the processing apparatus, a signal detected by an optical proximity sensor disposed on the second device body.

In some embodiments, the main radiator has a first end and a second end, the first parasitic radiator has a first end and a second end, and when the foldable electronic device is in the folded state, the first end of the main radiator and the first end of the first parasitic radiator are correspondingly disposed, and the second end of the main radiator and the second end of the first parasitic radiator are correspondingly disposed.

The second end of the main radiator is connected to the ground of the first device body, the main radiator has a feed point, the feed point is located at a position close to the first end of the main radiator, and the feed point is connected to the radio frequency source.

The second end of the first parasitic radiator is connected to the ground of the second device body, the first parasitic radiator has a first connection point, the first connection point is located at a position close to the first end of the first parasitic radiator, and the first connection point is connected to the first switch control circuit.

In some embodiments, a distance between the feed point and the first end of the main radiator is 1.5 mm to 3 mm; and/or a distance between the first connection point and the first end of the first parasitic radiator is 1.5 mm to 3 mm. In this way, a coupling requirement between the main radiator and the first parasitic radiator can be better satisfied.

In some possible embodiments, a distance of the first interval is 2 mm to 4 mm. In this way, coupling strength between the main radiator and the first parasitic radiator can be ensured.

In some possible embodiments, the resonant frequency of the main radiator is associated with a length of the main radiator. The resonant frequency of the first parasitic radiator is associated with a length of the first parasitic radiator. As the length of the main radiator changes, the resonant frequency of the main radiator changes. As the length of the first parasitic radiator changes, the resonant frequency of the first parasitic radiator changes. Therefore, proper lengths of the main radiator and the first parasitic radiator can be selected based on an operating frequency band requirement.

In some embodiments, the foldable electronic device further includes a main switch control circuit. The main switch control circuit includes a main switch component and a plurality of different main matching branches disposed in parallel connection. One end of the main switch component forms one end of the main switch control circuit, the other end may separately switch to and be connected to an end of the plurality of different main matching branches, and other ends of the plurality of different main matching branches jointly form the other end of the main switch control circuit.

One end of the main switch control circuit is connected to the ground of the first device body, and the other end is connected between the radio frequency source and the feed point of the main radiator. Alternatively, one end of the main switch control circuit is connected between the radio frequency source and the feed point of the main radiator, and the other end is connected to the ground of the first device body. The main switch component switches to one of the plurality of different main matching branches, to adjust the resonant frequency of the main radiator.

As the main switch component switches between the plurality of different main matching branches, the resonant frequency of the main radiator can be adjusted, so that the antenna can cover different frequency bands.

In some embodiments, each of two main matching branches of the plurality of different main matching branches includes an inductor, and inductance values of the inductors on the two main matching branches are different.

In some embodiments, both the main radiator and the first parasitic radiator are in a straight strip shape; and/or
  when the foldable electronic device is in the folded state, the main radiator and the first parasitic radiator are disposed in parallel connection; and/or
  when the foldable electronic device is in the folded state, the first end of the main radiator is aligned with the first end of the first parasitic radiator, and the second end of the main radiator is aligned with the second end of the first parasitic radiator.

In some embodiments, the antenna further includes a second parasitic radiator, the second parasitic radiator is disposed on the first device body, the second parasitic radiator and the main radiator are disposed at an interval in a longitudinal end-to-end manner, the second parasitic radiator has a first end and a second end, the first end of the second parasitic radiator and the first end of the main radiator are relatively close, and have a first gap, the second parasitic radiator is coupled to the main radiator through the first gap, and the second end of the second parasitic radiator and the second end of the main radiator are relatively far away from each other, and are connected to the ground of the first device body.

In this solution, the second parasitic radiator is coupled to the main radiator through the first gap, so that a body SAR value can be further reduced, and antenna efficiency can be improved, thereby improving transmit power of the antenna.

In some possible embodiments, the second parasitic radiator is in a strip shape.

In some embodiments, the second parasitic radiator has a second connection point, and the second connection point is located at a position close to the first end of the second parasitic radiator.

The foldable electronic device further includes a second switch control circuit. The second switch control circuit includes a second switch component and a plurality of different second matching branches disposed in parallel connection. One end of the second switch component forms one end of the second switch control circuit, the other end may separately switch to and be connected to an end of the plurality of different second matching branches, and other ends of the plurality of different second matching branches jointly form the other end of the second switch control circuit.

One end of the second switch control circuit is connected to the ground of the first device body, and the other end is connected to the second connection point of the second parasitic radiator. Alternatively, one end of the second switch control circuit is connected to the second connection point of the second parasitic radiator, and the other end is connected to the ground of the first device body. The second switch component switches between the plurality of different second matching branches, to adjust the resonant frequency of the second parasitic radiator.

As the second switch component switches between the plurality of different second matching branches, the resonant frequency of the second parasitic radiator can be adjusted, so that the antenna can cover different frequency bands.

In some embodiments, each of two second matching branches of the plurality of different second matching branches includes an inductor, and inductance values of the inductors on the two second matching branches are different.

In some embodiments, a distance between the second connection point and the first end of the second parasitic radiator is 1.5 mm to 3 mm. In this way, a coupling requirement between the main radiator and the second parasitic radiator can be better satisfied.

In some embodiments, the second parasitic radiator is in a straight strip shape, and/or
the main radiator and the second parasitic radiator are arranged in a straight line.

In some embodiments, the antenna further includes a third parasitic radiator, the third parasitic radiator is disposed on the second device body, the third parasitic radiator and the first parasitic radiator are disposed at an interval in a longitudinal end-to-end manner, the third parasitic radiator has a first end and a second end, the first end of the third parasitic radiator and the first end of the first parasitic radiator are relatively close, and have a second gap, and the second end of the third parasitic radiator and the second end of the first parasitic radiator are relatively far away from each other, and are connected to the ground of the second device body; the third parasitic radiator has a third connection point, and the third connection point is located at a position close to the first end of the third parasitic radiator; and when the foldable electronic device is in the folded state, the third parasitic radiator is disposed relative to the second parasitic radiator at a second interval and is coupled to the second parasitic radiator through the second interval, the third parasitic radiator is coupled to the first parasitic radiator through the second gap, and the third parasitic radiator is further coupled to the main radiator.

The foldable electronic device further includes a third switch control circuit, the third connection point of the third parasitic radiator is electrically connected to the ground of the second device body through the third switch control circuit, the third switch control circuit includes a third switch component and a plurality of different third matching branches disposed in parallel connection, and the third switch component switches between the plurality of different third matching branches, to adjust a resonant frequency of the third parasitic radiator.

Based on the foldable electronic device in the folded state, when the earpiece is in the off state, the resonant frequency of the third parasitic radiator is in the first frequency band; and when the earpiece is in the on state, the resonant frequency of the third parasitic radiator is in the second frequency band.

In this solution, different third matching branches are switch tod by the third switch component, to adjust a parasitic radiation effect of the third parasitic radiator. When the third switch component switches to one of the third matching branches, the third parasitic radiator has a very weak parasitic radiation effect on the main radiator, or even has no parasitic radiation effect on the main radiator. In this case, the third parasitic radiator can block and isolate radiation of the main radiator and second parasitic radiator of the antenna toward the third parasitic radiator. Therefore, when the antenna is located on the top portion of the foldable electronic device, in a head-hand holding scenario, a head SAR value of the antenna is reduced, and a radiation performance attenuation degree of the foldable electronic device is reduced, that is, a head-hand holding reduction amplitude is reduced, thereby improving radiation performance of the foldable electronic device in the head-hand holding scenario.

When the third switch component switches to another third matching branch, the third parasitic radiator has a parasitic radiation effect on the main radiator. In this way, a body SAR value can be reduced, and antenna efficiency can be improved, improving transmit power of the antenna, thereby improving antenna performance in a free space scenario or a handheld scenario when the foldable electronic device is in the folded state.

In some possible embodiments, the third parasitic radiator is in a strip shape; and when the foldable electronic device is in the folded state, the third parasitic radiator and the second parasitic radiator are disposed relative to each other side-to-side at the second interval.

In some possible embodiments, one end of the third switch component forms one end of the third switch control circuit, the other end may separately switch to and be connected to an end of a plurality of different third matching branches, and other ends of the plurality of different third matching branches jointly form the other end of the third switch control circuit.

One end of the third switch control circuit is connected to the ground of the second device body, and the other end is connected to the third connection point of the third parasitic radiator. Alternatively, one end of the third switch control circuit is connected to the third connection point of the third parasitic radiator, and the other end is connected to the ground of the second device body.

In some possible embodiments, the third switch component switches to one of the plurality of different third matching branches, to adjust the resonant frequency of the third parasitic radiator, so that the resonant frequency of the third parasitic radiator is close to or far away from the resonant frequency of the main radiator.

When the earpiece is in the off state, the resonant frequency of the third parasitic radiator is close to the resonant frequency of the main radiator. When the earpiece is in the on state, the resonant frequency of the third parasitic radiator is far away from the resonant frequency of the main radiator.

In some embodiments, the plurality of different third matching branches include a third matching sub-branch and a fourth matching sub-branch, the third matching sub-branch includes a 0-ohm resistor, and the fourth matching sub-branch includes an inductor.

When the third switch component switches to the third matching sub-branch, the resonant frequency of the third parasitic radiator is in the second frequency band.

When the third switch component switches to the fourth matching sub-branch, the resonant frequency of the third parasitic radiator is in the first frequency band.

In this solution, when the third switch component switches to the third matching sub-branch including the 0-ohm resistor, the third parasitic radiator has no parasitic radiation effect on the main radiator. When the third switch component switches to the fourth matching sub-branch including the inductor, the third parasitic radiator has a parasitic radiation effect on the main radiator.

In some embodiments, a distance between the third connection point and the first end of the third parasitic radiator is 1.5 mm to 3 mm. In this way, a coupling requirement between the main radiator and the third parasitic radiator can be better satisfied.

In some embodiments, the third parasitic radiator is in a straight strip shape; and/or
  the third parasitic radiator and the first parasitic radiator are arranged in a straight line; and when the foldable electronic device is in the folded state, the third parasitic radiator and the second parasitic radiator are disposed in parallel connection; and/or
  when the foldable electronic device is in the folded state, the first end of the third parasitic radiator is aligned with the first end of the second parasitic radiator, and the second end of the third parasitic radiator is aligned with the second end of the second parasitic radiator.

In some embodiments, when the foldable electronic device is in the folded state, the antenna is located at a top portion, or a bottom portion, or a side portion far away from the rotating shaft, of the foldable electronic device.

In some possible embodiments, the main radiator, the first parasitic radiator, the second parasitic radiator, and the third parasitic radiator may be formed by using a metal frame of the foldable electronic device, a metal sheet (for example, a steel sheet), or a flexible printed circuit (Flexible Printed Circuit, FPC for short), or may be formed in a form of LDS (Laser Direct Structuring, laser direct structuring).

In some possible embodiments, the first device body is a device body on a side on which a primary screen of the foldable electronic device is located, and the second device body is a device body on a side on which a secondary screen of the foldable electronic device is located.

In some embodiments, the antenna is formed by using a metal frame on the top portion of the foldable electronic device, and the earpiece is located on the top portion of the foldable electronic device.

In some embodiments, the foldable electronic device further includes a processing apparatus, and the foldable electronic device is in the folded state.

When the earpiece is on and generates a first trigger signal, the processing apparatus controls, in response to the first trigger signal, the first switch component to switch to the first matching sub-branch in the plurality of different first matching branches, so that the resonant frequency of the first parasitic radiator is in the second frequency band.

When the earpiece is off and generates a second trigger signal, the processing apparatus controls, in response to the second trigger signal, the first switch component to switch to the second matching sub-branch in the plurality of different first matching branches, so that the resonant frequency of the first parasitic radiator is in the first frequency band.

In some embodiments, the foldable electronic device further includes a trigger apparatus and a processing apparatus; and the foldable electronic device is in the folded state.

When the trigger apparatus generates a first trigger signal, the processing apparatus controls, in response to the first trigger signal, the first switch component to switch to the first matching sub-branch in the plurality of different first matching branches, so that the resonant frequency of the first parasitic radiator is in the second frequency band.

When the trigger apparatus generates a second trigger signal, the processing apparatus controls, in response to the second trigger signal, the first switch component to switch to the second matching sub-branch in the plurality of different first matching branches, so that the resonant frequency of the first parasitic radiator is in the first frequency band.

In some embodiments, the trigger apparatus is an optical proximity sensor, an ambient light sensor, or a distance sensor, where when the trigger apparatus is blocked by a user body, the trigger apparatus generates the first trigger signal, and when the trigger apparatus is far away from the user body, the trigger apparatus generates the second trigger signal.

An embodiment of this application further provides a foldable electronic device, including a first device body, a second device body, an earpiece, and an antenna. The first device body and the second device body are rotatably connected through a rotating shaft, so that the foldable electronic device can switch between an unfolded state and a folded state.

The antenna includes a main radiator, a first parasitic radiator, a second parasitic radiator, and an isolating portion. The main radiator and the first parasitic radiator are disposed on the first device body. The second parasitic radiator, the isolating portion, and the earpiece are disposed on the second device body. The main radiator is connected to a radio frequency source of the foldable electronic device.

The main radiator, the first parasitic radiator, the second parasitic radiator, and the isolating portion are all in a strip shape and have a first end and a second end.

The main radiator and the first parasitic radiator are disposed at an interval in a longitudinal end-to-end manner. The first end of the main radiator is connected to the ground of the first device body. The second end of the main radiator and the first end of the first parasitic radiator are relatively close, and have a gap. The main radiator is coupled to the first parasitic radiator through the gap. The second end of the first parasitic radiator and the first end of the main radiator are relatively far away from each other, and are connected to the ground of the first device body.

The isolating portion and the second parasitic radiator are arranged in a straight line. The first end and the second end of the isolating portion are respectively connected to the ground of the second device body. The second end of the isolating portion is connected to the first end of the second parasitic radiator, and the second end of the second parasitic radiator is a free end.

When the foldable electronic device is in the folded state, the isolating portion is disposed relative to the main radiator and the first parasitic radiator respectively in a side direction at an interval. In a length direction of the first parasitic radiator, the first end of the second parasitic radiator is located between the second end and the first end of the first parasitic radiator, and is close to the second end of the first parasitic radiator, or the first end of the second parasitic radiator is flush with the second end of the first parasitic radiator, and the second parasitic radiator is coupled to the first parasitic radiator.

In this solution, the isolating portion can block and isolate radiation of the main radiator and the first parasitic radiator of the antenna toward the isolating portion. Therefore, when the antenna is located on the top portion of the foldable electronic device, in a head-hand holding scenario, a head SAR value of the antenna is reduced, and a radiation performance attenuation degree of the foldable electronic device is reduced, that is, a head-hand holding reduction amplitude is reduced, thereby improving radiation performance of the foldable electronic device in the head-hand holding scenario. In other words, antenna performance in the head-hand holding scenario when the foldable electronic device is in the folded state is improved.

In addition, the first parasitic radiator is coupled to the main radiator, and the second parasitic radiator is coupled to the first parasitic radiator, so that a body SAR value is reduced, and antenna efficiency is improved, increasing transmit power of the antenna, thereby improving antenna performance in a free space scenario or a handheld scenario when the foldable electronic device is in the folded state.

In some embodiments, in a length direction of the first parasitic radiator, a distance between the first end of the second parasitic radiator and the second end of the first parasitic radiator is greater than or equal to 0 mm, and is less than or equal to 2 mm. In this way, a coupling requirement between the second parasitic radiator and the first parasitic radiator can be better satisfied.

In some embodiments, the first parasitic radiator has a first connection point, and the first connection point is located at a position close to the first end of the first parasitic radiator. The foldable electronic device further includes a first switch control circuit. The first switch control circuit includes a first switch component and a plurality of different first matching branches disposed in parallel connection. One end of the first switch component forms one end of the first switch control circuit, the other end switches to and is connected to an end of the plurality of different first matching branches, and other ends of the plurality of different first matching branches jointly form the other end of the first switch control circuit.

One end of the first switch control circuit is connected to the ground of the first device body, and the other end is connected to the first connection point of the first parasitic radiator. Alternatively, one end of the first switch control circuit is connected to the first connection point of the first parasitic radiator, and the other end is connected to the ground of the first device body.

The first switch component switches to one of the plurality of different first matching branches, to adjust the resonant frequency of the first parasitic radiator. In this way, the antenna can cover different frequency bands.

In some embodiments, each of two second matching branches of the plurality of different first matching branches includes an inductor, and inductance values of the inductors of the two first matching branches are different.

In some embodiments, a distance between the first connection point and the first end of the first parasitic radiator is 1.5 mm to 3 mm. In this way, a coupling requirement between the main radiator and the first parasitic radiator can be better satisfied.

In some embodiments, the second parasitic radiator has a second connection point, and the second connection point is located at a position close to the second end of the second parasitic radiator.

The foldable electronic device further includes a second switch control circuit. The second switch control circuit includes a second switch component and a plurality of different second matching branches disposed in parallel connection. One end of the second switch component forms one end of the second switch control circuit, the other end switches to and is connected to an end of the plurality of different second matching branches, and other ends of the plurality of different second matching branches jointly form the other end of the second switch control circuit.

One end of the second switch control circuit is connected to the ground of the second device body, and the other end is connected to the second connection point of the second parasitic radiator. Alternatively, one end of the second switch control circuit is connected to the second connection point of the second parasitic radiator, and the other end is connected to the ground of the second device body. The second switch component switches to one of the plurality of different second matching branches, to adjust the resonant frequency of the second parasitic radiator.

In this solution, the second switch component switches to different second matching branches, to adjust a parasitic radiation effect of the second parasitic radiator. When the second switch component switches to another second matching branch, the second parasitic radiator has a parasitic radiation effect on the main radiator. In this way, a body SAR value can be reduced, and antenna efficiency can be improved, improving transmit power of the antenna, thereby improving antenna performance in a free space scenario or a handheld scenario when the foldable electronic device is in the folded state.

When the second switch component switches to one of the second matching branches, the second parasitic radiator has a very weak parasitic radiation effect on the main radiator, or even has no parasitic radiation effect on the main radiator. In this case, the second parasitic radiator can block and isolate radiation of the main radiator and the first parasitic radiator of the antenna toward the second parasitic radiator. Therefore, when the antenna is located on the top portion of the foldable electronic device, in a head-hand holding scenario, a head SAR value of the antenna is reduced, and a radiation performance attenuation degree of the foldable electronic device is reduced, that is, a head-hand holding reduction amplitude is reduced, thereby improving radiation performance of the foldable electronic device in the head-hand holding scenario.

In some embodiments, two second matching branches of the plurality of different second matching branches respectively include a 0-ohm resistor and an inductor.

In this solution, when the second switch component switches to the second matching branch including the 0-ohm resistor, the second parasitic radiator has no parasitic radiation effect on the main radiator. When the second switch component switches to the second matching branch including the inductor, the second parasitic radiator has a parasitic radiation effect on the main radiator.

In some embodiments, a distance between the second connection point and the second end of the second parasitic radiator is 1.5 mm to 3 mm. In this way, a coupling requirement between the main radiator and the third parasitic radiator can be better satisfied.

In some embodiments, the main radiator has a feed point, the feed point is located at a position close to the second end of the main radiator, and the feed point is connected to the radio frequency source.

The foldable electronic device further includes a main switch control circuit. The main switch control circuit includes a main switch component and a plurality of different main matching branches disposed in parallel connection. One end of the main switch component forms one end of the main switch control circuit, the other end may separately switch to and be connected to an end of the plurality of different main matching branches, and other ends of the plurality of different main matching branches jointly form the other end of the main switch control circuit.

One end of the main switch control circuit is connected to the ground of the first device body, and the other end is connected between the radio frequency source and the feed point of the main radiator. Alternatively, one end of the main switch control circuit is connected between the radio frequency source and the feed point of the main radiator, and the other end is connected to the ground of the first device body. The main switch component switches to one of the plurality of different main matching branches, to adjust the resonant frequency of the main radiator. In this way, the antenna can cover different frequency bands.

In some embodiments, each of two main matching branches of the plurality of different main matching branches includes an inductor, and inductance values of the inductors of the two main matching branches are different.

In some embodiments, a distance between the feed point and the second end of the main radiator is 1.5 mm to 3 mm. In this way, a coupling requirement between the main radiator and the first parasitic radiator can be better satisfied.

In some embodiments, the main radiator, the first parasitic radiator, the second parasitic radiator, and the isolating portion are all in a straight strip shape; and/or
   the main radiator and the first parasitic radiator are arranged in a straight line, when the foldable electronic device is in the folded state, the isolating portion is disposed in parallel with the main radiator and the first parasitic radiator respectively, and the second parasitic radiator is disposed in parallel with the first parasitic radiator; and/or
   when the foldable electronic device is in the folded state, the first end of the isolating portion is aligned with the first end of the main radiator.

In some embodiments, when the foldable electronic device is in the folded state, the antenna is located at a top portion, or a bottom portion, or a side portion far away from the rotating shaft, of the foldable electronic device.

In some possible embodiments, the main radiator, the first parasitic radiator, the second parasitic radiator, and the isolating portion may be formed by using a metal frame of the foldable electronic device, a metal sheet (for example, a steel sheet), or a flexible printed circuit (Flexible Printed Circuit, FPC for short), or may be formed in a form of LDS (Laser Direct Structuring, laser direct structuring).

In some possible embodiments, the first device body is a device body on a side on which a primary screen of the foldable electronic device is located, and the second device body is a device body on a side on which a secondary screen of the foldable electronic device is located.

Figure 13:
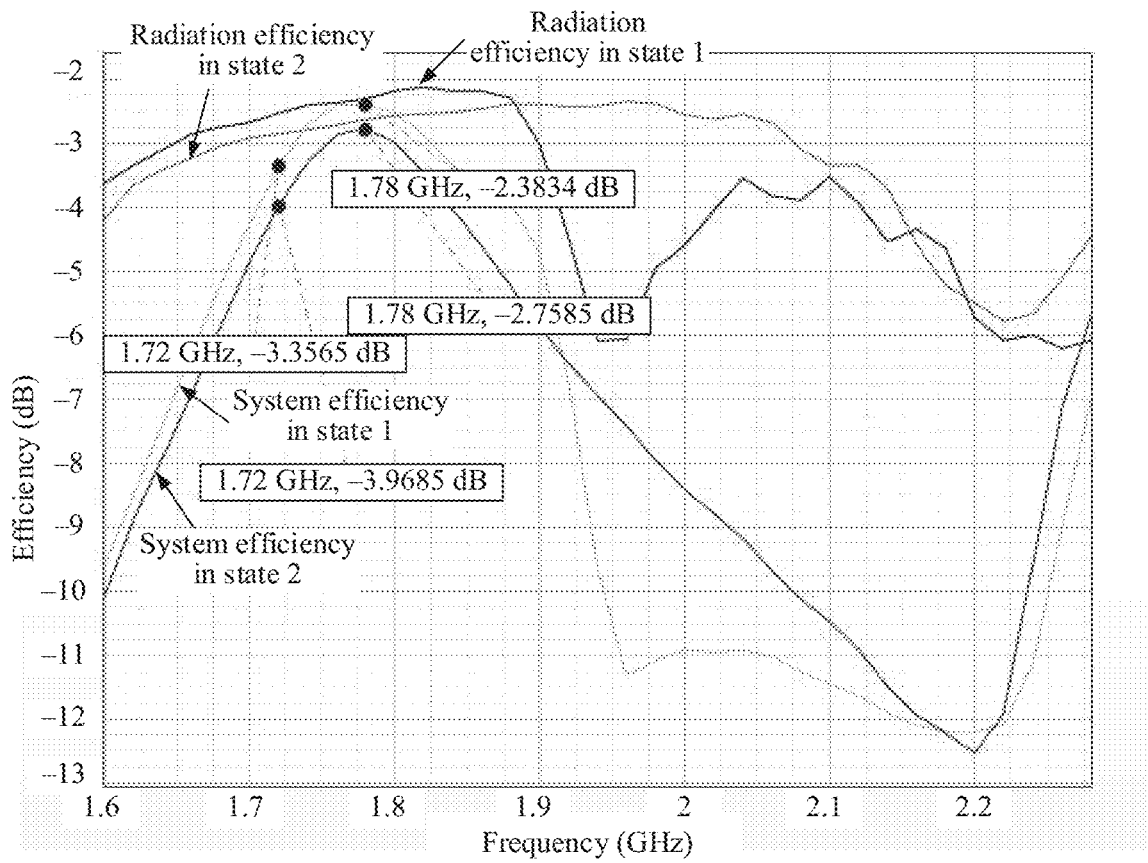
Figure 14A:
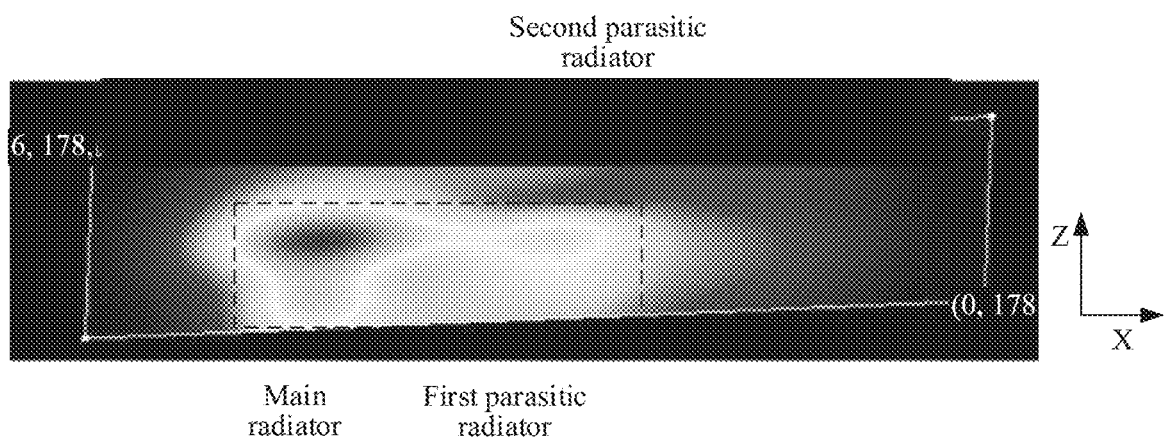
Figure 14B:
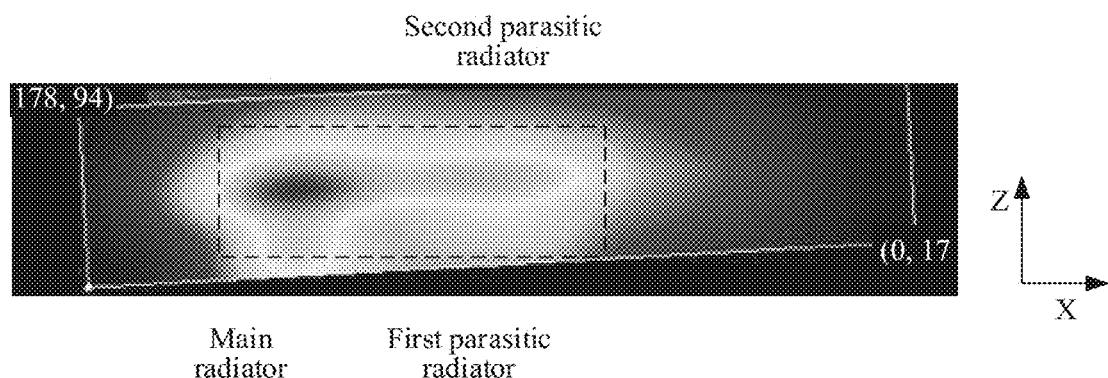
Figure 15A:
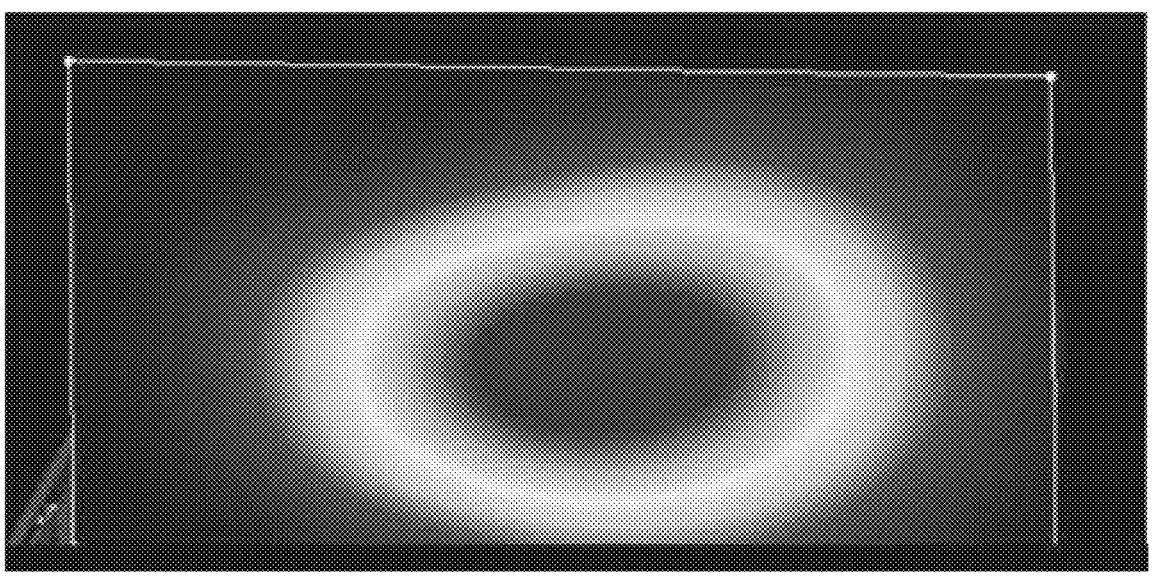
Figure 15B:
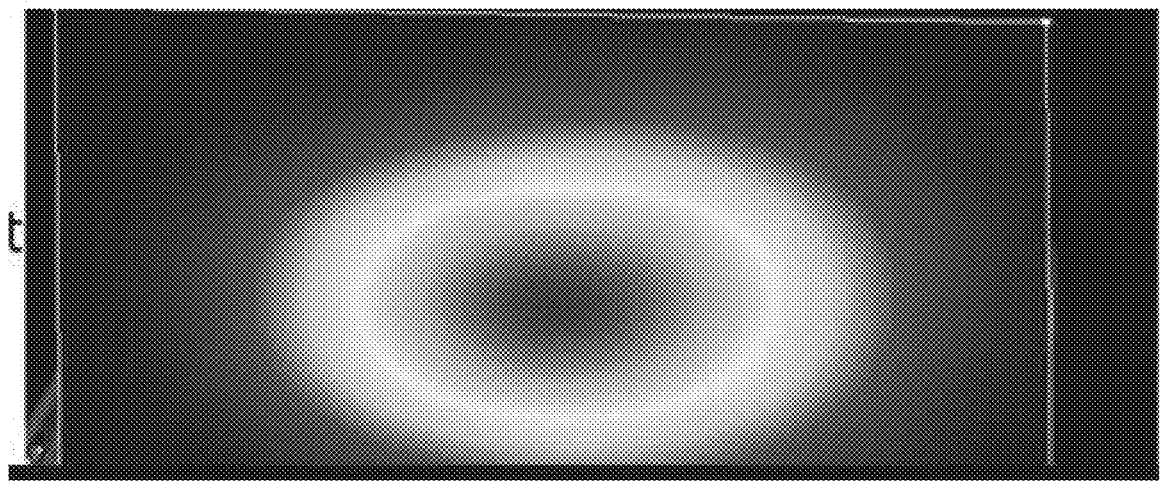
Figure 16:
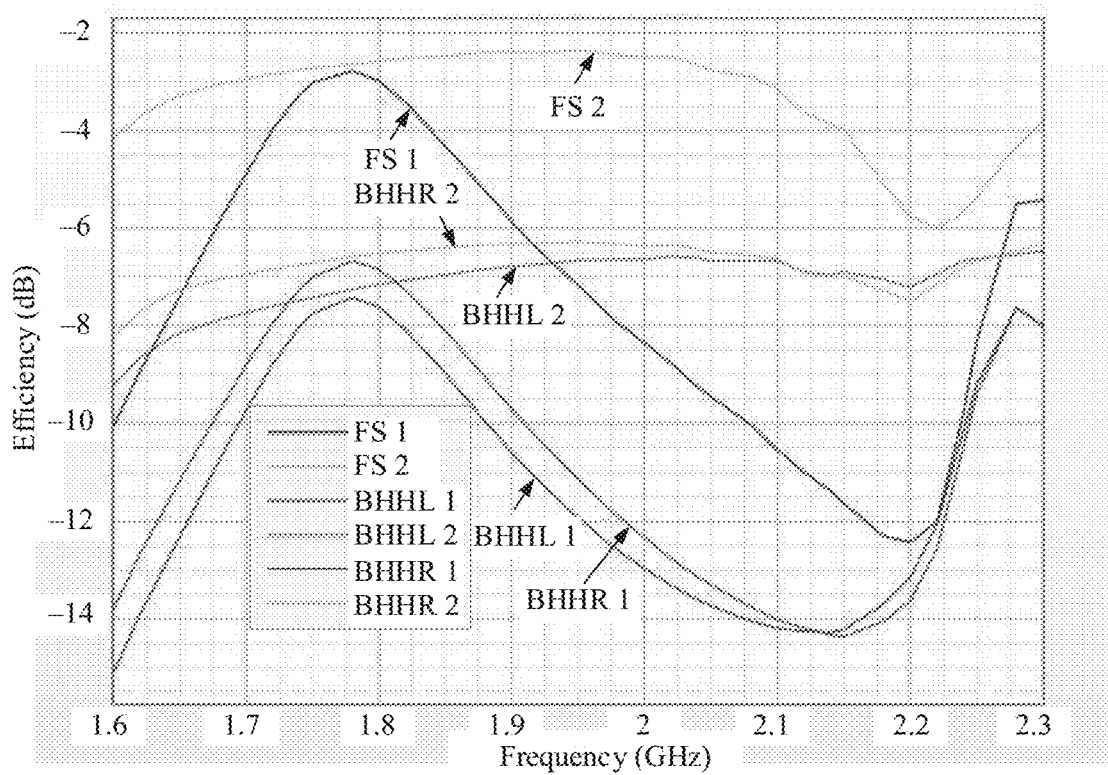

FIG. 13 is an effect curve graph of comparison between radiation efficiency and system efficiency (namely, efficiency) of an antenna in a state 1 and a state 2 obtained when a simulation effect test is performed on a foldable electronic device according to Embodiment 2 of this application;

FIG. 14a and FIG. 14b are distribution diagrams of local magnetic fields of an antenna in a state 1 and a state 2 obtained when a simulation effect test is performed on a foldable electronic device according to Embodiment 2 of this application;

FIG. 15a and FIG. 15b are distribution diagrams of antenna hotspots in a state 1 and a state 2 obtained when a simulation effect test is performed on a foldable electronic device according to Embodiment 2 of this application; and FIG. 16 is an effect curve graph of comparison between radiation efficiency and system efficiency (namely, efficiency) of an antenna in a free space scenario, a head-left hand holding scenario, and a head-right hand holding scenario obtained when a simulation effect test is performed on a foldable electronic device according to Embodiment 2 of this application.

DESCRIPTIONS OF REFERENCE NUMERALS

Embodiment 1

100: foldable electronic device;
200: first device body; 201: ground plate; 202: mainboard; 220: second device body;
221: ground plate; 222: mainboard; 240: rotating shaft; 260: radio frequency source;
400: antenna;
410: main radiator; 411: first end; 412: second end; 413: feed point;
420: first parasitic radiator; 421: first end; 422: second end; 423: first connection point;
430: second parasitic radiator; 431: first end; 432: second end; 433: second connection point;
440: third parasitic radiator; 441: first end; 442: second end; 443: third connection point;
450: first interval;
460: second interval;
470: first gap;
480: second gap;
500: main switch control circuit; 510: main switch component; 520: one main matching branch; L01: inductor; 530: another main matching branch; L02: inductor; 540: one end of the main switch control circuit; 550: the other end of the main switch control circuit;
600: first switch control circuit; 610: first switch component; 620: one first matching branch; 630: another matching branch; L1: inductor; 640: one end of the first switch control circuit; 650: the other end of the first switch control circuit;
700: second switch control circuit; 710: second switch component; 720: one second matching branch; L21: inductor; 730: another second matching branch; L22: inductor; 740: one end of the second switch control circuit; 750: the other end of the second switch control circuit;
800: third switch control circuit; 810: third switch component; 820: one third matching branch; 830: another third matching branch; L3: inductor; 840: one end of the third switch control circuit; 850: the other end of the third switch control circuit;
L: length of the main radiator;
L1: length of the first parasitic radiator;
L2: length of the second parasitic radiator;
L3: length of the third parasitic radiator;
d1: distance of the first interval;
d2: distance of the second interval;
d3: width of the first gap;
d4: width of the second gap;
d5: distance between the feed point and the first end of the main radiator;
d6: distance between the first connection point and the first end of the first parasitic radiator;
d7 distance between the second connection point and the first end of the second parasitic radiator; and
d8: distance between the third connection point and the first end of the third parasitic radiator.

Embodiment 2

260A: radio frequency source;
400A: antenna;
410A: main radiator; 411A: first end; 412A: second end; 413A: feed point;
420A: first parasitic radiator; 421A: first end; 422A: second end; 423A: first connection point;
430A: second parasitic radiator; 431A: first end; 432A: second end; 433A: second connection point;
440A: isolating portion; 441A: first end; 442A: second end;
470A: gap;
500A: main switch control circuit; 510A: main switch component; 520A: one main matching branch; L01: inductor; 530A: another main matching branch; L02: inductor; 540A: one end of the main switch control circuit; 550 the other end of the main switch control circuit;
600A: first switch control circuit; 610A: first switch component; 620A: one first matching branch; L11: inductor; 630A: another first matching branch; L12: inductor; 640A: one end of the first switch control circuit; 650A: the other end of the first switch control circuit;
700A: second switch control circuit; 710A: second switch component; 720A: one second matching branch; 730A: another second matching branch; L2: inductor; 740A: one end of the second switch control circuit; 750A: the other end of the second switch control circuit;
L: length of the main radiator;
L1: length of the first parasitic radiator;
L2: length of the second parasitic radiator;
L3: length of the isolating portion;
d1; distance between the first parasitic radiator and the isolating portion;
d2: width of the gap,
d3: distance between the feed point and the second end of the main radiator;
d4: distance between the first connection point and the first end of the first parasitic radiator; and
d5: distance between the second connection point and the second end of the second parasitic radiator.

DESCRIPTION OF EMBODIMENTS

The following describes implementations of this application by using specific embodiments. A person skilled in the art may easily learn of other advantages and effects of this application based on content disclosed in this specification. Although this application is described with reference to some embodiments, it does not mean that a characteristic of this application is limited only to this implementation. On the contrary, a purpose of describing this application with reference to an implementation is to cover another option or modification that may be derived based on claims of this application. To provide an in-depth understanding of this application, the following descriptions include a plurality of specific details. This application may be alternatively implemented without using these details. In addition, to avoid confusion or blurring a focus of this application, some specific details are omitted from the description. It is to be noted that embodiments in this application and features in embodiments may be mutually combined in the case of no conflict.

It should be noted that, in this specification, similar reference numerals and letters in the following accompanying drawings represent similar items. Therefore, once an item is defined in an accompanying drawing, the item does not need to be further defined or interpreted in the following accompanying drawings.

In descriptions of this application, it is to be noted that orientation or location relationships indicated by terms "center", "above", "below", "left", "right", "vertical", "horizontal", "inner", "outer", and the like are orientation or location relationships based on the accompanying drawings, and are merely intended for conveniently describing this application and simplifying descriptions, rather than indicating or implying that an apparatus or an element in question needs to have a specific orientation or needs to be constructed and operated in a specific orientation, and therefore cannot be construed as a limitation on this application. In addition, terms "first" and "second" are merely used for a purpose of description, and shall not be understood as an indication or implication of relative importance.

In descriptions of this application, it is to be noted that unless otherwise expressly specified and limited, terms "mount", "interconnect", and "connect" should be understood in a broad sense. For example, the terms may indicate a fixed connection, a detachable connection, or an integral connection; may be a mechanical connection or an electrical connection; or may be direct interconnection, indirect interconnection through an intermediate medium, or communication between the interior of two elements. A person of ordinary skill in the art may understand specific meanings of the foregoing terms in this application based on a specific situation.

To make the objectives, technical solutions, and advantages of this application clearer, the following further describes implementations of this application in detail with reference to the accompanying drawings.

Embodiment 1

Figure 1:
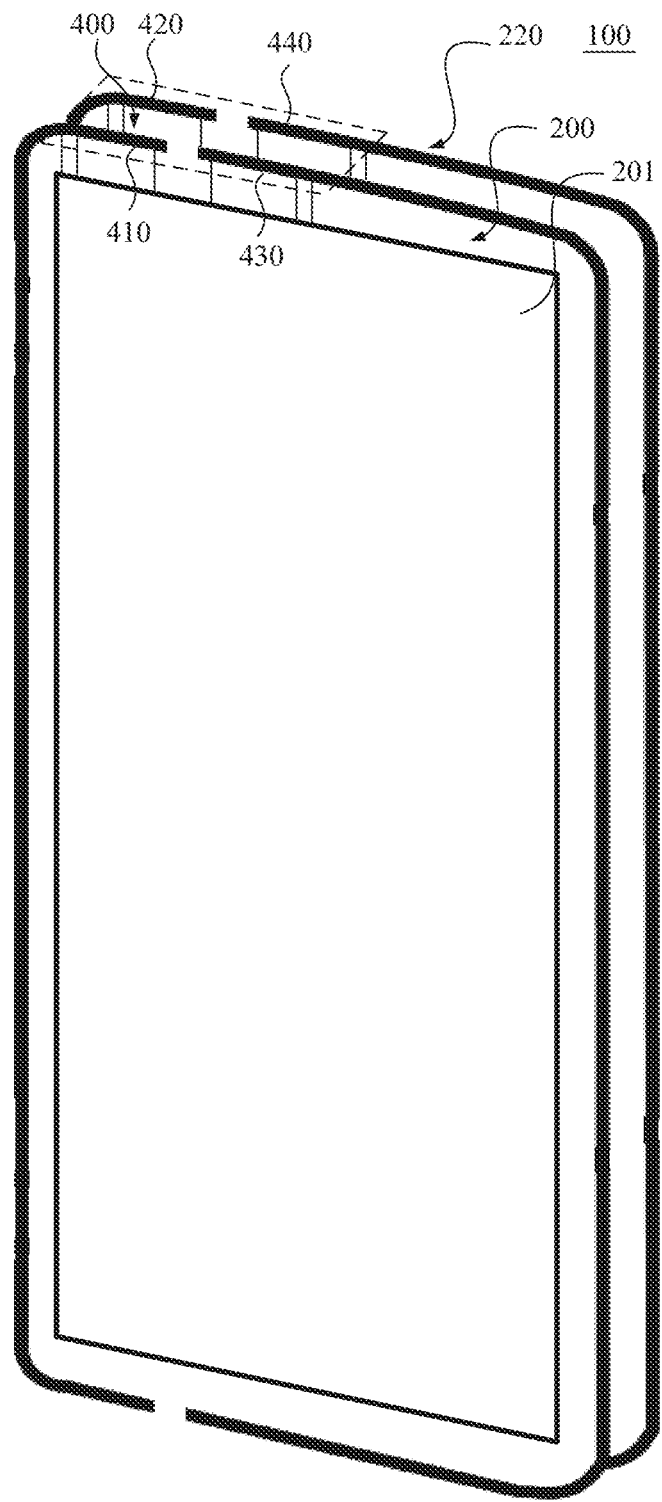
FIG. 1 is a schematic three-dimensional diagram of a structure of a foldable electronic device in a folded state according to Embodiment 1 of this application.
Figure 2:
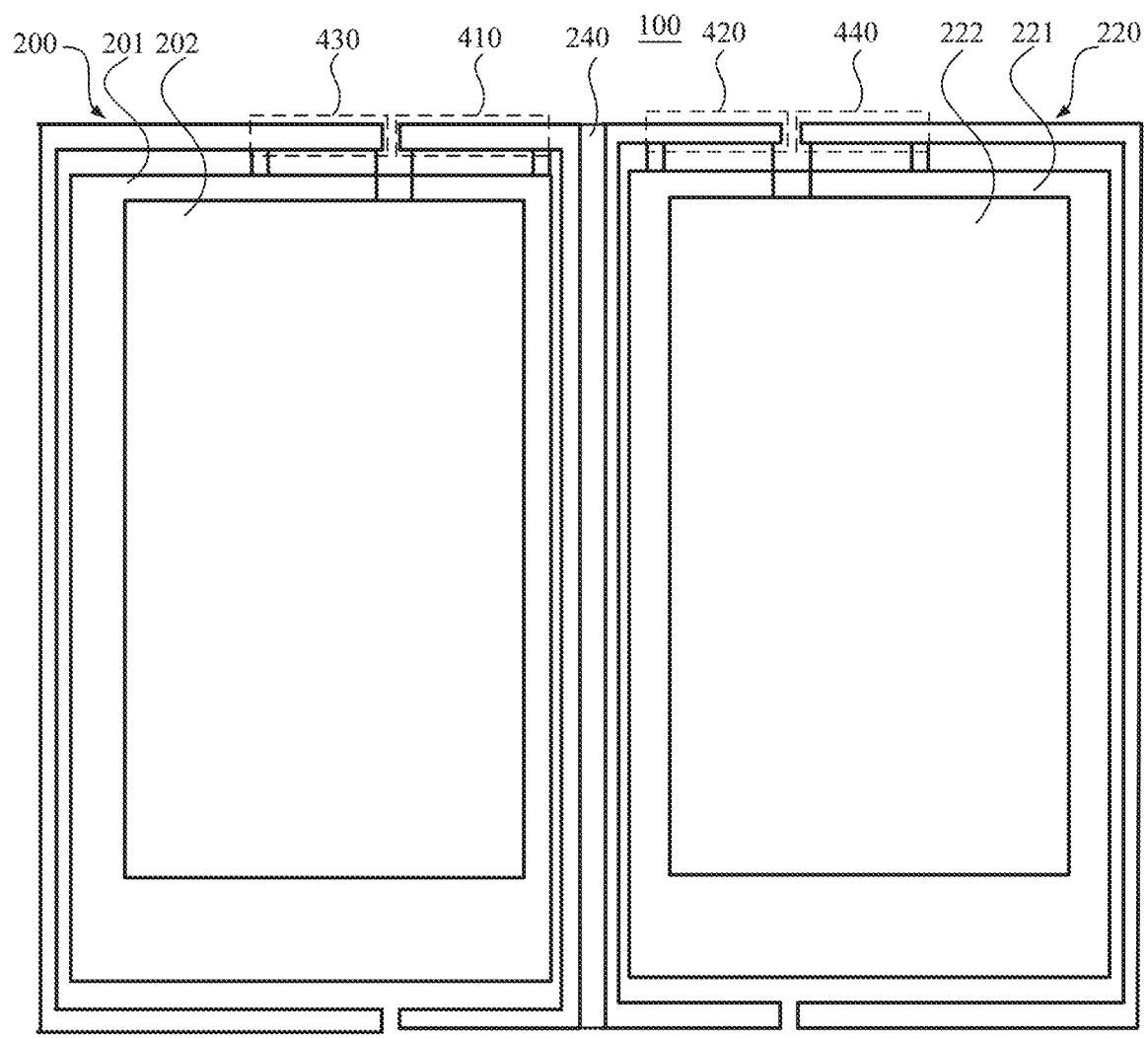
FIG. 2 is a schematic diagram of a structure of a foldable electronic device in an unfolded state according to Embodiment 1 of this application.
Figure 3:
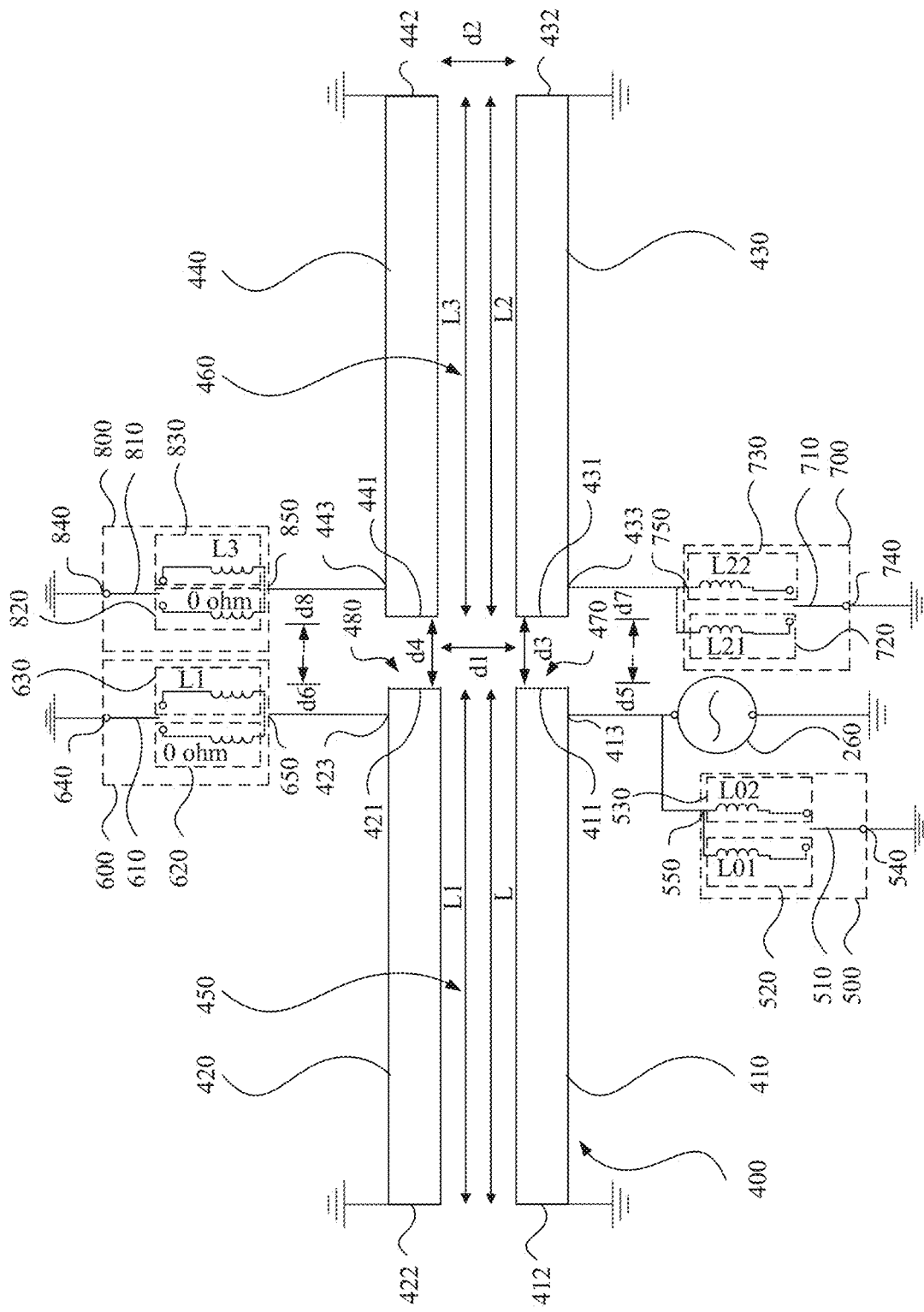
FIG. 3 is a schematic diagram of a structure of an antenna of a foldable electronic device in a folded state according to Embodiment 1 of this application.

Refer to FIG. 1 to FIG. 3. FIG. 1 is a schematic three-dimensional diagram of a structure of a foldable electronic device 100 in a folded state according to Embodiment 1 of this application. FIG. 2 is a schematic diagram of a structure of the foldable electronic device 100 in an unfolded state according to Embodiment 1 of this application. FIG. 3 is a schematic diagram of a structure of an antenna 400 of the foldable electronic device 100 in the folded state according to Embodiment 1 of this application. As shown in FIG. 1 to FIG. 3, an embodiment of this application provides a foldable electronic device 100, including a first device body 200, a second device body 220, an earpiece (not shown in the figure), an antenna 400, and a first switch control circuit 600. In this implementation, the foldable electronic device 100 is described by using a foldable smartphone as an example. Certainly, a person skilled in the art may understand that, in another alternative implementation, the foldable electronic device may be another foldable electronic device such as a foldable tablet computer or a foldable smartwatch. This does not limit the protection scope of this application herein.

As shown in FIG. 1 to FIG. 3, the first device body 200 and the second device body 220 are rotatably connected through a rotating shaft 240, so that the foldable electronic device 100 can switch between an unfolded state and a folded state. In this implementation, the first device body 200 is a device body on a side on which a primary screen of the foldable electronic device 100 is located, and the second device body 220 is a device body on a side on which a secondary screen of the foldable electronic device 100 is located. Certainly, a person skilled in the art may understand that, in another alternative implementation, the first device body 200 may be a device body on a side on which a secondary screen of the foldable electronic device 100 is located, and the second device body 220 is a device body on a side on which a primary screen of the foldable electronic device 100 is located. This does not limit the protection scope of this application herein.

The antenna 400 includes a strip-shaped main radiator 410 and a strip-shaped first parasitic radiator 420. Specifically, both the main radiator 410 and the first parasitic radiator 420 are in a straight strip shape, that is, both extend in a straight line shape. Certainly, a person skilled in the art may understand that, in another alternative implementation, the main radiator 410 and the first parasitic radiator 420 may be in structures of other shapes, and are not limited to a strip shape. When a strip-shaped structure is used, a bent strip-shaped structure may be used, for example, an L strip-shaped structure, which is not limited to a straight strip-shaped structure.

The main radiator 410 is disposed on the first device body 200, and is connected to a radio frequency source 260 of the foldable electronic device 100, so that a radio frequency signal sent from the radio frequency source 260 is directly fed or coupling-fed to the main radiator 410 through a feeder line. The radio frequency source 260 is disposed on a mainboard 202 of the first device body 200. The first parasitic radiator 420 and the earpiece are disposed on the second device body 220.

In this implementation, the main radiator 410 is disposed on a device body on a side on which a primary screen of the foldable electronic device 100 is located, and the first parasitic radiator 420 and the earpiece are disposed on a device body on a side on which a secondary screen of the foldable electronic device 100 is located. Certainly, a person skilled in the art may understand that, in another alternative implementation, the main radiator 410 is disposed on a device body on a side on which a secondary screen of the foldable electronic device 100 is located, and the first parasitic radiator 420 and the earpiece are disposed on a device body on a side on which a primary screen of the foldable electronic device 100 is located. This does not limit the protection scope of this application herein.

When the foldable electronic device 100 is in the folded state, the main radiator 410 is disposed relative to the first parasitic radiator 420 in a side direction at a first interval 450, and is coupled to the first parasitic radiator 420 through the first interval 450. A person skilled in the art may understand that, that the main radiator 410 is disposed relative to the first parasitic radiator 420 in a side direction means that a side of the main radiator 410 is disposed relative to a side of the first parasitic radiator 420.

Specifically, the main radiator 410 has a first end 411 and a second end 412, and the first parasitic radiator 420 has a first end 421 and a second end 422. When the foldable electronic device 100 is in the folded state, the first end 411 of the main radiator 410 and the first end 421 of the first parasitic radiator 420 are correspondingly disposed, and the second end 412 of the main radiator 410 and the second end 422 of the first parasitic radiator 420 are correspondingly disposed.

Further, when the foldable electronic device 100 is in the folded state, the main radiator 410 and the first parasitic radiator 420 are disposed in parallel. The first end 411 of the main radiator 410 is aligned with the first end 421 of the first parasitic radiator 420, and the second end 412 of the main radiator 410 is aligned with the second end 422 of the first parasitic radiator 420.

Certainly, it is to be noted that the parallel disposal may be approximately parallel, including a case in which a small-amplitude included angle (the included angle may be omitted) is formed. In this embodiment, the main radiator 410 and the first parasitic radiator 420 are parallel to each other, allowing a certain tilt deviation. The alignment may be roughly aligned, including a case in which an end extends (an extending distance may be almost omitted). In this embodiment, the first end 411 and the second end 412 of the main radiator 410 are respectively aligned with the first end 421 and the second end 422 of the first parasitic radiator 420, allowing a certain position offset. The foregoing description of parallel disposal and alignment is applicable throughout the scope of this application.

As shown in FIG. 3, the first switch control circuit 600 includes a first switch component 610 and a plurality of different first matching branches 620 and 630 disposed in parallel connection. One end of the first switch component 610 forms one end 640 of the first switch control circuit, the other end may separately switch to and be connected to an end of the plurality of different first matching branches 620 and 630, and other ends of the plurality of different first matching branches 620 and 630 jointly form the other end 650 of the first switch control circuit. In this implementation, one end 640 of the first switch control circuit is connected to the ground of the second device body 220, and specifically, is connected to a ground plate 221 of the second device body 220 (refer to FIG. 2), and the other end 650 of the first switch control circuit is connected to the first parasitic radiator 420. A person skilled in the art may understand that, in another alternative implementation, one end 640 of the first switch control circuit may be connected to the first parasitic radiator 420, and the other end 650 of the first switch control circuit is connected to the ground plate 221 of the second device body 220 (refer to FIG. 2). This does not limit the protection scope of this application herein. A person skilled in the art may understand that the ground plate is a type of ground. In this embodiment, the ground plate is used as an example of the ground for description.

The first switch component 610 switches between the plurality of different first matching branches 620 and 630, to adjust a resonant frequency of the first parasitic radiator 420. Based on the foldable electronic device in the folded state, when the earpiece is in an off state, the resonant frequency of the first parasitic radiator 420 and a resonant frequency of the main radiator 410 are in a first frequency band, and when the earpiece is in an on state, the resonant frequency of the main radiator 410 is in the first frequency band, and the resonant frequency of the first parasitic radiator 420 is in a second frequency band. The first frequency band and the second frequency band are different frequency bands (that is, the first frequency band and the second frequency band do not overlap at all). The first frequency band is an operating frequency band of the main radiator 410. A person skilled in the art may understand that the operating frequency band of the main radiator 410 may be properly designed based on an actual requirement. In other words, based on the foldable electronic device in the folded state, when the earpiece is in the off state, the resonant frequency of the first parasitic radiator 420 is in the operating frequency band of the main radiator 410; and when the earpiece is in the on state, the resonant frequency of the first parasitic radiator 420 is out of the operating frequency band of the main radiator 410.

Based on the resonant frequency of the first parasitic radiator 420 and the resonant frequency of the main radiator 410 in the first frequency band, when the foldable electronic device 100 is in the folded state, radiation energy of the main radiator 410 is coupled to the first parasitic radiator 420, so that the first parasitic radiator 420 radiates a signal outward, that is, the first parasitic radiator 420 has a parasitic radiation effect on the main radiator 410. In this way, a body SAR value can be reduced, and efficiency of the antenna 400 can be improved, improving transmit power of the antenna 400, thereby improving antenna performance in a free space scenario or a handheld scenario when the foldable electronic device 100 is in the folded state. SAR (electromagnetic wave absorption ratio or specific absorption rate, full name in English "Specific Absorption Rate") refers to electromagnetic power absorbed by a human body tissue per unit mass, measured in W/kg. Internationally, an SAR value is commonly used to measure a thermal effect by radiation of an electronic device. The body SAR value indicates an average specific absorption rate of a body when an antenna is close to or in contact with the body.

Based on the resonant frequency of the main radiator 410 in the first frequency band, and the resonant frequency of the first parasitic radiator 420 is in the second frequency band, when the foldable electronic device 100 is in the folded state, the radiation energy of the main radiator 410 is coupled to the first parasitic radiator 420 in a very low coupling degree, or even cannot be coupled to the first parasitic radiator 420, that is, the first parasitic radiator 420 has a very weak parasitic radiation effect on the main radiator 410, or even has no parasitic radiation effect on the main radiator 410. In this case, the first parasitic radiator 420 can block and isolate radiation of the main radiator 410 of the antenna 400 toward the first parasitic radiator 420. Therefore, when the antenna 400 is located on the top portion of the foldable electronic device 100, in a head-hand holding scenario, a head SAR value of the antenna 400 is reduced, and a radiation performance attenuation degree of the foldable electronic device 100 is reduced, that is, a head-hand holding reduction amplitude is reduced, thereby improving radiation performance of the foldable electronic device 100 in the head-hand holding scenario, that is, improving antenna performance in the head-hand holding scenario when the foldable electronic device 100 is in the folded state. The head SAR value indicates an average specific absorption rate of a body when an antenna is close to or in contact with the head.

A person skilled in the art may understand that the head-hand holding scenario refers to a scenario in which the electronic device is held with the hand and approaches or gets into contact with the head, for example, a call scenario. The handheld scenario refers to a scenario in which the electronic device is held with the hand, for example, a scenario of viewing a web page. The free space scenario refers to a scenario in which the electronic device is in a free placement state, for example, a scenario in which the electronic device is freely placed on a platform (for example, a table) or a mobile phone fixing bracket.

From another perspective, the first switch component 610 switches to one of the plurality of different first matching branches 620 and 630, to adjust the resonant frequency of the first parasitic radiator 420, so that the resonant frequency of the first parasitic radiator 420 is close to or far away from the resonant frequency of the main radiator 410. Based on the resonant frequency of the first parasitic radiator 420 close to the resonant frequency of the main radiator 410, when the foldable electronic device 100 is in the folded state, the radiation energy of the main radiator 410 is coupled to the first parasitic radiator 420. Based on the resonant frequency of the first parasitic radiator 420 far away from the resonant frequency of the main radiator 410, when the foldable electronic device 100 is in the folded state, the radiation energy of the main radiator 410 is coupled to the first parasitic radiator 420 in a very low coupling degree, or even cannot be coupled to the first parasitic radiator 420, that is, the first parasitic radiator 420 has a very weak parasitic radiation effect on the main radiator 410, or even has no parasitic radiation effect on the main radiator 410.

In this implementation, the antenna 400 is disposed on the top portion of the foldable electronic device 100. In this case, the disposal of the antenna 400 mainly satisfies, when the foldable electronic device 100 is in the folded state, antenna performance (including a head SAR value and a head-hand holding reduction amplitude) in a head-hand holding scenario and antenna performance (including a body SAR value and transmit power of the antenna) in a handheld scenario and a free space scenario.

Certainly, a person skilled in the art may understand that, in another alternative implementation, the antenna 400 may be disposed on the bottom portion of the foldable electronic device 100. In this case, the disposal of the antenna 400 mainly satisfies antenna performance (including a body SAR value and transmit power of the antenna) in a handheld scenario and a free space scenario when the foldable electronic device 100 is in the folded state. Alternatively, the antenna 400 may be disposed on a side portion far away from the rotating shaft 240 of the foldable electronic device 100. In this case, the disposal of the antenna 400 mainly satisfies, when the foldable electronic device 100 is in the folded state, antenna performance (including a body SAR value, and transmit power and radiation performance of the antenna) in a handheld scenario (in this case, the antenna 400 is disposed at a position of the side portion close to the top portion of the foldable electronic device 100, so as to avoid a handheld position and ensure radiation performance of the foldable electronic device 100 in the handheld scenario) and antenna performance (including a body SAR value and transmit power of the antenna) in a free space scenario and a horizontal placement scenario.

The plurality of different first matching branches 620 and 630 include two first matching branches 620 and 630. The two first matching branches 620 and 630 respectively include a 0-ohm resistor (that is, the resistance is 0 ohms) and an inductor. That is, the first matching branch 620 (that is, a first matching sub-branch) includes a 0-ohm resistor, and the first matching branch 630 (that is, a second matching sub-branch) includes an inductor L1. A person skilled in the art may understand that an inductance value of the inductor L1 may be set properly based on an actual requirement.

When the first switch component 610 switches to the first matching branch 620 (that is, the first matching sub-branch) including the 0-ohm resistor, the resonant frequency of the first parasitic radiator 420 is in the second frequency band. In this case, the first parasitic radiator 420 has no parasitic radiation effect on the main radiator 410, and the first parasitic radiator 420 can block and isolate radiation of the main radiator 410 of the antenna 400 toward the first parasitic radiator 420. Therefore, when the antenna 400 is located on the top portion of the foldable electronic device 100, in a head-hand holding scenario, a head SAR value of the antenna 400 is reduced, and a radiation performance attenuation degree of the foldable electronic device 100 is reduced, that is, a head-hand holding reduction amplitude is reduced, thereby improving radiation performance of the foldable electronic device 100 in the head-hand holding scenario.

When the first switch component 610 switches to the first matching branch 630 (that is, the second matching sub-branch) including the inductor L1, the resonant frequency of the first parasitic radiator 420 is in the first frequency band, and the first parasitic radiator 420 has a parasitic radiation effect on the main radiator 410. In this way, a body SAR value can be reduced, so that antenna efficiency is improved, and transmit power of the antenna is improved, thereby improving antenna performance in a free space scenario or a handheld scenario when the foldable electronic device 100 is in the folded state.

A person skilled in the art may understand that, in another alternative implementation, the plurality of different first matching branches may include more than two first matching branches, which is not limited to two first matching branches, and each first matching branch may include a 0-ohm resistor, an inductor, or a capacitor. In other words, one of the two first matching branches may include a capacitor, and the other matching circuit includes an inductor. This does not limit the protection scope of this application herein.

As shown in FIG. 3, the first switch component 610 is a single-pole multi-throw switch. In this implementation, the first switch component 610 is a single-pole double-throw switch. A person skilled in the art may understand that, in another alternative implementation, the first switch component 610 may be a double-pole double-throw switch.

In this implementation, in a default state, the first switch component 610 switches to the first matching branch 630 including the inductor L1. A trigger signal for switching and gating, by the first switch component 610, from the first matching branch 630 including the inductor L1 to the first matching branch 620 including the 0-ohm resistor may be triggered by transferring, to a processing apparatus, a signal indicating that the earpiece on the second device body 220 is on (or the earpiece emits sound), or may be triggered by transferring, to the processing apparatus, a signal detected by an optical proximity sensor disposed on the second device body 220.

In other words, in a handheld scenario or a free space scenario, the first switch component 610 switches to the first matching branch 630 including the inductor L1. In this case, the first parasitic radiator 420 has a parasitic radiation effect on the main radiator 410. In this way, a body SAR value can be reduced, thereby improving antenna efficiency and improving transmit power of the antenna. In a head-hand holding scenario, the head is close to the optical proximity sensor, or the earpiece is on. In this way, a trigger signal can be generated, so that the first switch component 610 switches and switches to the first matching branch 620 including the 0-ohm resistor. In this case, the first parasitic radiator 420 has no parasitic radiation effect on the main radiator 410, and the first parasitic radiator 420 can block and isolate radiation of the main radiator 410 of the antenna 400 toward the first parasitic radiator 420 (that is, can block, isolate, and attenuate radiation of the main radiator 410 of the antenna 400 toward the head), so that a head SAR value of the antenna is reduced, and a radiation performance attenuation degree of the foldable electronic device 100 is reduced, that is, a head-hand holding reduction amplitude is reduced, thereby improving radiation performance of the foldable electronic device 100 in a head-hand holding scenario.

In this implementation, an operating frequency range of the antenna 400 is 1.7 GHz to 2.7 GHz, that is, in a medium and high frequency band. A person skilled in the art may understand that, in another alternative implementation, the operating frequency range of the antenna 400 may be another frequency band, for example, a low frequency band or an ultra-high frequency band. This does not limit the protection scope of this application herein.

As shown in FIG. 3, the second end 422 of the first parasitic radiator 420 is connected to the ground plate 221 of the second device body 220 (refer to FIG. 2). The first parasitic radiator 420 has a first connection point 423. The first connection point 423 is located at a position close to the first end 421 of the first parasitic radiator 420, and the first connection point 423 is connected to the other end 650 of the first switch control circuit. The second end 412 of the main radiator 410 is connected to the ground of the first device body 200, and is specifically connected to the ground plate 201 of the first device body 200. The main radiator 410 has a feed point 413. The feed point 413 is located at a position close to the first end 411 of the main radiator 410, and the feed point 413 is connected to the radio frequency source 260. Certainly, a person skilled in the art may understand that, in another alternative implementation, the first connection point 423 may be connected to one end 640 of the first switch control circuit.

Further, a distance between the feed point 413 and the first end 411 of the main radiator 410 is 1.5 mm to 3 mm. A distance between the first connection point 423 and the first end 421 of the first parasitic radiator 420 is 1.5 mm to 3 mm. In this way, a coupling requirement between the main radiator 410 and the first parasitic radiator 420 can be better satisfied.

Still further, a distance of the first interval 450 is 2 mm to 4 mm. In this way, coupling strength between the main radiator 410 and the first parasitic radiator 420 can be ensured.

In addition, the resonant frequency of the main radiator 410 is associated with a length of the main radiator 410. The resonant frequency of the first parasitic radiator 420 is associated with a length of the first parasitic radiator 420. As the length of the main radiator 410 changes, the resonant frequency of the main radiator 410 changes. As the length of the first parasitic radiator 420 changes, the resonant frequency of the first parasitic radiator 420 changes. Therefore, proper lengths of the main radiator 410 and the first parasitic radiator 420 can be selected based on a requirement of an operating frequency band of the antenna.

In addition, refer to FIG. 3. The foldable electronic device further includes a main switch control circuit 500, and the main switch control circuit 500 includes a main switch component 510 and a plurality of different main matching branches 520 and 530 disposed in parallel connection. One end of the main switch component 510 forms one end 540 of the main switch control circuit, and the other end may separately switch to and be connected to an end of the plurality of different main matching branches 520 and 530, and other ends of the plurality of different main matching branches 520 and 530 jointly form the other end 550 of the main switch control circuit.

In this implementation, one end 540 of the main switch control circuit is connected to the ground plate 201 of the first device body 200 (refer to FIG. 2), and the other end 550 of the main switch control circuit is connected between the radio frequency source 260 and the feed point 413 of the main radiator 410. A person skilled in the art may understand that, in another alternative implementation, one end 540 of the main switch control circuit may be connected between the radio frequency source 260 and the feed point 413 of the main radiator 410, and the other end 550 of the main switch control circuit is connected to the ground plate 201 of the first device body 200 (refer to FIG. 2).

As the main switch component 510 switches to one of the plurality of different main matching branches 520 and 530, the resonant frequency of the main radiator 410 is adjusted, so that the antenna 400 can cover different frequency bands.

The plurality of different main matching branches 520 and 530 include two main matching branches 520 and 530. Each of the two main matching branches 520 and 530 includes an inductor, and inductance values of the inductors of the two main matching branches 520 and 530 are different. In other words, the main matching branch 520 includes an inductor L01, and the main matching branch 530 includes an inductor L02. The inductor L01 and the inductor L02 have different inductance values. A person skilled in the art may understand that inductance values of the inductor L01 and the inductor L02 may be set properly based on an actual requirement.

A person skilled in the art may understand that, in another alternative implementation, the plurality of different main matching branches may include more than two main matching branches, which is not limited to two first matching branches, and each main matching branch may include a 0-ohm resistor, an inductor, or a capacitor.

Specifically, the main switch component 510 is a single-pole multi-throw switch. In this implementation, the main switch component 510 is a single-pole double-throw switch. A person skilled in the art may understand that, in another alternative implementation, the main switch component 510 may be a double-pole double-throw switch.

Refer to FIG. 3. The antenna 400 further includes a strip-shaped second parasitic radiator 430. Specifically, the second parasitic radiator 430 is in a straight strip shape, that is, extends in a straight line shape. Certainly, a person skilled in the art may understand that, in another alternative implementation, the second parasitic radiator 430 may be in a bent strip-shaped structure, for example, an L strip-shaped structure, which is not limited to a straight strip-shaped structure.

The second parasitic radiator 430 is disposed on the first device body 200. The second parasitic radiator 430 and the main radiator 410 are disposed at an interval in a longitudinal end-to-end manner. The second parasitic radiator 430 has a first end 431 and a second end 432. The first end 431 of the second parasitic radiator 430 and the first end 411 of the main radiator 410 are relatively close, and have a first gap 470. The second parasitic radiator 430 is coupled to the main radiator 410 through the first gap 470. The second end 432 of the second parasitic radiator 430 and the second end 412 of the main radiator 410 are relatively far away from each other, and are connected to the ground of the first device body 200, and is specifically connected to the ground plate 201 of the first device body 200 (refer to FIG. 2). The second parasitic radiator 430 has a second connection point 433, and the second connection point 433 is located at a position close to the first end 431 of the second parasitic radiator 430. The second parasitic radiator 430 is coupled to the main radiator 410 through the first gap 470, so that a body SAR value can be further reduced, and antenna efficiency can be improved, improving transmit power of the antenna. In this implementation, the main radiator 410 and the second parasitic radiator 430 are arranged in a straight line. Certainly, it is to be noted that the arrangement in a straight line may be that a main body part is in a straight line, or an adjacent part is in a straight line, or respective parts of the two radiators are in a straight line. In this embodiment, the two radiators, namely, the main radiator 410 and the second parasitic radiator 430, are in a straight line as a whole, allowing a certain error. In addition, the description is applicable throughout the scope of this application.

The foldable electronic device further includes a second switch control circuit 700, and the second switch control circuit 700 includes a second switch component 710 and a plurality of different second matching branches 720 and 730 disposed in parallel connection. One end of the second switch component 710 forms one end 740 of the second switch control circuit, the other end may separately switch to and be connected to an end of the plurality of different second matching branches 720 and 730, and other ends of the plurality of different second matching branches 720 and 730 jointly form the other end 750 of the second switch control circuit.

In this implementation, one end 740 of the second switch control circuit is connected to the ground plate 201 of the first device body 200 (refer to FIG. 2), and the other end 750 of the second switch control circuit is connected to the second connection point 433 of the second parasitic radiator 430. A person skilled in the art may understand that, in another alternative implementation, one end 740 of the second switch control circuit may be connected to the second connection point 433 of the second parasitic radiator 430, and the other end 750 of the second switch control circuit is connected to the ground plate 201 of the first device body 200 (refer to FIG. 2).

The second switch component 710 switches to one of the plurality of different second matching branches 720 and 730, to adjust the resonant frequency of the second parasitic radiator 430. In this way, the resonant frequency of the second parasitic radiator 430 can be adjusted, so that the antenna can cover different frequency bands.

Specifically, the plurality of different second matching branches 720 and 730 include two second matching branches 720 and 730, each of the two second matching branches 720 and 730 includes an inductor, and inductance values of the inductors of the two second matching branches 720 and 730 are different. In other words, the second matching branch 720 includes an inductor L21, and the second matching branch 730 includes an inductor L22. The inductor L21 and the inductor L22 have different inductance values. A person skilled in the art may understand that inductance values of the inductor L21 and the inductor L22 may be set properly based on an actual requirement.

A person skilled in the art may understand that, in another alternative implementation, the plurality of different second matching branches may include more than two second matching branches, which is not limited to two first matching branches, and each second matching branch may include a 0-ohm resistor, an inductor, or a capacitor.

Specifically, the second switch component 710 is a single-pole multi-throw switch. In this implementation, the second switch component 710 is a single-pole double-throw switch. A person skilled in the art may understand that, in another alternative implementation, the second switch component 710 may be a double-pole double-throw switch.

Further, a distance between the second connection point 433 and the first end 431 of the second parasitic radiator 430 is 1.5 mm to 3 mm. In this way, a coupling requirement between the main radiator 410 and the second parasitic radiator 430 can be better satisfied.

Still further, a width of the first gap 470 is less than or equal to 2 mm. In this way, an appearance design requirement of the foldable electronic device 100 can be satisfied. Certainly, a person skilled in the art may understand that the width of the first gap 470 may be set to be greater than 2 mm based on an actual requirement.

Refer to FIG. 3. The antenna 400 further includes a strip-shaped third parasitic radiator 440. Specifically, the third parasitic radiator 440 is in a straight strip shape, that is, extends in a straight line shape. Certainly, a person skilled in the art may understand that, in another alternative implementation, the third parasitic radiator 440 may be in a structure of another shape, and is not limited to a strip structure. When a strip-shaped structure is used, a bent strip-shaped structure may be used, for example, an L strip-shaped structure, which is not limited to a straight strip-shaped structure. The third parasitic radiator 440 is disposed on the second device body 220. The third parasitic radiator 440 and the first parasitic radiator 420 are disposed at an interval in a longitudinal end-to-end manner. The third parasitic radiator 440 and the first parasitic radiator 420 are arranged in a straight line.

The third parasitic radiator 440 has a first end 441 and a second end 442. The first end 441 of the third parasitic radiator 440 and the first end 421 of the first parasitic radiator 420 are relatively close, and have a second gap 480. That is, the second gap 480 is provided between the first end 441 of the third parasitic radiator 440 and the first end 421 of the first parasitic radiator 420. The second end 442 of the third parasitic radiator 440 and the second end 422 of the first parasitic radiator 420 are relatively far away from each other, and are connected to the ground of the second device body 220, and is specifically connected to the ground plate 221 of the second device body 220 (refer to FIG. 2). The third parasitic radiator 440 has a third connection point 443, and the third connection point 443 is located at a position close to the first end 441 of the third parasitic radiator 440.

When the foldable electronic device 100 is in the folded state, the third parasitic radiator 440 is disposed relative to the second parasitic radiator 430 side-to-side at a second interval 460, and is coupled to the second parasitic radiator 430 through the second interval 460. The third parasitic radiator 440 is coupled to the first parasitic radiator 420 through the second gap 480. The third parasitic radiator 440 is further coupled to the main radiator 410. In this implementation, when the foldable electronic device 100 is in the folded state, the third parasitic radiator 440 and the second parasitic radiator 430 are disposed in parallel. In addition, when the foldable electronic device 100 is in the folded state, the first end 441 of the third parasitic radiator 440 is aligned with the first end 431 of the second parasitic radiator 430, and the second end 442 of the third parasitic radiator 440 is aligned with the second end 432 of the second parasitic radiator 430.

A person skilled in the art may understand that the third parasitic radiator 440 may be further directly coupled to the main radiator 410 through a gap between the first end 411 of the main radiator 410 and the first end 441 of the third parasitic radiator 440.

As shown in FIG. 3, the foldable electronic device further includes a third switch control circuit 800, and the third switch control circuit 800 includes a third switch component 810 and a plurality of different third matching branches 820 and 830 disposed in parallel connection. One end of the third switch component 810 forms one end 840 of the third switch control circuit, the other end may separately switch to and be connected to an end of the plurality of different third matching branches 820 and 830, and other ends of the plurality of different third matching branches 820 and 830 jointly form the other end 850 of the third switch control circuit.

In this implementation, one end 840 of the third switch control circuit is connected to the ground plate 221 of the second device body 220 (refer to FIG. 2), and the other end 850 of the third switch control circuit is connected to the third connection point 443 of the third parasitic radiator 440. A person skilled in the art may understand that, in another alternative implementation, one end 840 of the third switch control circuit is connected to the third connection point 443 of the third parasitic radiator 440, and the other end 850 of the third switch control circuit is connected to the ground plate 221 of the second device body 220.

The third switch component 810 switches to one of the plurality of different third matching branches 820 and 830, to adjust the resonant frequency of the third parasitic radiator 440. Based on the foldable electronic device in the folded state, when the earpiece is in the off state, the resonant frequency of the third parasitic radiator is in the first frequency band, that is, the resonant frequency of the third parasitic radiator is in the operating frequency band of the main radiator. When the earpiece is in the on state, the resonant frequency of the third parasitic radiator is in the second frequency band, that is, the resonant frequency of the third parasitic radiator is out of the operating frequency band of the main radiator.

When the third switch component 810 switches to the third matching branch 820 (that is, a third matching sub-branch), the third parasitic radiator 440 has a very weak parasitic radiation effect on the main radiator 410, or even has no parasitic radiation effect on the main radiator 410. In this case, the third parasitic radiator 440 can block and isolate radiation of the main radiator 410 and the second parasitic radiator 430 of the antenna 400 toward the third parasitic radiator 440. Therefore, when the antenna 400 is located on the top portion of the foldable electronic device 100, in a head-hand holding scenario, a head SAR value of the antenna is reduced, and a radiation performance attenuation degree of the foldable electronic device 100 is reduced, that is, a head-hand holding reduction amplitude is reduced, thereby improving radiation performance of the foldable electronic device 100 in the head-hand holding scenario.

When the third switch component 810 switches to the third matching branch 830 (that is, a fourth matching sub-branch), the third parasitic radiator 440 has a parasitic radiation effect on the main radiator 410. In this way, a body SAR value can be reduced, and antenna efficiency can be improved, improving transmit power of the antenna, thereby improving antenna performance in a free space scenario or a handheld scenario when the foldable electronic device 100 is in the folded state.

Specifically, the plurality of different third matching branches 820 and 830 include two third matching branches 820 and 830. The two third matching branches 820 and 830 respectively include a 0-ohm resistor (that is, the resistance is 0 ohms) and an inductor. In other words, the third matching branch 820 includes a 0-ohm resistor, and the third matching branch 830 includes an inductor L3. A person skilled in the art may understand that an inductance value of the inductor L3 may be set properly based on an actual requirement.

When the third switch component 810 switches to the third matching branch 820 including the 0-ohm resistor, the third parasitic radiator 440 has no parasitic radiation effect on the main radiator 410. When the third switch component 810 switches to the third matching branch 830 including the inductor L3, the third parasitic radiator 440 has a parasitic radiation effect on the main radiator 410.

A person skilled in the art may understand that, in another alternative implementation, the plurality of different third matching branches may include more than two third matching branches, which is not limited to two first matching branches, and each third matching branch may include a 0-ohm resistor, an inductor, or a capacitor. In other words, one of the two third matching branches may include a capacitor, and the other third matching circuit includes an inductor. This does not limit the protection scope of this application herein.

As shown in FIG. 3, the third switch component 810 is a single-pole multi-throw switch. In this implementation, the third switch component 810 is a single-pole double-throw switch. A person skilled in the art may understand that, in another alternative implementation, the third switch component 810 may be a double-pole double-throw switch.

In this implementation, in a default state, the third switch component 810 switches to to the third matching branch 830 including the inductor L3. A trigger signal for switching and gating, by the third switch component 810, from the third matching branch 830 including the inductor L3 to the third matching branch 820 including the 0-ohm resistor may be triggered by transferring, to a processing apparatus, a signal indicating that the earpiece on the second device body 220 is on and emits sound, or may be triggered by transferring, to the processing apparatus, a signal detected by an optical proximity sensor disposed on the second device body 220.

In other words, in a handheld scenario or a free space scenario, the third switch component 810 switches to the third matching branch 830 including the inductor L3. In this case, the third parasitic radiator 440 has a parasitic radiation effect on the main radiator 410. In this way, a body SAR value can be reduced, thereby improving antenna efficiency and improving transmit power of the antenna. In a head-hand holding scenario, the head is close to the optical proximity sensor, or the earpiece is on and emits sound. In this way, a trigger signal can be generated, so that the third switch component 810 switches and switches to the third matching branch 820 including the 0-ohm resistor. In this case, the third parasitic radiator 440 has no parasitic radiation effect on the main radiator 410, and the third parasitic radiator 440 can block and isolate radiation of the main radiator 410 of the antenna 400 toward the first parasitic radiator 420 (that is, can block, isolate, and attenuate radiation of the main radiator 410 of the antenna 400 toward the head), so that a head SAR value of the antenna is reduced, and a radiation performance attenuation degree of the foldable electronic device 100 is reduced, that is, a head-hand holding reduction amplitude is reduced, thereby improving radiation performance of the foldable electronic device 100 in a head-hand holding scenario.

Further, a distance between the third connection point 443 and the first end 441 of the third parasitic radiator 440 is 1.5 mm to 3 mm. In this way, a coupling requirement between the main radiator 410 and the third parasitic radiator 440 can be better satisfied.

Still further, a distance of the second interval 460 is 2 mm to 4 mm. In this way, coupling strength among the main radiator 410, the second parasitic radiator 430, and the third parasitic radiator 440 can be ensured. A width of the second gap 480 is less than or equal to 2 mm. In this way, an appearance design requirement of the foldable electronic device 100 can be satisfied. Certainly, a person skilled in the art may understand that the width of the second gap 480 may be set to be greater than 2 mm based on an actual requirement.

In this implementation, the main switch control circuit 500 and the second switch control circuit 700 are integrated into the mainboard 202 of the first device body 200, and the first switch control circuit 600 and the third switch control circuit 800 are integrated into a mainboard 222 of the second device body 220.

In this implementation, when the foldable electronic device 100 is in the folded state, and the earpiece is on and generates a first trigger signal, the processing apparatus controls, in response to the first trigger signal, the first switch component 610 to switch to the first matching branch 620 including the 0-ohm resistor, so that the resonant frequency of the first parasitic radiator 420 is in the second frequency band, and the resonant frequency of the main radiator 410 is in the first frequency band, that is, the resonant frequency of the first parasitic radiator 420 is out of the operating frequency band of the main radiator 410. In this case, the first parasitic radiator 420 has no parasitic radiation effect on the main radiator 410. In addition, the third switch component 810 is further controlled to switch to the third matching branch 820 including the 0-ohm resistor, so that the resonant frequency of the third parasitic radiator 440 is in the second frequency band, that is, the resonant frequency of the third parasitic radiator 440 is out of the operating frequency band of the main radiator 410. In this case, the third parasitic radiator 440 has no parasitic radiation effect on the main radiator 410.

When the foldable electronic device 100 is in the folded state, and the earpiece is off and generates a second trigger signal, the processing apparatus controls, in response to the second trigger signal, the first switch component 610 to switch to the first matching branch 630 including the inductor L1, so that the resonant frequency of the first parasitic radiator 420 and the resonant frequency of the main radiator 410 are in the first frequency band, that is, the resonant frequency of the first parasitic radiator 420 is in the operating frequency band of the main radiator 410. In this case, the first parasitic radiator 420 has a parasitic radiation effect on the main radiator 410. In addition, the third switch component 810 is further controlled to switch to the third matching branch 830 including the inductor L3, so that the resonant frequency of the third parasitic radiator 440 is in the first frequency band, that is, the resonant frequency of the third parasitic radiator 440 is in the operating frequency band of the main radiator 410. In this case, the third parasitic radiator 440 has a parasitic radiation effect on the main radiator 410.

It is to be noted that the first trigger signal and the second trigger signal can be converted into signals that can be identified by the processing apparatus.

It is to be noted that, examples of the processing apparatus include, but are not limited to, a processor, an application-specific integrated circuit (ASIC), and/or any combination thereof. According to an aspect, the processor may be a microprocessor, a digital signal processor, a microcontroller, and/or any combination thereof. According to another aspect, the processor may be a single-core processor, a multi-core processor, and/or any combination thereof.

Certainly, a person skilled in the art may understand that, in another alternative implementation, a trigger apparatus may be additionally disposed in the foldable electronic device, and gating states of the first switch component 610 and the third switch component 810 are controlled through a trigger signal generated by the trigger apparatus. In this case, the first trigger signal and the second trigger signal are generated by the trigger apparatus instead of the earpiece.

The trigger apparatus may be an optical proximity sensor, an ambient light sensor, or a distance sensor. When a user head is close to the optical proximity sensor, the ambient light sensor, or the distance sensor, the sensor can generate the first trigger signal. When the user head is far away from the sensor, the sensor can generate the second trigger signal.

In this implementation, the main radiator 410, the first parasitic radiator 420, the second parasitic radiator 430, and the third parasitic radiator 440 may be formed by using a metal frame of the foldable electronic device 100, a metal sheet (for example, a steel sheet), or a flexible printed circuit (Flexible Printed Circuit. FPC for short), or may be formed in a form of LDS (Laser Direct Structuring, laser direct structuring). The main radiator 410, the first parasitic radiator 420, the second parasitic radiator 430, and the third parasitic radiator 440 are formed by using a metal frame on the top portion of the foldable electronic device 100, and the earpiece is located on the top portion of the foldable electronic device 100. In the folded state, the earpiece is close to the four radiators: the main radiator 410, the first parasitic radiator 420, the second parasitic radiator 430, and the third parasitic radiator 440.

A person skilled in the art may understand that, when an operating status of the antenna is additionally controlled by the trigger apparatus, and the trigger apparatus is an optical proximity sensor, an ambient light sensor, or a distance sensor, in the folded state, the used sensor is close to the four radiators; the main radiator 410, the first parasitic radiator 420, the second parasitic radiator 430, and the third parasitic radiator 440.

The ground plate 201 of the first device body 200 and the ground plate 221 of the second device body 220 may be formed by using a bottom plate of a middle frame of the foldable electronic device 100. A person skilled in the art may understand that, in another alternative implementation, the ground plate may be formed by using another metal part, for example, a printed circuit board.

The first switch component 610, the second switch component 710, and the third switch component 810 switch to different matching to implement different states, and the main switch component 510 switches to different main matching circuits, to adjust matched impedance of the antenna, that is, to mainly optimize impedance matching in each state. The state is associated with the position of the radiator, the length of the radiator, the direction of the radiator, the feeder line, and the surrounding environment. When the first switch component 610 is connected in series to an inductor, the resonant frequency of the first parasitic radiator 420 corresponding to the first switch component 610 shifts higher. A higher inductance indicates a higher shift. When the first switch component 610 is connected in series to a capacitor, the resonant frequency of the first parasitic radiator 420 corresponding to the first switch component 610 shifts lower. A higher capacitance indicates a lower shift. When the second switch component 710 is connected in series to an inductor, the resonant frequency of the second parasitic radiator 430 corresponding to the second switch component 710 shifts higher. A higher inductance indicates a higher shift. When the second switch component 710 is connected in series to a capacitor, the resonant frequency of the second parasitic radiator 430 corresponding to the second switch component 710 shifts lower. A higher capacitance indicates a lower shift. When the third switch component 810 is connected in series to an inductor, the resonant frequency of the third parasitic radiator 440 corresponding to the third switch component 810 shifts higher. A higher inductance indicates a higher shift. When the third switch component 810 is connected in series to a capacitor, the resonant frequency of the third parasitic radiator 440 corresponding to the third switch component 810 shifts lower. A higher capacitance indicates a lower shift.

Figure 4A:
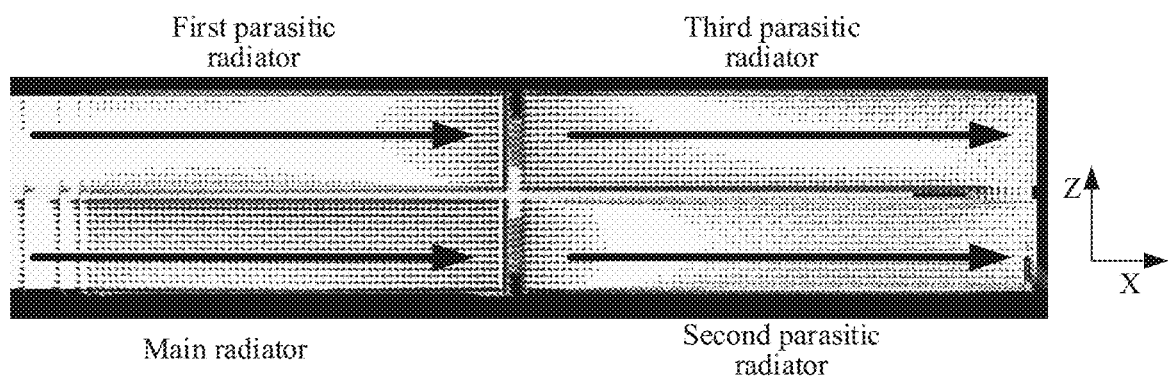
FIG. 4a and FIG. 4b are a distribution diagram of local currents of an antenna and a distribution diagram of local magnetic fields of the antenna in a state 1 obtained when a simulation effect test is performed on a foldable electronic device in a folded state according to Embodiment 1 of this application.

With reference to FIG. 4a to FIG. 3c the following specifically describes antenna performance of the foldable electronic device.

To verify performance of the antenna in embodiments of this application, simulation analysis is performed by using full-wave electromagnetic simulation software HFSS, and simulation effect diagrams in FIG. 4a to FIG. 10c are obtained.

Simulation conditions for obtaining the simulation effect diagrams shown in FIG. 4a to FIG. 10c are shown in the following Table 1 (which are understood with reference to FIG. 3):

TABLE 1

| Parameter | Antenna in Embodiment 1 of this application |
|---|---|
| Length L of main radiator (mm) | 18 |
| Length L1 of first parasitic radiator (mm) | 18 |
| Length L2 of second parasitic radiator (mm) | 18 |
| Length L3 of third parasitic radiator (mm) | 18 |
| Distance d1 of first interval (mm) | 3 |
| Distance d2 of second interval (mm) | 3 |
| Width d3 of first gap (mm) | 2 |
| Width d4 of second gap (mm) | 2 |
| Distance d5 between feed point and first end of main radiator (mm) | 2 |
| Distance d6 between first connection point and first end of first parasitic radiator (mm) | 2 |
| Distance d7 between second connection point and first end of second parasitic radiator (mm) | 2 |
| Distance d8 between third connection point and first end of third parasitic radiator (mm) | 2 |
| Inductance value of inductor L01 of one main matching branch (nH) | 15 |
| Inductance value of inductor L02 of another main matching branch (nH) | 4 |
| Inductance value of inductor L1 of another first matching branch (nH) | 10 |
| Inductance value of inductor L21 of one second matching branch (nH) | 8 |
| Inductance value of inductor L22 of another second matching branch (nH) | 2 |
| Inductance value of inductor L3 of another third matching branch (nH) | 15 |

With reference to FIG. 3, the following performs a simulation test through switch among the main switch component 510, the first switch component 610, the second switch component 710, and the third switch component 810 by using an example in which the antenna is in two states, and simulation effect diagrams shown in FIG. 4a to FIG. 6 are obtained.

State 1: The main switch component 510 switches to the main matching branch 530 including the inductor L02 whose inductance value is 4 nH, the first switch component 610 switches to the first matching branch 630 including the inductor L1 whose inductance value is 10 nH, the second switch component 710 switches to the second matching branch 730 including the inductor L22 whose inductance value is 2 nH, and the third switch component 810 switches to the third matching branch 830 including the inductor L3 whose inductance value is 15 nH. In the state 1, the first parasitic radiator 420, the second parasitic radiator 430, and the third parasitic radiator 440 all have a parasitic radiation effect on the main radiator 410.

State 2: The main switch component 510 switches to the main matching branch 520 including the inductor L01 whose inductance value is 15 nH, the first switch component 610 switches to the first matching branch 620 of 0 ohms, the second switch component 710 switches to the second matching branch 720 including the inductor L21 whose inductance value is 8 nH, and the third switch component 810 switches to the third matching branch 820 of 0 ohms. In the state 2, the second parasitic radiator 430 has a parasitic radiation effect on the main radiator 410, but the first parasitic radiator 420 and the third parasitic radiator 440 have no parasitic radiation effect on the main radiator 410.

Figure 4B:
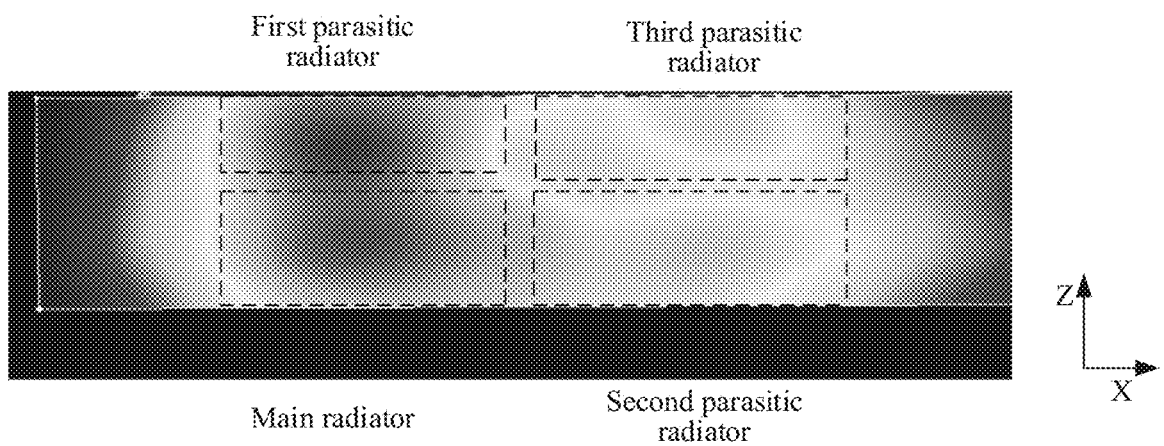
Figure 5A:
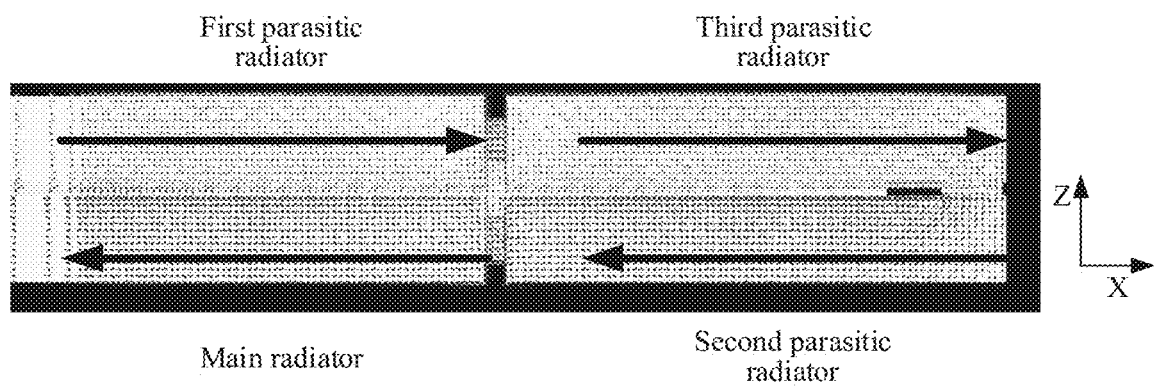
FIG. 5a and FIG. 5b are a distribution diagram of local currents of an antenna and a distribution diagram of local magnetic fields of the antenna in a state 2 obtained when a simulation effect test is performed on a foldable electronic device in a folded state according to Embodiment 1 of this application.
Figure 5B:
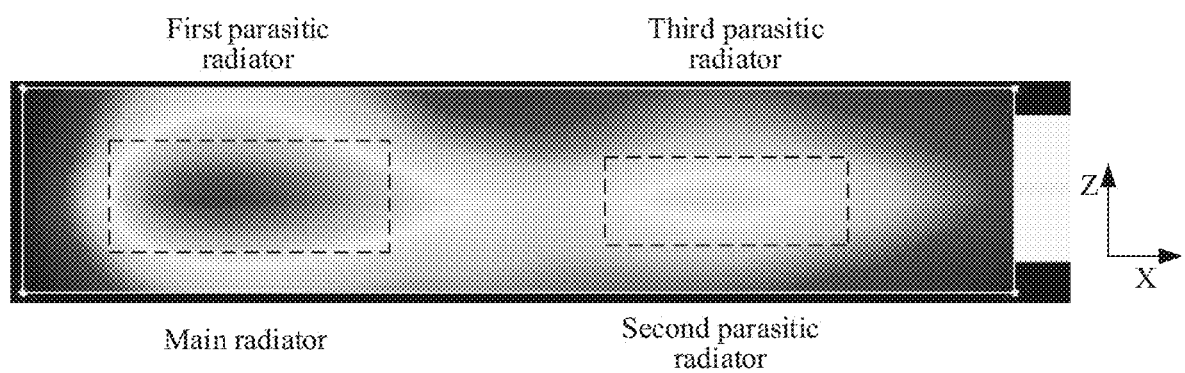

Refer to FIG. 4a to FIG. 5b. FIG. 4a and FIG. 4b are a distribution diagram of local currents of an antenna and a distribution diagram of local magnetic fields of the antenna in a state 1 obtained when a simulation effect test is performed on a foldable electronic device in a folded state according to Embodiment 1 of this application. FIG. 5a and FIG. 5b are a distribution diagram of local currents of an antenna and a distribution diagram of local magnetic fields of the antenna in a state 2 obtained when a simulation effect test is performed on a foldable electronic device in a folded state according to Embodiment 1 of this application. An operating frequency range of the antenna is 1.7 GHz to 1.9 GHz. For example, the operating frequency of the antenna is 1.8 GHz. In FIG. 4a to FIG. 5b, an X direction is parallel to a horizontal direction of the foldable electronic device, and a Z direction is parallel to a thickness direction of the foldable electronic device.

In FIG. 4a and FIG. 5a, an arrow represents a current direction on a corresponding radiator. As shown in FIG. 4a, currents generated on the main radiator, the first parasitic radiator, the second parasitic radiator, and the third parasitic radiator of the antenna are distributed in a same direction, and currents of the antenna are distributed in both the X direction and the Z direction. As shown in FIG. 4b, a magnetic field radiation region of the antenna is also dispersed into four regions, namely, regions shown in dashed boxes in the figure, which are four regions in which the main radiator, the first parasitic radiator, the second parasitic radiator, and the third parasitic radiator of the antenna are located.

As shown in FIG. 5a, a current generated by the second parasitic radiator and a current generated by the main radiator are in a same direction, and currents generated by the first parasitic radiator and the third parasitic radiator and the current generated by the main radiator are in a reverse direction. As shown in FIG. 5b, a magnetic field radiation region of the antenna is also dispersed into two regions, namely, regions shown in dashed boxes in the figure, which are two regions in which the main radiator and the second parasitic radiator of the antenna are located. In other words, by adding the second parasitic radiator, the current and the magnetic field radiation region of the antenna in the X direction are dispersed, increasing a radiation area of the antenna, thereby improving antenna efficiency and reducing a body SAR value.

It can be learned from the foregoing description that, compared with the case in which the antenna works in the state 2, in the case in which the antenna works in the state 1, adding the first parasitic radiator and the third parasitic radiator can disperse the current of the antenna and the magnetic field radiation region of the antenna, which is equivalent to increasing a width of the main radiator of the antenna and increasing a radiation area of the antenna, thereby improving antenna efficiency and reducing a body SAR value.

Figure 6:
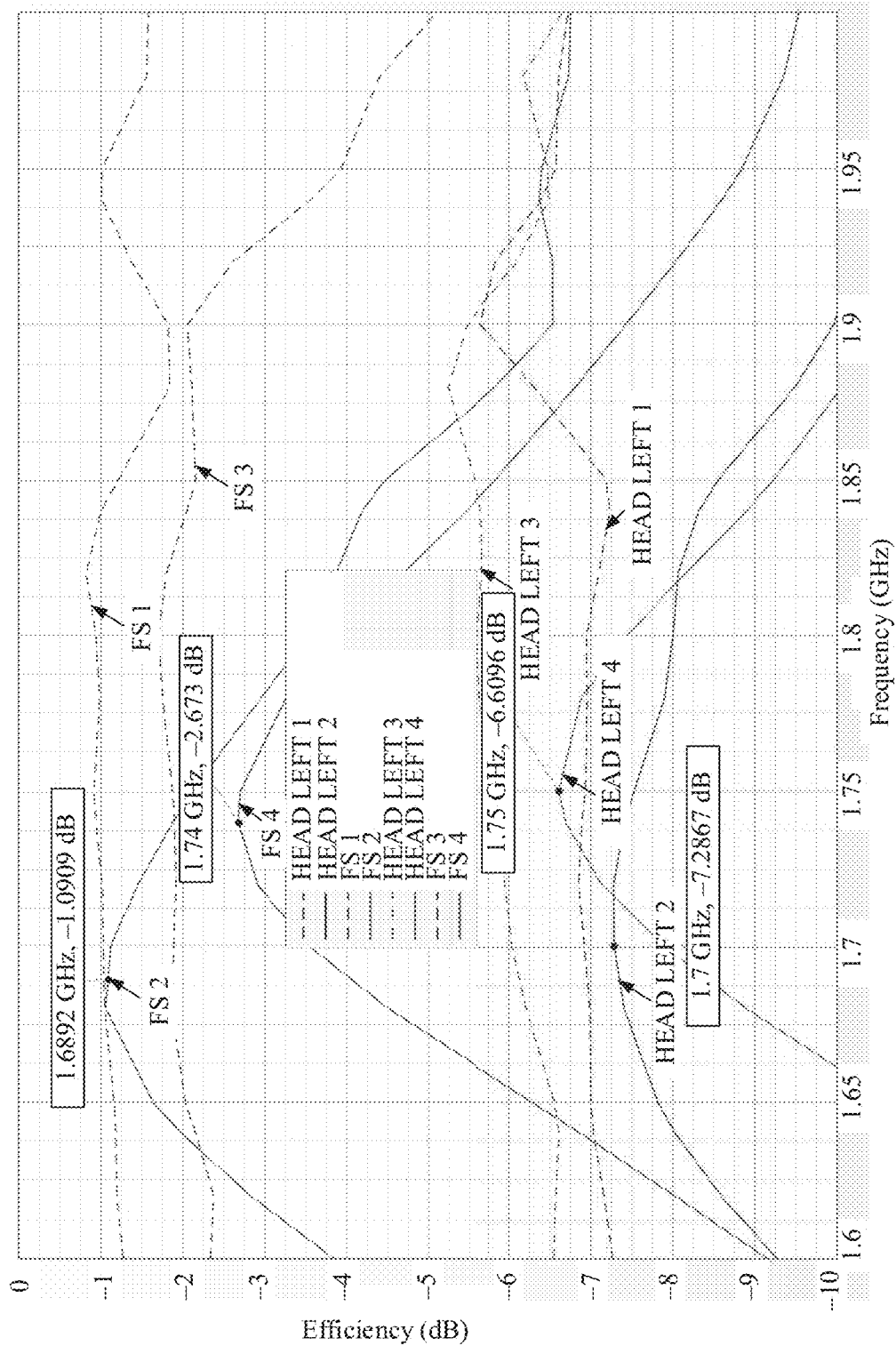
FIG. 6 is an effect curve graph of comparison between radiation efficiency and system efficiency of an antenna in a free space scenario and a head-left hand holding scenario obtained when a simulation effect test is performed on a foldable electronic device according to Embodiment 1 of this application.

Refer to FIG. 6. FIG. 6 is an effect curve graph of comparison between radiation efficiency and system efficiency of an antenna in a free space scenario and a head-left hand holding scenario obtained when a simulation effect test is performed on a foldable electronic device according to Embodiment 1 of this application. Refer to FIG. 6. A horizontal coordinate represents a frequency in a unit of GHz, and a vertical coordinate represents radiation efficiency and system efficiency of the antenna in a unit of dB. The radiation efficiency of the antenna is a value used to measure the radiation capability of the antenna. Loss caused by metal loss and dielectric loss affects the radiation efficiency. The system efficiency of the antenna is actual efficiency obtained under consideration of antenna port matching, that is, the system efficiency of the antenna is the actual efficiency (namely, efficiency) of the antenna. A person skilled in the art may understand that efficiency is generally represented by a percentage, and there is a corresponding conversion relationship between the efficiency and dB. The efficiency closer to 0 dB is better.

In FIG. 6, curves "HEAD LEFT 1" and "HEAD LEFT 2" respectively represent curves of radiation efficiency and system efficiency that vary with frequencies when a simulation test is performed on the antenna in the state 1 in a head-left hand holding scenario. Curves "FS 1" and "FS 2" respectively represent curves of radiation efficiency and system efficiency that vary with frequencies when a simulation test is performed on the antenna in the state 1 in a free space scenario. Curves "HEAD LEFT 3" and "HEAD LEFT 4" respectively represent curves of radiation efficiency and system efficiency that vary with frequencies when a simulation test is performed on the antenna in the state 2 in a head-left hand holding scenario. Curves "FS 3" and "FS 4" respectively represent curves of radiation efficiency and system efficiency that vary with frequencies when a simulation test is performed on the antenna in the state 2 in a free space scenario.

FS represents free space, full name in English "Free Space". That is, an FS scenario represents a free space scenario. The head-left hand holding scenario is a BHHL (full name in English "Beside Head Hand Left") scenario. The head-hand holding scenario is a BHH (full name in English "Beside Head Hand") scenario. The head-right hand holding scenario is a BHHR (full name in English "Beside Head Hand Right") scenario.

It can be learned from FIG. 6 that, in the state 1 (that is, the first parasitic radiator and the third parasitic radiator have a parasitic radiation effect on the main radiator), when a simulation test is performed in a head-left hand holding scenario, a maximum value of the system efficiency (namely, efficiency) of the antenna is −7.3 dB. In this case, the operating frequency of the antenna is 1.7 GHz. In the state 1, when a simulation test is performed in a free space scenario, a maximum value of the system efficiency (namely, efficiency) of the antenna is −1 dB. In this case, the operating frequency of the antenna is 1.69 GHz (about 1.7 GHz). In other words, in the state 1, compared with the free space scenario, in the simulation test in the head-left hand holding scenario, the maximum value of the system efficiency (namely, efficiency) of the antenna is reduced by 6.3 dB, that is, a head-hand holding reduction amplitude is 6.3 dB.

In the state 2 (that is, the first parasitic radiator and the third parasitic radiator have no parasitic radiation effect on the main radiator), when a simulation test is performed in a head-left hand holding scenario, a maximum value of the system efficiency (namely, efficiency) of the antenna is −6.6 dB. In this case, the operating frequency of the antenna is 1.75 GHz. In the state 2, when a simulation test is performed in a free space scenario, a maximum value of the system efficiency (namely, efficiency) of the antenna is −2.7 dB. In this case, the operating frequency of the antenna is 1.74 GHz (about 1.75 GHz). In other words, in the state 2, compared with the free space scenario, in the simulation test in the head-left hand holding scenario, the maximum value of the system efficiency (namely, efficiency) of the antenna is reduced by 3.9 dB, that is, a head-hand holding reduction amplitude is 3.9 dB.

It can be learned from the foregoing description that, when a simulation test is performed in a head-hand holding scenario, compared with the state 2, in the state 1, the maximum value of the system efficiency (namely, efficiency) of the antenna is reduced by 0.7 dB. When a simulation test is performed in a free space scenario, compared with the state 2, in the state 1, the maximum value of the system efficiency (namely, efficiency) of the antenna is increased by 1.7 dB. In other words, when the antenna is in the state 1 and used in the free space scenario, the antenna efficiency is better. That is, when the foldable electronic device is in the free space scenario, and the antenna is in the state 1, the antenna efficiency of the foldable electronic device is greatly improved. In the state 2, compared with the state 1, the head-hand holding reduction amplitude decreases from 6.3 dB to 3.9 dB. In other words, when the antenna is in the state 2, the head-hand holding reduction amplitude is lower, that is, the radiation performance attenuation degree of the foldable electronic device is reduced.

The following Table 2 shows antenna performance-related parameters in a free space scenario and a head-left hand holding scenario that are obtained in a state 1 and a state 2 when a simulation effect test is performed on the foldable electronic device according to Embodiment 1 of this application. The conduction power 24 dBm indicates that input power of the antenna is set to 24 dBm. The "HEAD SAR (normalized to −5 dB)" indicates a head SAR value measured when the antenna efficiency is normalized and reduced to −5 dB. The "5 mm Body SAR (normalized to −5 dB)" indicates a body SAR value measured when the antenna efficiency is normalized and reduced to −5 dB. A 5 mm Body SAR value indicates an average specific absorption rate of a body when the foldable electronic device is 5 mm away from the body.

FS represents a free space scenario, BHHL represents a head-left hand holding scenario, and a head-hand reduction amplitude represents a head-hand holding reduction amplitude. The head-hand touch after calculation of SAR(0.5) (OTA) indicates transmit power of the foldable electronic device in the head-hand holding scenario when the head SAR value is ensured to be 0.5 W/kg. OTA (an air download technology test, Over The Air) indicates a test about radiation performance of electronic devices. The hand touch after calculation of body SAR(0.9) (OTA) indicates transmit power of the foldable electronic device in the handheld scenario when the body SAR value is ensured to be 0.9 W/kg.

It can be learned from the following Table 2 that, in the state 1 (that is, the first parasitic radiator and the third parasitic radiator have a parasitic radiation effect on the main radiator), when a simulation test is performed in a left-head-hand holding scenario, a head SAR value is 0.7 W/kg. In the state 2 (that is, the first parasitic radiator and the third parasitic radiator have no parasitic radiation effect on the main radiator), when a simulation test is performed in a head-left hand holding scenario, a head SAR value is 0.43 W/kg. That is, in the head-left hand holding scenario, when the antenna is in the state 2, compared with the state 1, the head SAR value decreases from 0.7 W/kg to 0.43 W/kg, indicating that the head SAR value is reduced.

In the state 1 (that is, the first parasitic radiator and the third parasitic radiator have a parasitic radiation effect on the main radiator), when a simulation test is performed in a free space scenario, a body SAR value is 1.2 W/kg. In the state 2 (that is, the first parasitic radiator and the third parasitic radiator have no parasitic radiation effect on the main radiator), when a simulation test is performed in a free space scenario, a head SAR value is 1.8 W/kg. That is, in the free space scenario, when the antenna is in the state 1, compared with the state 2, the head SAR value decreases from 1.8 W/kg to 1.2 W/kg, indicating that the body SAR value is reduced.

component 710 switches to the second matching branch 720 including the inductor L21 whose inductance value is 8 nH. In the state 1, only the second parasitic radiator 430 has a parasitic radiation effect on the main radiator 410, but the first parasitic radiator 420 and the third parasitic radiator 440 have no parasitic radiation effect on the main radiator 410.

State 2: The first switch component 610 switches to the first matching branch 630 including the inductor L1 whose inductance value is 10 nH, and the third switch component 810 switches to the third matching branch 820 of 0 ohms. The main switch component 510 switches to the main matching branch 520 including the inductor L01 whose inductance value is 15 nH, and the second switch component 710 switches to the second matching branch 720 including the inductor L21 whose inductance value is 8 nH. In the state 2, only the second parasitic radiator 430 and the first parasitic radiator 420 have a parasitic radiation effect on the main radiator 410, but the third parasitic radiator 440 has no parasitic radiation effect on the main radiator 410.

State 3: The first switch component 610 switches to the first matching branch 630 including the inductor L1 whose inductance value is 10 nH, and the third switch component 810 switches to the third matching branch 830 including the inductor L3 whose inductance value is 15 nH. The main switch component 510 switches to the main matching branch 530 including the inductor L02 whose inductance value is 4 nH, and the second switch component 710 switches to the second matching branch 730 including the inductor L22 whose inductance value is 2 nH. In the state 3, the first parasitic radiator 420, the second parasitic radiator 430, and the third parasitic radiator 440 all have a parasitic radiation effect on the main radiator 410.

TABLE 2

| Conduction power 24 dBm | State 1 | | | | | State 2 | | | | |
| --- | --- | --- | --- | --- | --- | --- | --- | --- | --- | --- |
| | FS | BHHL | Head-hand reduction amplitude | Head-hand touch after calculation of SAR(0.5) (OTA) | Hand touch after calculation of body SAR(0.9) (OTA) | FS | BHHL | Head-hand reduction amplitude | Hand touch after calculation of SAR (OTA) | Hand touch calculation of body SAR(0.9) (OTA) |
| Antenna efficiency (B3) | −1 | −7.3 | 6.3 | 10.3 | 17.3 | −2.7 | −6.6 | 4 | 14.7 | 15.5 |
| HEAD SAR (normalized to −5 dB) | | 0.7 | | 0.4 | | | 0.43 | | 0.4 | |
| 5 mm Body SAR (normalized to −5 dB) | 1.2 | | | | 0.9 | 1.8 | | | | 0.9 |

To more specifically describe impact of the first parasitic radiator and the third parasitic radiator on antenna performance, with reference to FIG. 3, the following performs a simulation test through switch between the first switch component 610 and the third switch component 810 by using an example in which the antenna is in three states, and simulation effect diagrams shown in FIG. 7a to FIG. 10c are obtained.

Figure 7A:
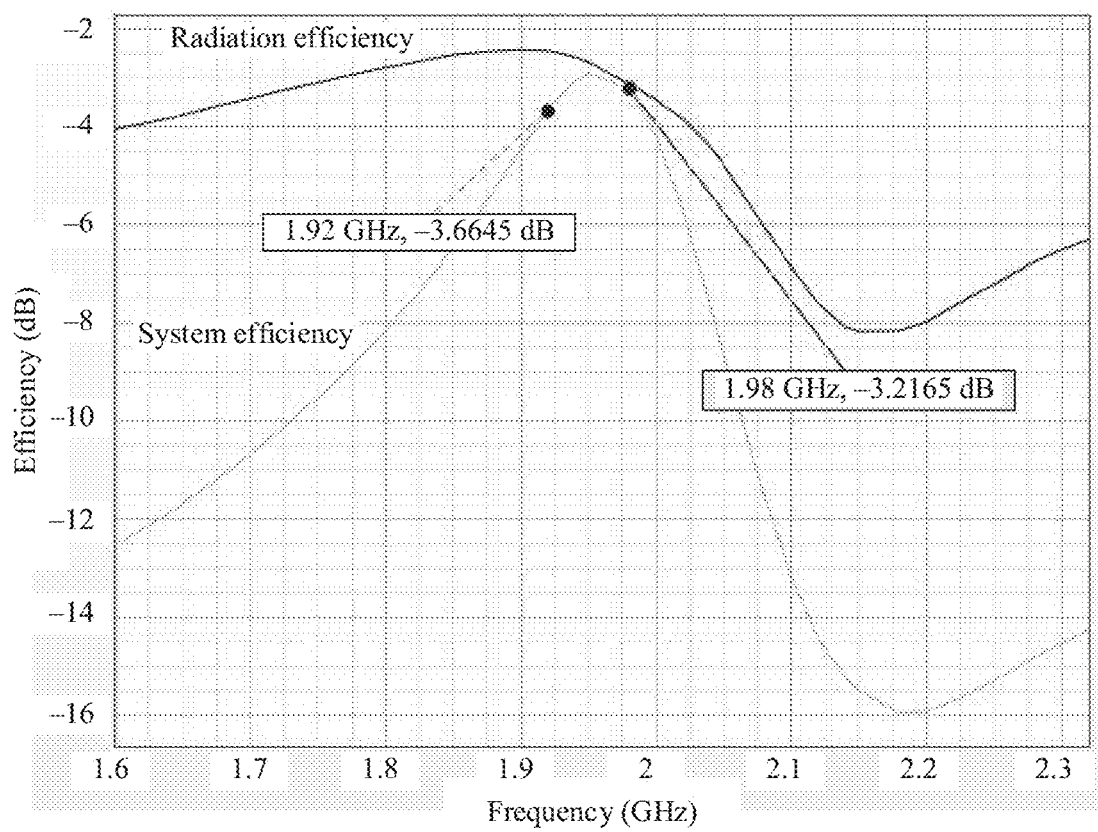
FIG. 7a to FIG. 7c are effect curve graphs of antenna efficiency obtained in three different simulation states when a simulation effect test is performed on a foldable electronic device according to Embodiment 1 of this application.
Figure 7B:
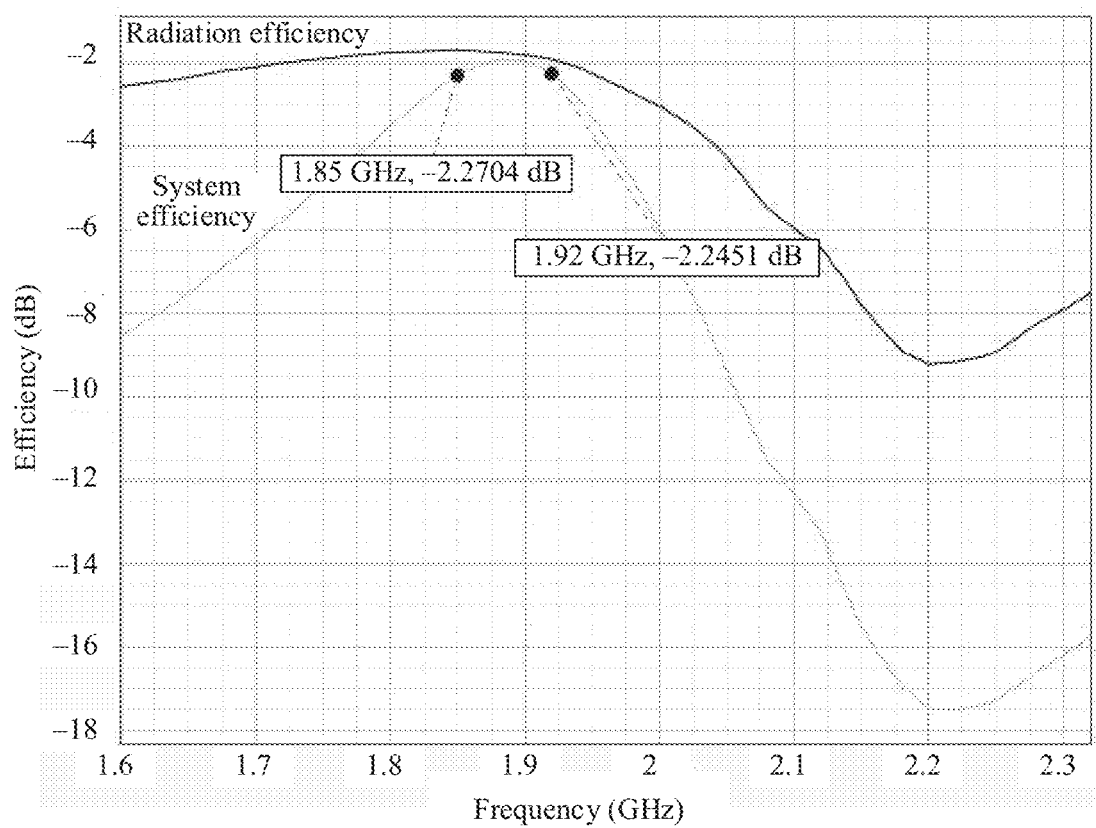
Figure 7C:
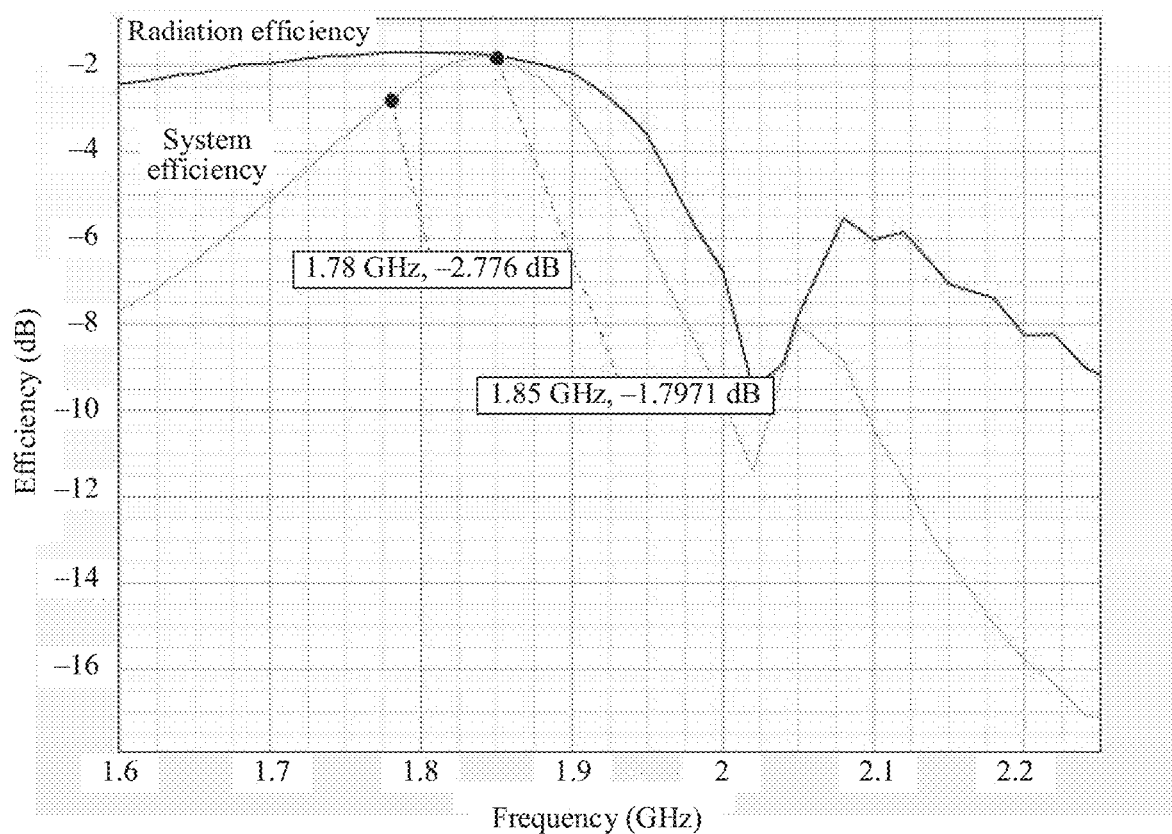

State 1: The first switch component 610 switches to the first matching branch 620 of 0 ohms, and the third switch component 810 switches to the third matching branch 820 of 0 ohms. The main switch component 510 switches to the main matching branch 520 including the inductor L01 whose inductance value is 15 nH, and the second switch Refer to FIG. 7a to FIG. 7c. FIG. 7a to FIG. 7c are effect curve graphs of antenna efficiency obtained in three different simulation states when a simulation test is performed in a free space scenario. FIG. 7a is an effect curve graph of antenna efficiency obtained in a state 1. FIG. 7b is an effect curve graph of antenna efficiency obtained in a state 2. FIG. 7c is an effect curve graph of antenna efficiency obtained in a state 3.

As shown in FIG. 7a, two curves in the figure respectively represent curves of radiation efficiency and system efficiency that vary with frequencies when a simulation test is performed on the antenna is in the state 1 in the free space scenario. It can be learned from FIG. 7a that, based on the simulation test performed in the free space scenario in the state 1, when the operating frequency of the antenna is 1.92 GHz, the system efficiency (namely, efficiency) of the antenna is −3.6645 dB. When the operating frequency of the antenna is 1.98 GHz, the system efficiency (namely, efficiency) of the antenna is −3.2165 dB.

As shown in FIG. 7b, two curves in the figure respectively represent curves of radiation efficiency and system efficiency that vary with frequencies when a simulation test is performed on the antenna is in the state 2 in the free space scenario. It can be learned from FIG. 7b that, based on the simulation test performed in the free space scenario in the state 2, when the operating frequency of the antenna is 1.85 GHz, the system efficiency (namely, efficiency) of the antenna is −2.2704 dB. When the operating frequency of the antenna is 1.92 GHz, the system efficiency (namely, efficiency) of the antenna is −2.2451 dB.

As shown in FIG. 7c, two curves in the figure respectively represent curves of radiation efficiency and system efficiency that vary with frequencies when a simulation test is performed on the antenna is in the state 3 in the free space scenario. It can be learned from FIG. 7c that, based on the simulation test performed in the free space scenario in the state 3, when the operating frequency of the antenna is 1.78 GHz, the system efficiency (namely, efficiency) of the antenna is −2.2776 dB. When the operating frequency of the antenna is 1.85 GHz, the system efficiency (namely, efficiency) of the antenna is −1.7971 dB.

It can be learned from the foregoing description that, compared with the state 1, in the state 2, that is, the first parasitic radiator is added to have a parasitic radiation effect on the main radiator based on a parasitic radiation effect of the second parasitic radiator on the main radiator, when the operating frequency of the antenna is 1.92 GHz, the system efficiency (namely, efficiency) of the antenna is improved by 1.4194 dB. Compared with the state 2, in the state 3, that is, the third parasitic radiator is further added to have a parasitic radiation effect on the main radiator based on a parasitic radiation effect of the first parasitic radiator and the second parasitic radiator on the main radiator, when the operating frequency of the antenna is 1.85 GHz, the system efficiency (namely, the efficiency) of the antenna can be further improved by 0.4733 dB. In other words, after the first parasitic radiator and the third parasitic radiator have a parasitic radiation effect on the main radiator, the system efficiency of the antenna can be improved.

Figure 8A:
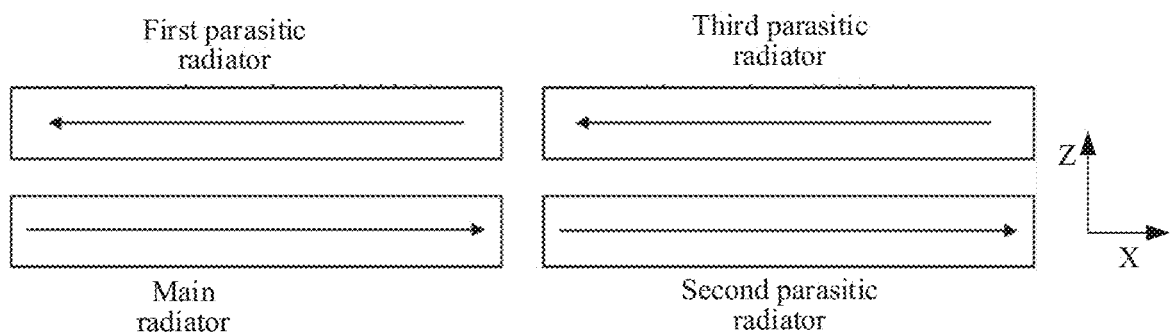
FIG. 8a to FIG. 8c are distribution diagrams of local currents of an antenna obtained in three different simulation states when a simulation effect test is performed on a foldable electronic device according to Embodiment 1 of this application.
Figure 8B:
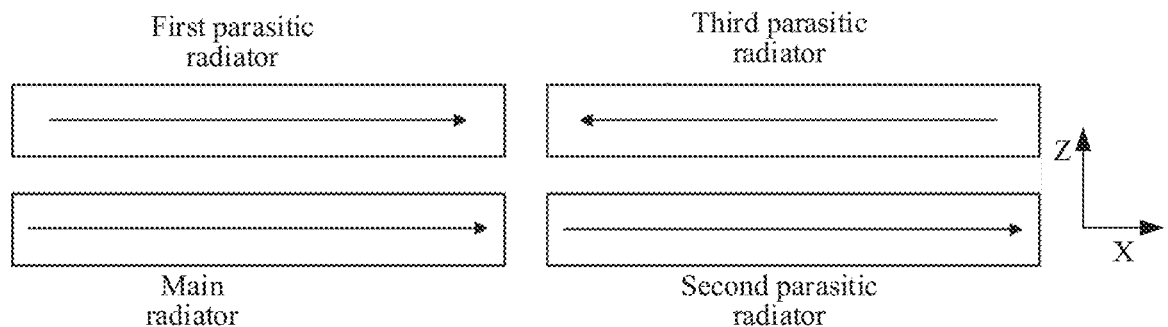
Figure 8C:
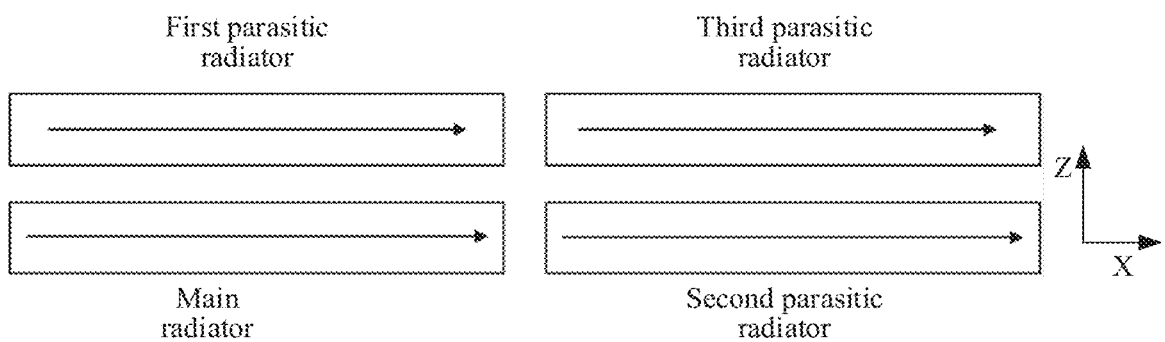
Figure 9A:
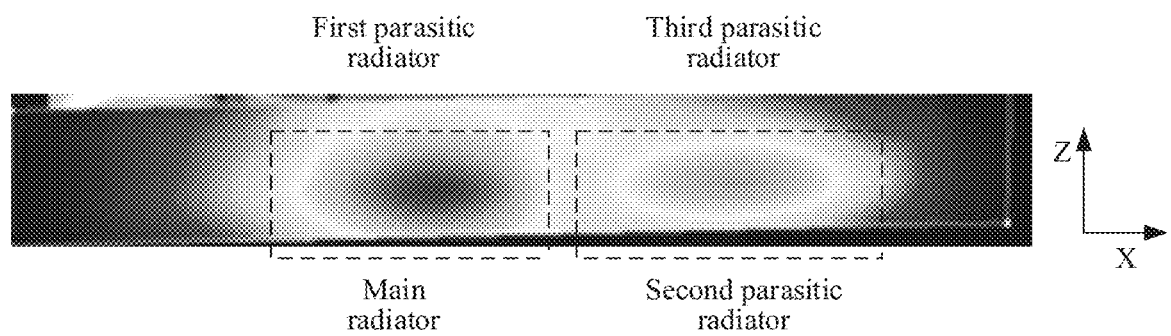
FIG. 9a to FIG. 9c are distribution diagrams of local magnetic fields of an antenna obtained in three different simulation states when a simulation effect test is performed on a foldable electronic device according to Embodiment 1 of this application.
Figure 9B:
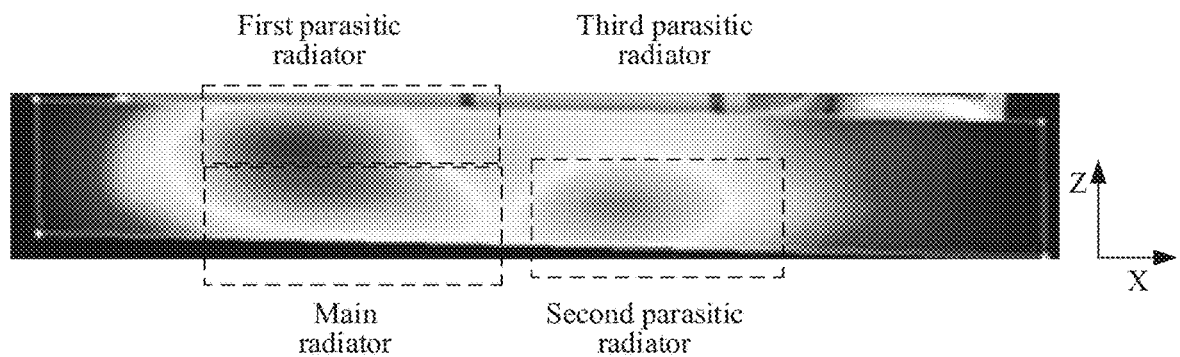
Figure 9C:
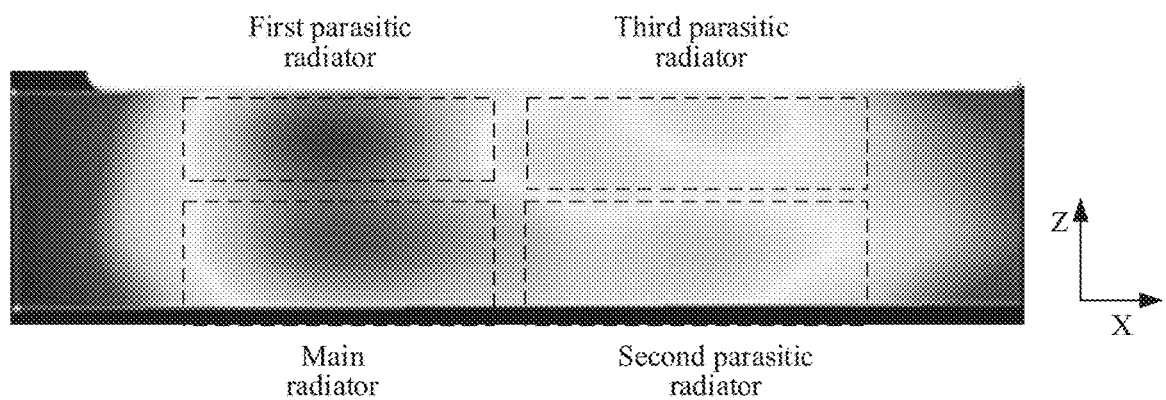
Figure 10A:
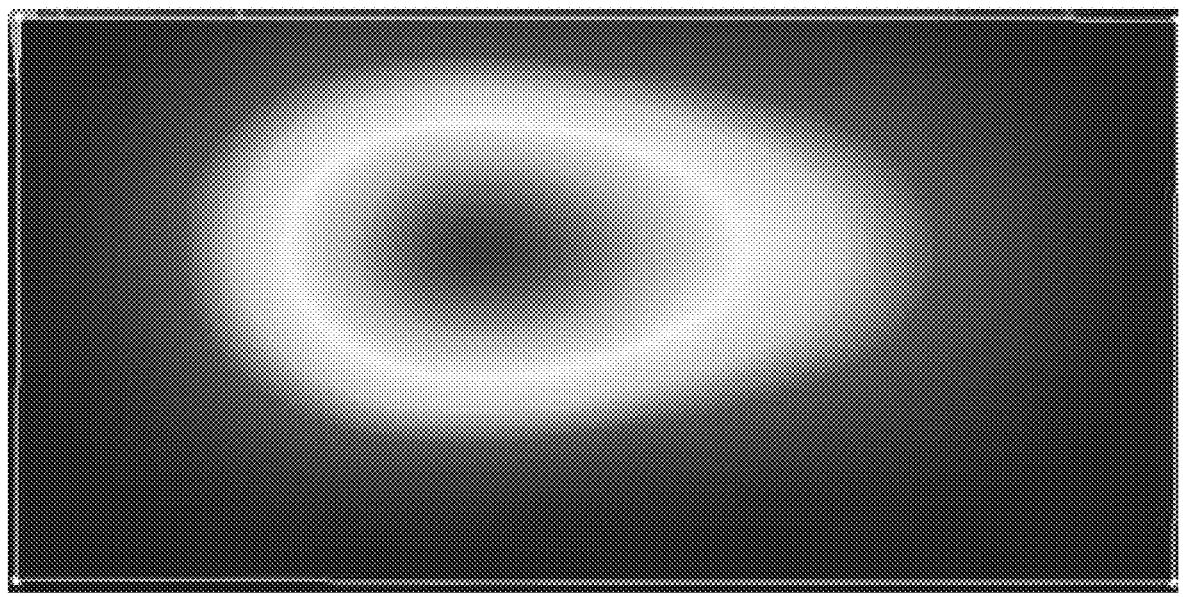
FIG. 10a to FIG. 10c are distribution diagrams of antenna hotspots obtained in three different simulation states when a simulation effect test is performed on a foldable electronic device according to Embodiment 1 of this application.
Figure 10B:
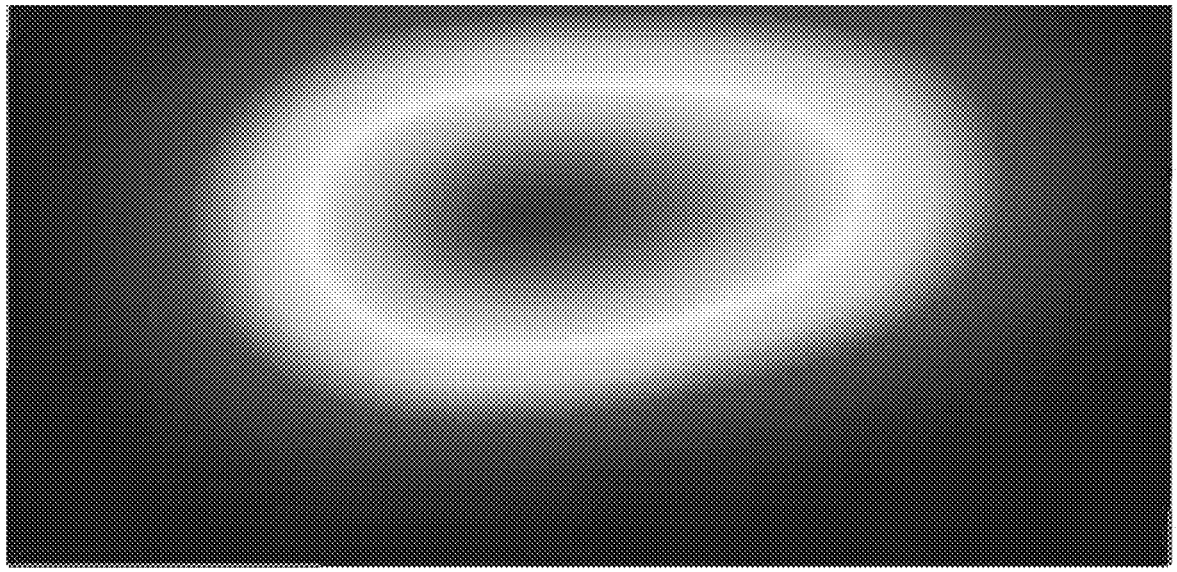
Figure 10C:
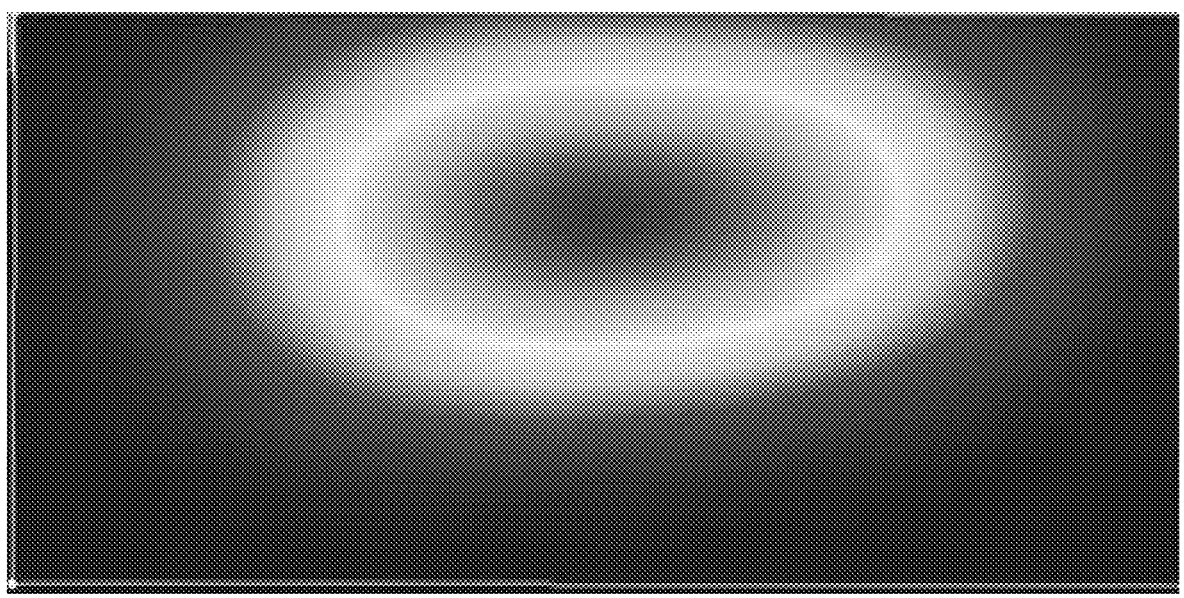

Refer to FIG. 8a to FIG. 10c. FIG. 8a to FIG. 8c are schematic diagrams of local current distribution of an antenna in a state 1, a state 2, and a state 3. FIG. 9a to FIG. 9c are distribution diagrams of local magnetic fields of an antenna obtained in a state 1, a state 2, and a state 3. FIG. 10a to FIG. 10c are distribution diagrams of antenna hotspots obtained in a state 1, a state 2, and a state 3. A hotspot indicates a region radiated by the antenna. An SAR value is a maximum value in a hotspot. An operating frequency range of the antenna is 1.7 GHz to 1.9 GHz. For example, the operating frequency of the antenna is 1.8 GHz. In FIG. 8a to FIG. 10c, an X direction is parallel to a horizontal direction of the foldable electronic device, and a Z direction is parallel to a thickness direction of the foldable electronic device.

In FIG. 8a to FIG. 8c, an arrow represents a current direction on a corresponding radiator. As shown in FIG. 8a, in the state 1, a current generated by the second parasitic radiator and a current generated by the main radiator are in a same direction, and currents generated by the first parasitic radiator and the third parasitic radiator and the current generated by the main radiator are in a reverse direction. As shown in FIG. 8b, in the state 2, currents generated by the first parasitic radiator and the second parasitic radiator and the current generated by the main radiator are in a same direction, and a current generated by the third parasitic radiator and the current generated by the main radiator are in a reverse direction. As shown in FIG. 8c, in the state 3, currents generated on the main radiator, the first parasitic radiator, the second parasitic radiator, and the third parasitic radiator of the antenna are distributed in a same direction, and currents of the antenna are distributed in both the X direction and the Z direction.

As shown in FIG. 9a, in the state 1, a magnetic field radiation region of the antenna is dispersed into two regions, namely, regions shown in dashed boxes in the figure, which are two regions in which the main radiator and the second parasitic radiator of the antenna are located. As shown in FIG. 9b, in the state 2, a magnetic field radiation region of the antenna is dispersed into three regions, namely, regions shown in dashed boxes in the figure, which are three regions in which the main radiator, the first parasitic radiator, and the second parasitic radiator of the antenna are located. As shown in FIG. 9c, in the state 3, a magnetic field radiation region of the antenna is also dispersed into four regions, namely, regions shown in dashed boxes in the figure, which are four regions in which the main radiator, the first parasitic radiator, the second parasitic radiator, and the third parasitic radiator of the antenna are located.

It can be learned from the foregoing description that adding the first parasitic radiator and/or the third parasitic radiator can disperse the current of the antenna and the magnetic field radiation region of the antenna, which is equivalent to increasing a width of the main radiator of the antenna and increasing a radiation area of the antenna, thereby improving antenna efficiency and reducing a body SAR value.

As shown in FIG. 10a to FIG. 10c, hotspots of the antenna in FIG. 10a are most concentrated, and hotspots of the antenna in FIG. 10c are most scattered. It can be learned that, after the first parasitic radiator and the third parasitic radiator have a parasitic radiation effect on the main radiator, the hotspots of the antenna can be more scattered, so that a body SAR value can be reduced.

The following Table 3 shows antenna performance-related parameters in a free space scenario obtained in a state 1, a state 2, and a state 3. In the figure, the "parasitic 2" indicates that in the state 1, only the second parasitic radiator has a parasitic radiation effect on the main radiator. The "parasitic 1+parasitic 2" indicates that in the state 2, the first parasitic radiator and the second parasitic radiator have a parasitic radiation effect on the main radiator. The "parasitic 1+parasitic 2+parasitic 3" indicates that in the state 3, the first parasitic radiator, the second parasitic radiator, and the third parasitic radiator have a parasitic radiation effect on the main radiator. 1 g indicates that a tissue fluid is tested in a unit volume of 1 g (equivalent to 1 $cm^3$). 10 g indicates that a tissue fluid is tested in a unit volume of 10 g (equivalent to 10 $cm^3$).

The "head SAR" indicates a head SAR value. The "normalized head SAR" indicates a head SAR value measured when the antenna efficiency is normalized and reduced to −5 dB. The "normalized 5 mm body SAR" indicates a body SAR value measured when the antenna efficiency is normalized and reduced to −5 dB. The "right head touch" indicates a scenario in which a right side of the head is in contact with the foldable electronic device. The "left head touch" indicates a scenario in which a left side of the head is in contact with the foldable electronic device. The "5 mm backside" indicates a scenario in which a back of the foldable electronic device is 5 mm away from the body. The "0 mm backside" indicates a scenario in which a back of the foldable electronic device is in contact with the body. The "5 mm bottomside" indicates a scenario in which a bottom portion of the foldable electronic device is 5 mm away from the body. The "0 mm bottomside" indicates a scenario in which a bottom portion of the foldable electronic device is in contact with the body. The "5 mm topside" indicates a scenario in which a top portion of the foldable electronic device is 5 mm away from the body. The "0 mm topside"

It can be learned that adding the first parasitic radiator has a parasitic radiation effect on the main radiator. When the operating frequency of the antenna is 1.85 GHz, the body SAR value can be reduced to 1.33 W/kg. When the operating frequency of the antenna is 1.92 GHz, the body SAR value can be reduced to 1.53 W/kg. In addition, adding the first parasitic radiator and the third radiator has a parasitic radiation effect on the main radiator. When the operating frequency of the antenna is 1.78 GHz, the body SAR value can be reduced to 1.31 W/kg. When the operating frequency of the antenna is 1.85 GHz, the body SAR value can be reduced to 1.21 W/kg.

TABLE 3

| Input power 24 dBm | Resonant frequency | Parasitic 2 | | | | Parasitic 1 + Parasitic 2 | | | | Parasitic 1 + Parasitic 2 + Parasitic 3 | | | |
|---|---|---|---|---|---|---|---|---|---|---|---|---|---|
| | | 1.92 GHz | | 1.98 GHz | | 1.85 GHz | | 1.92 GHz | | 1.78 GHz | | 1.85 GHz | |
| | | 1 g | 10 g | 1 g | 10 g | 1 g | 10 g | 1 g | 10 g | 1 g | 10 g | 1 g | 10 g |
| | FS simulation efficiency | −3.6645 | | −3.2165 | | −2.2704 | | 2.245 | | −2.776 | | −1.791 | |
| head SAR | right head touch | | | | | | | | | | | | |
| | left head touch | | | | | | | | | | | | |
| body SAR | 5 mm backside | | | | | | | | | | | | |
| | 0 mm backside | | | | | | | | | | | | |
| | 5 mm bottomside | 2.21 | | 2.78 | | 2.50 | | 2.88 | | 2.19 | | 2.52 | |
| | 0 mm bottomside | | | | | | | | | | | | |
| Normalization efficiency | | −5 | −5 | −5 | −5 | −5 | −5 | −5 | −5 | −5 | −5 | −5 | −5 |
| Normalized head SAR | right head touch | 0.00 | 0.00 | 0.00 | 0.00 | 0.00 | 0.00 | 0.00 | 0.00 | 0.00 | 0.00 | 0.00 | 0.00 |
| | left head touch | 0.00 | 0.00 | 0.00 | 0.00 | 0.00 | 0.00 | 0.00 | 0.00 | 0.00 | 0.00 | 0.00 | 0.00 |
| Normalized 5 mm body SAR | 5 mm backside | 0.00 | 0.00 | 0.00 | 0.00 | 0.00 | 0.00 | 0.00 | 0.00 | 0.00 | 0.00 | 0.00 | 0.00 |
| | 0 mm backside | 0.00 | 0.00 | 0.00 | 0.00 | 0.00 | 0.00 | 0.00 | 0.00 | 0.00 | 0.00 | 0.00 | 0.00 |
| | 5 mm topside | 0.00 | 1.62 | 0.00 | 1.85 | 0.00 | 1.33 | 0.00 | 1.53 | 0.00 | 1.31 | 0.00 | 1.21 |
| | 0 mm topside | 0.00 | 0.00 | 0.00 | 0.00 | 0.00 | 0.00 | 0.00 | 0.00 | 0.00 | 0.00 | 0.00 | 0.00 | indicates a scenario in which a top portion of the foldable electronic device is in contact with the body.

It can be learned from the following Table 3 that, in the state 1, in the free space scenario, based on the top portion of the foldable electronic device being 5 mm away from the body, when the operating frequency of the antenna is 1.92 GHz, the body SAR value is 1.62 W/kg; and when the operating frequency of the antenna is 1.98 GHz, the body SAR value is 1.85 W/kg. In the state 2, in the free space scenario, based on the top portion of the foldable electronic device being 5 mm away from the body, when the operating frequency of the antenna is 1.85 GHz, the body SAR value is 1.33 W/kg; and when the operating frequency of the antenna is 1.92 GHz, the body SAR value is 1.53 W/kg. In the state 3, in the free space scenario, based on the top portion of the foldable electronic device being 5 mm away from the body, when the operating frequency of the antenna is 1.78 GHz, the body SAR value is 1.31 W/kg; and when the operating frequency of the antenna is 1.85 GHz, the body SAR value is 1.21 W/kg.

Embodiment 2

Figure 11:
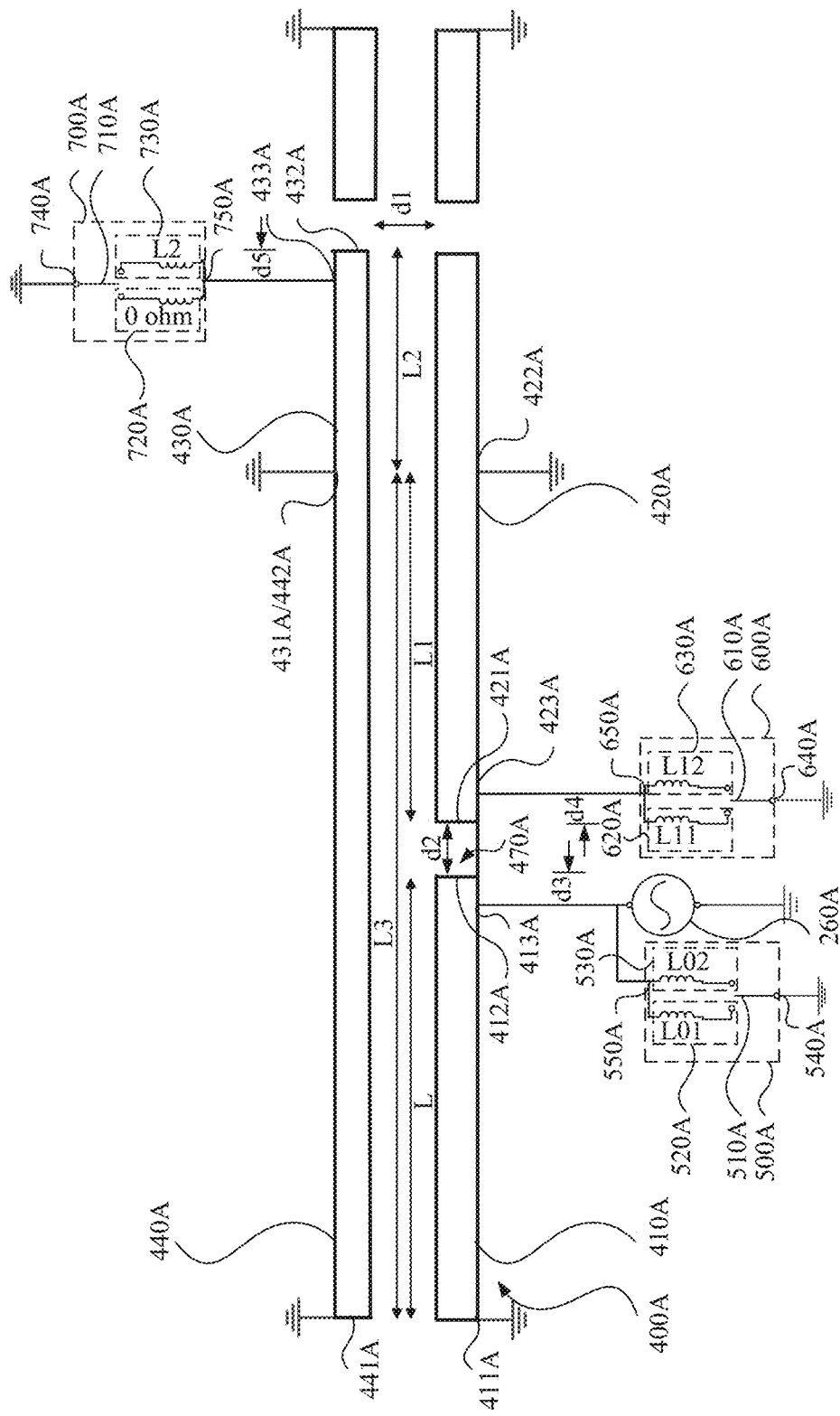
FIG. 11 is a schematic diagram of a structure of an antenna of a foldable electronic device in a folded state according to Embodiment 2 of this application.

Refer to FIG. 11. FIG. 11 is a schematic diagram of a structure of an antenna 400A of a foldable electronic device in a folded state according to Embodiment 2 of this application. A structure of the foldable electronic device in this embodiment is basically the same as the structure of the foldable electronic device in Embodiment 1. A difference lies in that the antenna 400A of the foldable electronic device is different. Specifically, the antenna 400A includes a main radiator 410A, a first parasitic radiator 420A, a second parasitic radiator 430A, and an isolating portion 440A The main radiator 410A and the first parasitic radiator 420A are disposed on a first device body (not shown in the figure). The second parasitic radiator 430A, the isolating portion 440A, and an earpiece are disposed on a second device body (not shown in the figure). The main radiator 410A is connected to a radio frequency source 260A of the foldable electronic device, so that a radio frequency signal sent from the radio frequency source 260A is directly fed or coupling-fed to the main radiator 410A through a feeder line.

The main radiator 410A, the first parasitic radiator 420A, the second parasitic radiator 430A, and the isolating portion 440A are all in a strip shape and have a first end and a second end. Specifically, the main radiator 410A, the first parasitic radiator 420A, the second parasitic radiator 430A, and the isolating portion 440A are all in a straight strip shape, that is, extend in a straight line shape. The main radiator 410A has a first end 411A and a second end 412A. The first parasitic radiator 420A has a first end 421A and a second end 422A. The second parasitic radiator 430A has a first end 431A and a second end 432A. The isolating portion 440A has a first end 441A and a second end 442A. Certainly, a person skilled in the art may understand that, in another alternative implementation, the main radiator 410A, the first parasitic radiator 420A, the second parasitic radiator 430A, and the isolating portion 440A may be in a bent strip-shaped structure, for example, an L strip-shaped structure, which is not limited to a straight strip-shaped structure.

The main radiator 410A and the first parasitic radiator 420A are disposed at an interval in a longitudinal end-to-end manner. Specifically, the main radiator 410A and the first parasitic radiator 420A are arranged in a straight line. The first end 411A of the main radiator 410A is connected to the ground of the first device body, and is specifically connected to a ground plate (not shown in the figure) of the first device body. The main radiator 410A has a feed point 413A. The feed point 413A is located at a position close to the second end 412A of the main radiator 410A, and the feed point 413A is connected to the radio frequency source 260A. The second end 412A of the main radiator 410A and the first end 421A of the first parasitic radiator 420A are relatively close, and have a gap 470A. The main radiator 410A is coupled to the first parasitic radiator 420A through the gap 470A. The second end 422A of the first parasitic radiator 420A and the first end 411A of the main radiator 410A are relatively far away from each other, and are connected to the ground of the first device body, and is specifically connected to the ground plate (not shown in the figure) of the first device body. A person skilled in the art may understand that the ground plate is a type of ground. In this embodiment, the ground plate is used as an example of the ground for description.

In addition, the isolating portion 440A and the first parasitic radiator 420A are arranged in a straight line. The first end 441A and the second end 442A of the isolating portion 440A are respectively connected to the ground of the second device body, and are specifically connected to a ground plate of the second device body. The second end 442A of the isolating portion 440A is connected to the first end 431A of the second parasitic radiator 430A, and the second end 432A of the second parasitic radiator 430A is a free end.

When the foldable electronic device is in the folded state, the isolating portion 440A is disposed relative to the main radiator 410A and the first parasitic radiator 420A respectively in a side direction at an interval. In a length direction of the first parasitic radiator 420A, the first end 431A of the second parasitic radiator 430A is flush with the second end 422A of the first parasitic radiator 420A, and the second parasitic radiator 430A is coupled to the first parasitic radiator 420A. Certainly, a person skilled in the art may understand that, in another alternative implementation, in the length direction of the first parasitic radiator 420A, the first end 431A of the second parasitic radiator 430A may be located between the second end 422A and the first end 421A of the first parasitic radiator 420A, and close to the second end 422A of the first parasitic radiator 420A. A person skilled in the art may understand that, that the isolating portion 440A is disposed relative to the main radiator 410A and the first parasitic radiator 420A respectively in a side direction at an interval means that a side of the isolating portion 440A is disposed relative to a side of the main radiator 410A and a side of the first parasitic radiator 420A respectively.

When the foldable electronic device is in the folded state, the isolating portion 440A is disposed parallel to the main radiator 410A and the first parasitic radiator 420A respectively. In addition, the second parasitic radiator 430A and the first parasitic radiator 420A are disposed in parallel. The first end 441A of the isolating portion 440A is aligned with the first end 411A of the main radiator 410A.

In this embodiment, the isolating portion 440A can block and isolate radiation of the main radiator 410A and the first parasitic radiator 420A of the antenna 400A toward the isolating portion 440A. Therefore, when the antenna 400A is located on the top portion of the foldable electronic device, in a head-hand holding scenario, a head SAR value of the antenna is reduced, and a radiation performance attenuation degree of the foldable electronic device is reduced, that is, a head-hand holding reduction amplitude is reduced, thereby improving radiation performance of the foldable electronic device in the head-hand holding scenario. In other words, antenna performance in the head-hand holding scenario when the foldable electronic device is in the folded state is improved.

In addition, the first parasitic radiator 420A is coupled to the main radiator 410A, and the second parasitic radiator 430A is coupled to the first parasitic radiator 420A, so that a body SAR value is reduced, and antenna efficiency is improved, increasing transmit power of the antenna, thereby improving antenna performance in a free space scenario or a handheld scenario when the foldable electronic device is in the folded state.

Further, a distance between the feed point 413A and the second end 412A of the main radiator 410A is 1.5 mm to 3 mm. In this way, a coupling requirement between the main radiator 410A and the first parasitic radiator 420A can be better satisfied.

In addition, a width of the gap 470A is less than or equal to 2 mm, so that an appearance design requirement of the foldable electronic device can be satisfied. Certainly, a person skilled in the art may understand that the width of the gap 470A may be set to be greater than 2 mm based on an actual requirement.

Still further, in the length direction of the first parasitic radiator 420A, a distance between the first end 431A of the second parasitic radiator 430A and the second end 422A of the first parasitic radiator 420A is greater than or equal to 0 mm, and is less than or equal to 2 mm. In this way, a coupling requirement between the second parasitic radiator 430A and the first parasitic radiator 420A can be better satisfied.

In a thickness direction of the foldable electronic device, a distance between the first parasitic radiator 420A and the isolating portion 440A is 2 mm to 4 mm. In this way, coupling strength between the first parasitic radiator 420A and the second parasitic radiator 430A can be ensured.

In addition, a resonant frequency of the main radiator 410A is associated with a length of the main radiator 410A. A resonant frequency of the first parasitic radiator 420A is associated with a length of the first parasitic radiator 420A. A resonant frequency of the second parasitic radiator 430A is associated with a length of the second parasitic radiator 430A. As the length of the main radiator 410A changes, the resonant frequency of the main radiator 410A changes. As the length of the first parasitic radiator 420A changes, the resonant frequency of the first parasitic radiator 420A changes. As the length of the second parasitic radiator 430A changes, the resonant frequency of the second parasitic radiator 430A changes. Therefore, proper lengths of the main radiator 410A, the first parasitic radiator 420A, and the second parasitic radiator 430A can be selected based on a requirement of an operating frequency band of the antenna.

Refer to FIG. 11. The foldable electronic device further includes a main switch control circuit 500A, and the main switch control circuit 500A includes a main switch component 510A and a plurality of different main matching branches 520A and 530A disposed in parallel connection. One end of the main switch component 510A forms one end 540A of the main switch control circuit, and the other end may separately switch to and be connected to an end of the plurality of different main matching branches 520A and 530A, and other ends of the plurality of different main matching branches 520A and 530A jointly form the other end 550A of the main switch control circuit.

In this implementation, one end 540A of the main switch control circuit is connected to the ground plate of the first device body, and the other end 550A of the main switch control circuit is connected between the radio frequency source 260A and the feed point 413A of the main radiator 410A. A person skilled in the art may understand that, in another alternative implementation, one end 540A of the main switch control circuit is connected between the radio frequency source 260A and the feed point 413A of the main radiator 410A, and the other end 550A of the main switch control circuit is connected to the ground plate of the first device body.

The main switch component 510A switches to one of the plurality of different main matching branches 520A and 530A, to adjust the resonant frequency of the main radiator 410A. In this way, the antenna can cover different frequency bands.

The plurality of different main matching branches 520A and 530A include two main matching branches 520A and 530A. Each of the two main matching branches 520A and 530A includes an inductor, and inductance values of the inductors of the two main matching branches 520A and 530A are different. In other words, the main matching branch 520A includes an inductor L01, and the main matching branch 530A includes an inductor L02. The inductor L01 and the inductor L02 have different inductance values. A person skilled in the art may understand that inductance values of the inductor L01 and the inductor L02 may be set properly based on an actual requirement.

A person skilled in the art may understand that, in another alternative implementation, the plurality of different main matching branches may include more than two main matching branches, which is not limited to two first matching branches, and each main matching branch may include a 0-ohm resistor, an inductor, or a capacitor.

Specifically, the main switch component 510A is a single-pole multi-throw switch. In this implementation, the main switch component 510A is a single-pole double-throw switch. A person skilled in the art may understand that, in another alternative implementation, the main switch component 510A may be a double-pole double-throw switch.

Refer to FIG. 11. The first parasitic radiator 420A has a first connection point 423A, and the first connection point 423A is located at a position close to the first end 421A of the first parasitic radiator 420A. The foldable electronic device further includes a first switch control circuit 600A, and the first switch control circuit 600A includes a first switch component and a plurality of different first matching branches 620A and 630A disposed in parallel connection. One end of the first switch component forms one end 640A of the first switch control circuit, the other end may separately switch to and be connected to an end of the plurality of different first matching branches 620A and 630A, and other ends of the plurality of different first matching branches 620A and 630A jointly form the other end 650A of the first switch control circuit.

In this implementation, one end 640A of the first switch control circuit is connected to the ground plate of the first device body, and the other end 650A of the first switch control circuit is connected to the first connection point 423A of the first parasitic radiator 420A. A person skilled in the art may understand that, in another alternative implementation, one end 640A of the first switch control circuit may be connected to the first connection point 423A of the first parasitic radiator 420A, and the other end 650A of the first switch control circuit is connected to the ground plate of the first device body.

The first switch component switches to one of the plurality of different first matching branches 620A and 630A, to adjust the resonant frequency of the first parasitic radiator 420A. In this way, the antenna can cover different frequency bands.

Specifically, the plurality of different first matching branches 620A and 630A include two first matching branches 620A and 630A. Each of the two first matching branches 620A and 630A includes an inductor, and inductance values of the inductors of the two first matching branches 620A and 630A are different. In other words, the first matching branch 620A includes an inductor L11, and the first matching branch 630A includes an inductor L12. The inductor L11 and the inductor L12 have different inductance values. A person skilled in the art may understand that inductance values of the inductor L11 and the inductor L12 may be set properly based on an actual requirement.

A person skilled in the art may understand that, in another alternative implementation, the plurality of different first matching branches may include more than two first matching branches, which is not limited to two first matching branches, and each first matching branch may include a 0-ohm resistor, an inductor, or a capacitor.

Specifically, the first switch component is a single-pole multi-throw switch. In this implementation, the first switch component is a single-pole double-throw switch. A person skilled in the art may understand that, in another alternative implementation, the first switch component may be a double-pole double-throw switch.

Further, a distance between the first connection point 423A and the first end 421A of the first parasitic radiator 420A is 1.5 mm to 3 mm. In this way, a coupling requirement between the main radiator 410A and the first parasitic radiator 420A can be better satisfied.

Refer to FIG. 11. The second parasitic radiator 430A has a second connection point 433A, and the second connection point 433A is located at a position close to the second end 432A of the second parasitic radiator 430A. The foldable electronic device further includes a second switch control circuit 700A, and the second switch control circuit 700A includes a second switch component 710A and a plurality of different second matching branches 720A and 730A disposed in parallel connection. One end of the second switch component 710A forms one end 740A of the second switch control circuit, the other end may separately switch to and be connected to an end of the plurality of different second matching branches 720A and 730A, and other ends of the plurality of different second matching branches 720A and 730A jointly form the other end 750A of the second switch control circuit.

In this implementation, one end 740A of the second switch control circuit is connected to the ground plate of the second device body, and the other end is connected to the second connection point 433A of the second parasitic radiator 430A. A person skilled in the art may understand that, in another alternative implementation, one end 740A of the second switch control circuit may be connected to the second connection point 433A of the second parasitic radiator 430A, and the other end is connected to the ground plate of the second device body.

The second switch component 710A switches to one of the plurality of different second matching branches 720A and 730A, to adjust the resonant frequency of the second parasitic radiator 430A. When the second switch component 710A switches to the second matching branch 730A, the second parasitic radiator 430A has a parasitic radiation effect on the main radiator 410A. In this way, a body SAR value can be reduced, and antenna efficiency can be improved, improving transmit power of the antenna, thereby improving antenna performance in a free space scenario or a handheld scenario when the foldable electronic device is in the folded state.

When the second switch component 710A switches to the second matching branch 720A, the second parasitic radiator 430A has a very, weak parasitic radiation effect on the main radiator 410A, or even has no parasitic radiation effect on the main radiator 410A. In this case, the second parasitic radiator 430A can block and isolate radiation of the main radiator 410A and the first parasitic radiator 420A of the antenna 400A toward the second parasitic radiator 430A. Therefore, when the antenna 400A is located on the top portion of the foldable electronic device, in a head-hand holding scenario, a head SAR value of the antenna is reduced, and a radiation performance attenuation degree of the foldable electronic device is reduced, that is, a head-hand holding reduction amplitude is reduced, thereby improving radiation performance of the foldable electronic device in the head-hand holding scenario.

Specifically, the plurality of different second matching branches include two second matching branches. The two second matching branches respectively include a 0-ohm resistor (that is, the resistance is 0 ohms) and an inductor. In other words, the second matching branch 720A includes a 0-ohm resistor, and the second matching branch 730A includes an inductor L2. A person skilled in the art may understand that an inductance value of the inductor L2 may be set properly based on an actual requirement.

When the second switch component 710A switches to the second matching branch including the 0-ohm resistor, the second parasitic radiator 430A has no parasitic radiation effect on the main radiator 410A. When the second switch component 710A switches to the second matching branch including the inductor L2, the second parasitic radiator 430A has a parasitic radiation effect on the main radiator 410A.

A person skilled in the art may understand that, in another alternative implementation, the plurality of different second matching branches may include more than two second matching branches, which is not limited to two first matching branches, and each second matching branch may include a 0-ohm resistor, an inductor, or a capacitor. In other words, the second matching branch 720A of the two second matching branches may include a capacitor, and the other second matching circuit includes an inductor. This does not limit the protection scope of this application herein.

As shown in FIG. 11, the second switch component 710A is a single-pole multi-throw switch. In this implementation, the second switch component 710A is a single-pole double-throw switch. A person skilled in the art may understand that, in another alternative implementation, the second switch component 710A may be a double-pole double-throw switch.

Further, a distance between the second connection point 433A and the second end 432A of the second parasitic radiator 430A is 1.5 mm to 3 mm. In this way, a coupling requirement between the first parasitic radiator 420A and the second parasitic radiator 430A can be better satisfied.

In this implementation, a triggering manner of the second switch component 710A may also be the triggering manner of the first switch component in Embodiment 1. For example, in a default state, the second switch component 710A switches to the second matching branch 730A including the inductor L2. A trigger signal for switching and gating, by the second switch component 710A, from the second matching branch 730A including the inductor L2 to the second matching branch 720A including the 0-ohm resistor may be triggered by transferring, to the processing apparatus, a signal indicating that the earpiece is on (or the earpiece emits sound), or may be triggered by transferring, to the processing apparatus, a signal detected by a disposed optical proximity sensor, ambient light sensor, or distance sensor. Details are not described herein again.

In this implementation, the main radiator 410A, the first parasitic radiator 420A, the second parasitic radiator 430A, and the isolating portion 440A may be formed by using a metal frame of the foldable electronic device, a metal sheet (for example, a steel sheet), or a flexible printed circuit (Flexible Printed Circuit, FPC for short), or may be formed in a form of LDS (Laser Direct Structuring, laser direct structuring).

In this implementation, the isolating portion 440A is disposed in a joint with the second parasitic radiator 430A, without a gap in the middle. When the second parasitic radiator 430A has a parasitic radiation effect on the main radiator 410A, some metals of the isolating portion 440A also participate in radiation, but with a radiation quantity that can be omitted, and most metals have a blocking and isolating effect. Because there is no gap between the isolating portion 440A and the second parasitic radiator 430A, while a blocking and isolating effect is ensured, structural stability is improved, and the entire device body is more beautiful.

With reference to FIG. 12 to FIG. 16, the following specifically describes antenna performance of the foldable electronic device.

To verify performance of the antenna in embodiments of this application, simulation analysis is performed by using full-wave electromagnetic simulation software HFSS, and simulation effect diagrams in FIG. 12 to FIG. 16 are obtained.

Simulation conditions for obtaining the simulation effect diagrams shown in FIG. 12 to FIG. 16 are shown in the following Table 4 (which are understood with reference to FIG. 11):

TABLE 4

| Parameter | Antenna in Embodiment 1 of this application |
|---|---|
| Length L of main radiator (mm) | 18 |
| Length L1 of first parasitic radiator (mm) | 10 |
| Length L2 of second parasitic radiator (mm) | 8 |
| Length L3 of isolating portion (mm) | 20 |
| Distance d1 between first parasitic radiator and isolating portion (mm) | 3 |
| Width d2 of gap (mm) | 2 |
| Distance d3 between feed point and second end of main radiator (mm) | 2 |
| Distance d4 between first connection point and first end of first parasitic radiator (mm) | 2 |
| Distance d5 between second connection point and second end of second parasitic radiator (mm) | 2 |
| Inductance value of inductor L01 of one main matching branch (nH) | 15 |
| Inductance value of inductor L02 of another main matching branch (nH) | 4 |
| Inductance value of inductor L11 of one first matching branch (nH) | 8 |
| Inductance value of inductor L12 of another first matching branch (nH) | 2 |
| Inductance value of inductor L2 of another second matching branch (nH) | 15 |

With reference to FIG. 11, the following performs a simulation test through switch among the main switch component 510A, the first switch component, and the second switch component 710A by using an example in which the antenna is in two states, and simulation effect diagrams shown in FIG. 12 to FIG. 16 are obtained.

State 1: The main switch component 510A switches to the main matching branch 530A including the inductor L02 whose inductance value is 4 nH, the first switch component switches to the first matching branch 630A including the inductor L12 whose inductance value is 2 nH, and the second switch component 710A switches to the second matching branch 730A including the inductor L2 whose inductance value is 15 nH. In the state 1, both the first parasitic radiator 420A and the second parasitic radiator 430A have a parasitic radiation effect on the main radiator 410A.

State 2: The main switch component 510A switches to the main matching branch 520A including the inductor L01 whose inductance value is 15 nH, the first switch component switches to the first matching branch 620A including the inductor L11 whose inductance value is 8 nH, and the second switch component 710A switches to the second matching branch 720A of 0 ohms. In the state 2, the first parasitic radiator 420A has a parasitic radiation effect on the main radiator 410A, but the second parasitic radiator 430A has no parasitic radiation effect on the main radiator 410A.

Figure 12:
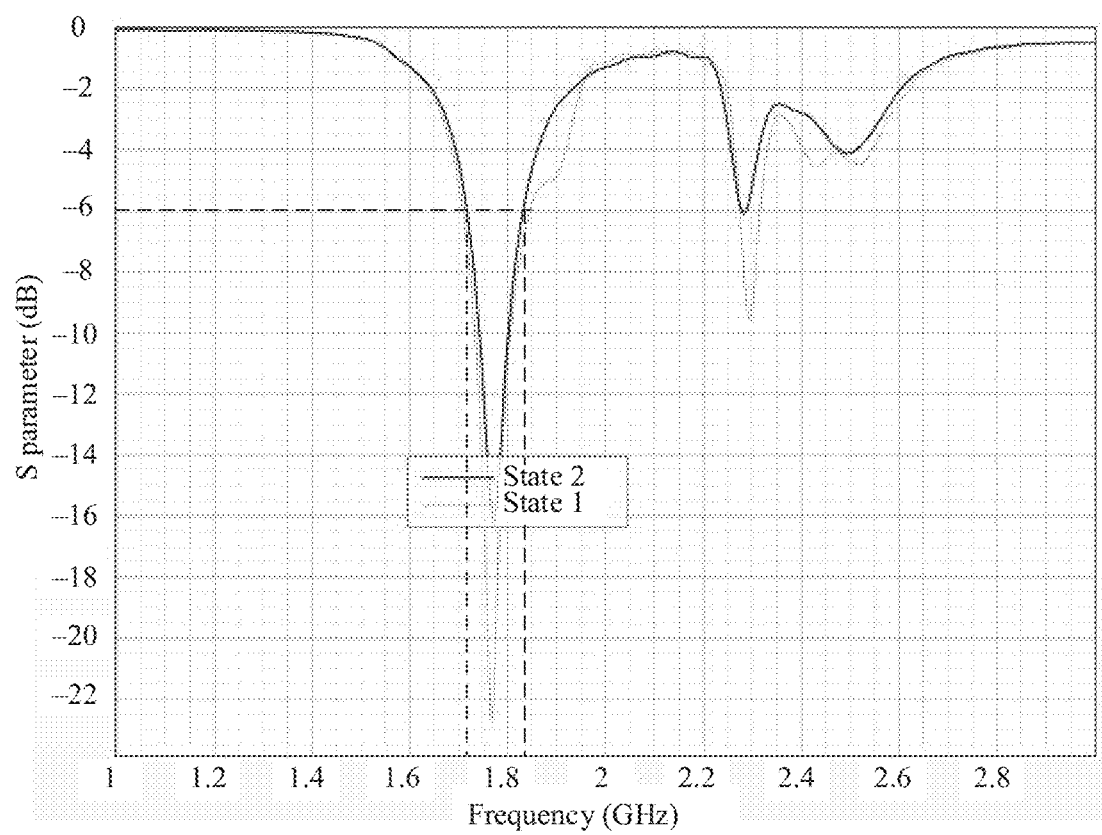
FIG. 12 is an effect curve graph of comparison of S parameters between antennas in a state 1 and a state 2 obtained when a simulation effect test is performed on a foldable electronic device according to Embodiment 2 of this application.

Refer to FIG. 12 and FIG. 13. FIG. 12 is an effect curve graph of comparison of S parameters between antennas in a state 1 and a state 2 obtained when a simulation effect test is performed on a foldable electronic device. FIG. 13 is an effect curve graph of comparison between radiation efficiency and system efficiency (namely, efficiency) of an antenna in a state 1 and a state 2 obtained when a simulation effect test is performed on a foldable electronic device. In the state 1, the second parasitic radiator has a parasitic radiation effect on the main radiator. In the state 2, the second parasitic radiator has no parasitic radiation effect on the main radiator.

In FIG. 12, a horizontal coordinate represents a frequency in a unit of GHz, and a vertical coordinate represents an amplitude value of $S_{11}$ in a unit of dB. $S_{11}$ is one of the S parameters. $S_{11}$ indicates the reflection coefficient. This parameter indicates whether the transmit efficiency of the antenna is good. A lower value of this parameter indicates lower energy reflected by the antenna, so that the antenna efficiency is better. In FIG. 12, the two curves "state 1" and "state 2" respectively represent curves of $S_{11}$ that varies with frequencies in the state 1 and the state 2. In the state 1 and the state 2, in a frequency band of 1.72 GHz to 1.84 GHz, $S_{11}$ is less than −6 dB. That is, the antenna has good impedance matching in the state 1 and the state 2.

Refer to FIG. 13. FIG. 13 is an effect curve graph of radiation efficiency and system efficiency of an antenna in a state 1 and a state 2 obtained when a simulation test is performed in a free space scenario.

It can be learned from FIG. 13 that, based on the simulation test performed in the free space scenario in the state 1, when the operating frequency of the antenna is 1.72 GHz, the system efficiency (namely, efficiency) of the antenna is −3.3565 dB. When the operating frequency of the antenna is 1.78 GHz, the system efficiency (namely, efficiency) of the antenna is −2.3834 dB.

Based on the simulation test performed in the free space scenario in the state 2, when the operating frequency of the antenna is 1.72 GHz, the system efficiency (namely, efficiency) of the antenna is −3.9685 dB. When the operating frequency of the antenna is 1.78 GHz, the system efficiency (namely, efficiency) of the antenna is −2.7585 dB.

It can be learned from the foregoing description that, compared with the state 2, in the state 1, that is, the second parasitic radiator is added to have a parasitic radiation effect on the main radiator, when the operating frequency of the antenna is 1.72 GHz, the system efficiency (namely, efficiency) of the antenna is increased by 0.612 dB, and when the operating frequency of the antenna is 1.78 GHz, the system efficiency (namely, efficiency) of the antenna is increased by 0.3751 dB. In other words, after the second parasitic radiator has a parasitic radiation effect on the main radiator, the system efficiency of the antenna can be improved.

Refer to FIG. 14a to FIG. 15b. FIG. 14a and FIG. 14b are distribution diagrams of local magnetic fields of an antenna in a state 1 and a state 2 obtained when a simulation effect test is performed on a foldable electronic device. FIG. 15a and FIG. 15b are distribution diagrams of antenna hotspots in a state 1 and a state 2 obtained when a simulation effect test is performed on a foldable electronic device. An operating frequency range of the antenna is 1.7 GHz to 1.9 GHz. In addition, the operating frequency of the antenna is 1.8 GHz. In FIG. 14a to FIG. 15b, an X direction is parallel to a horizontal direction of the foldable electronic device, and a Z direction is parallel to a thickness direction of the foldable electronic device. In the state 1, the second parasitic radiator has a parasitic radiation effect on the main radiator. In the state 2, the second parasitic radiator has no parasitic radiation effect on the main radiator.

As shown in FIG. 14a and FIG. 14b, compared with the state 2, the magnetic field radiation region (refer to the region shown in a dashed box in the figure) of the antenna in the state 1 is more dispersed. In other words, adding the second parasitic radiator can disperse the magnetic field radiation region of the antenna, which is equivalent to increasing a width of the main radiator of the antenna and increasing a radiation area of the antenna, thereby improving antenna efficiency and reducing a body SAR value.

As shown in FIG. 15a and FIG. 15b, compared with the state 2, the antenna hotspots are distributed more dispersedly in the state 1. In other words, after the second parasitic radiator has a parasitic radiation effect on the main radiator, the antenna hotspots can be more dispersed, so that the body SAR value can be reduced.

The following Table 5 shows antenna performance-related parameters in a free space scenario, and antenna performance-related parameters in a head-left hand holding scenario and a head-right hand holding scenario that are obtained in a state 1 and a state 2. In the figure, the "without parasitic radiation" indicates that in the state 2, the second parasitic radiator has no parasitic radiation effect on the main radiator. The "with parasitic radiation" indicates that in the state 1, the second parasitic radiator has a parasitic radiation effect on the main radiator. 1 g indicates that a tissue fluid is tested in a unit volume of 1 g (equivalent to 1 cm³). 10 g indicates that a tissue fluid is tested in a unit volume of 10 g (equivalent to 10 cm³).

The "head SAR" indicates a head SAR value. The "normalized head SAR" indicates a head SAR value measured when the antenna efficiency is normalized and reduced to −5 dB. The "normalized 5 mm body SAR" indicates a body SAR value measured when the antenna efficiency is normalized and reduced to −5 dB. The "right head touch" indicates a scenario in which a right side of the head is in contact with the foldable electronic device. The "left head touch" indicates a scenario in which a left side of the head is in contact with the foldable electronic device. The "5 mm backside" indicates a scenario in which a back of the foldable electronic device is 5 mm away from the body. The "0 mm backside" indicates a scenario in which a back of the foldable electronic device is in contact with the body. The "5 mm topside" indicates a scenario in which a top portion of the foldable electronic device is 5 mm away from the body. The "0 mm topside" indicates a scenario in which a top portion of the foldable electronic device is in contact with the body.

It can be learned from the following Table 5 that, in the state 2, in the free space scenario, based on the top portion of the foldable electronic device being 5 mm away from the body, when the operating frequency of the antenna is 1.72 GHz, the body SAR value is 1.64 W/kg; and when the operating frequency of the antenna is 1.78 GHz, the body SAR value is 1.44 W/kg. In the state 1, in the free space scenario, based on the top portion of the foldable electronic device being 5 mm away from the body, when the operating frequency of the antenna is 1.72 GHz, the body SAR value is 1.32 W/kg; and when the operating frequency of the antenna is 1.78 GHz, the body SAR value is 1.2 W/kg.

It can be learned that, compared with the state 2, in the state 1, that is, the second parasitic radiator is added to have a parasitic radiation effect on the main radiator, when the operating frequency of the antenna is 1.72 GHz, the body SAR value can be reduced from 1.64 W/kg to 1.32 W/kg, and when the operating frequency of the antenna is 1.78 GHz, the body SAR value can be reduced from 1.44 W/kg to 1.2 W/kg. In other words, when the antenna is in the state 1, the body SAR value is lower.

In addition, in the state 2, in the head-right hand holding scenario, when the operating frequency of the antenna is 1.72 GHz or 1.78 GHz, the head SAR value is 0.46 W/kg. In the state 1, in the head-right hand holding scenario, when the operating frequency of the antenna is 1.72 GHz, the head SAR value is 0.55 W/kg; and when the operating frequency of the antenna is 1.78 GHz, the head SAR value is 0.62 W/kg.

It can be learned that, compared with the state 2, in the state 1, that is, the second parasitic radiator is added to have a parasitic radiation effect on the main radiator, when the operating frequency of the antenna is 1.72 GHz, the head SAR value can be increased from 0.46 W/kg to 0.55 W/kg, and when the operating frequency of the antenna is 1.78 GHz, the body SAR value can be increased from 0.46 W/kg to 0.62 W/kg, that is, the head SAR value deteriorates. In other words, when the antenna is in the state 2, the head SAR value is lower.

TABLE 5

| Input power 24 dBm | Resonant frequency | Without parasitic radiation | | | | | | With parasitic radiation | | | | | |
|---|---|---|---|---|---|---|---|---|---|---|---|---|---|
| | | 1.72 GHz | | 1.78 GHz | | | | 1.72 GHz | | 1.78 GHz | | | |
| | | 1 g | 10 g | 1 g | 10 g | 1 g | 10 g | 1 g | 10 g | 1 g | 10 g | 1 g | 10 g |
| | FS simulation efficiency | −3.9685 | | −2.7585 | | | | −3.3565 | | −2.3834 | | | |
| head SAR | right head touch | 0.59 | | 0.77 | | | | 0.81 | | 1.14 | | | |
| | left head touch | | | | | | | | | | | | |
| body SAR | 5 mm backside | | | | | | | | | | | | |
| | 0 mm backside | | | | | | | | | | | | |
| | 5 mm topside | 2.07 | | 2.41 | | | | 1.93 | | 2.19 | | | |
| | 0 mm topside | | | | | | | | | | | | |
| Normalization efficiency | | −5 | −5 | −5 | −5 | −5 | −5 | −5 | −5 | −5 | −5 | −5 | −5 |
| Normalized head SAR | right head touch | 0.00 | 0.46 | 0.00 | 0.46 | 0.00 | 0.00 | 0.00 | 0.55 | 0.00 | 0.62 | 0.00 | 0.00 |
| | left head touch | 0.00 | 0.00 | 0.00 | 0.00 | 0.00 | 0.00 | 0.00 | 0.00 | 0.00 | 0.00 | 0.00 | 0.00 |
| Normalized 5 mm body SAR | 5 mm backside | 0.00 | 0.00 | 0.00 | 0.00 | 0.00 | 0.00 | 0.00 | 0.00 | 0.00 | 0.00 | 0.00 | 0.00 |
| | 0 mm backside | 0.00 | 0.00 | 0.00 | 0.00 | 0.00 | 0.00 | 0.00 | 0.00 | 0.00 | 0.00 | 0.00 | 0.00 |

TABLE 5-continued

| Input power | Resonant frequency | Without parasitic radiation | | | | | | With parasitic radiation | | | | | |
|---|---|---|---|---|---|---|---|---|---|---|---|---|---|
| | | 1.72 GHz | | 1.78 GHz | | | | 1.72 GHz | | 1.78 GHz | | | |
| 24 dBm | | 1 g | 10 g | 1 g | 10 g | 1 g | 10 g | 1 g | 10 g | 1 g | 10 g | 1 g | 10 g |
| | 5 mm topside | 0.00 | 1.64 | 0.00 | 1.44 | 0.00 | 0.00 | 0.00 | 1.32 | 0.00 | 1.20 | 0.00 | 0.00 |
| | 0 mm topside | 0.00 | 0.00 | 0.00 | 0.00 | 0.00 | 0.00 | 0.00 | 0.00 | 0.00 | 0.00 | 0.00 | 0.00 |

Refer to FIG. 16. FIG. 16 is an effect curve graph of comparison between radiation efficiency and system efficiency (namely, efficiency) of an antenna in a free space scenario, a head-left hand holding scenario, and a head-right hand holding scenario obtained when a simulation effect test is performed on a foldable electronic device in a state 2. In the state 2, the second parasitic radiator has no parasitic radiation effect on the main radiator.

In FIG. 16, curves "FS 1" and "FS 2" respectively represent curves of system efficiency and radiation efficiency that vary with frequencies when a simulation test is performed on the antenna in the state 2 in a free space scenario. Curves "BHHL 1" and "BHHL 2" respectively represent curves of system efficiency and radiation efficiency that vary with frequencies when a simulation test is performed on the antenna in the state 2 in a head-left hand holding scenario. Curves "BHHR 1" and "BHHR 2" respectively represent curves of system efficiency and radiation efficiency that vary with frequencies when a simulation test is performed on the antenna in the state 2 in a head-right hand holding scenario.

FS represents free space, full name in English "Free Space". That is, an FS scenario represents a free space scenario. The head-left hand holding scenario is a BHHL (full name in English "Beside Head Hand Left") scenario. The head-right hand holding scenario is a BHHR (full name in English "Beside Head Hand Right") scenario.

It can be learned from FIG. 16 that, in the state 2, when a simulation test is performed in a free space scenario, a maximum value of the system efficiency (namely, efficiency) of the antenna is −2.8 dB. In this case, the operating frequency of the antenna is 1.78 GHz. In the state 2, when a simulation test is performed in a head-left hand holding scenario, a maximum value of the system efficiency (namely, efficiency) of the antenna is −7.5 dB. In this case, the operating frequency of the antenna is 1.78 GHz. In the state 2, when a simulation test is performed in a head-right hand holding scenario, a maximum value of the system efficiency (namely, efficiency) of the antenna is −6.7 dB. In this case, the operating frequency of the antenna is 1.78 GHz. In other words, in the state 2, compared with the free space scenario, in the simulation test in the head-left hand holding scenario, the maximum value of the system efficiency (namely, efficiency) of the antenna is reduced by 4.7 dB, that is, a head-hand holding reduction amplitude is 4.7 dB; and compared with the free space scenario, in the simulation test in the head-right hand holding scenario, the maximum value of the system efficiency (namely, efficiency) of the antenna is reduced by 3.9 dB, that is, a head-hand holding reduction amplitude is 3.9 dB.

It can be learned that, when the antenna is in the state 2, the head-hand holding reduction amplitude is lower, that is, the radiation performance attenuation degree of the foldable electronic device is reduced. It can be learned from Table 5 that, in this case, the head SAR value is 0.46 W/kg. Therefore, when the antenna is in the state 2, that is, when the second parasitic radiator has no parasitic radiation effect on the main radiator, while it can be ensured that a head SAR value requirement of the antenna located on the top portion of the foldable electronic device is satisfied, the head-hand holding reduction amplitude is reduced, and the radiation performance of the foldable electronic device is improved.

It is clearly that a person skilled in the art can make various modifications and variations to this application without departing from the spirit and scope of this application. This application is intended to cover these modifications and variations of this application provided that they fall within the scope of the claims and their equivalent technologies.

What is claimed is:

1. A foldable electronic device, comprising:
a rotating shaft;
a first device body;
a second device body comprising a first ground and coupled to the first device body through the rotating shaft;
an earpiece disposed on the second device body;
a radio frequency source;
an antenna comprising:
 a first parasitic radiator disposed on the second device body; and
 a main radiator configured to:
  dispose on the first device body and couple to the radio frequency source when the foldable electronic device is in an unfolded state; and
  dispose relative to the first parasitic radiator at a first interval and couple to the first parasitic radiator through the first interval when the foldable electronic device is in a folded state; and
a first switch control circuit comprising:
 a plurality of different first matching branches disposed in parallel connection, wherein each different first matching branch comprises a first matching sub-branch and a second matching sub-branch; and
 a first switch component comprising a first end coupled to the first parasitic radiator and a second end coupled to the first ground, and configured to:
  switch between the plurality of different first matching branches;
  switch to the first matching sub-branch when the foldable electronic device is in the folded state and the earpiece is in an on state; and
  switch to the second matching sub-branch when the foldable electronic device is in the folded state and the earpiece is in an off state,
wherein the main radiator is configured to have a first resonant frequency in a first frequency band and the first parasitic radiator is configured to have a second resonant frequency in a second frequency band when the first switch component switches to the first matching sub-branch.

2. The foldable electronic device of claim 1, wherein each of the first matching sub-branch and the second matching sub-branch comprises a 0-ohm resistor, an inductor, or a capacitor.

3. The foldable electronic device of claim 2, wherein each of the first matching sub-branch comprises the 0-ohm resistor, and wherein each of the second matching sub-branch comprises the inductor.

4. The foldable electronic device of claim 1, wherein the first resonant frequency and the second resonant frequency are in the first frequency band when the first switch component switches to the second matching sub-branch.

5. The foldable electronic device of claim 1, wherein the first device body comprises a second ground, wherein the main radiator comprises:
a third end;
a fourth end coupled to the second ground; and
a feed point located at a first position close to the third end and coupled to the radio frequency source,
wherein the first parasitic radiator comprises:
a fifth end;
a sixth end coupled to the first ground of the second device body; and
a first connection point located at a second position close to the fifth end and coupled to the first switch control circuit, and
wherein the third end and the fifth end are configured to correspondingly dispose and the fourth end and the sixth end are configured to correspondingly dispose when the foldable electronic device is in the folded state.

6. The foldable electronic device of claim 5, further comprising a main switch control circuit that comprises:
a plurality of different main matching branches disposed in parallel connection; and
a main switch component configured to switch between the plurality of different main matching branches, wherein the feed point is electrically coupled to the second ground through the main switch control circuit.

7. The foldable electronic device of claim 6, wherein the plurality of different main matching branches comprises at least two main matching branches, wherein each of the at least two main matching branches comprises an inductor, and wherein inductance values of inductors on the at least two main matching branches are different.

8. The foldable electronic device of claim 1, wherein both the main radiator and the first parasitic radiator are in a straight strip shape, and wherein the main radiator and the first parasitic radiator are disposed in parallel when the foldable electronic device is in the folded state, or a third end of the main radiator is aligned with a fifth end of the first parasitic radiator, and a fourth end of the main radiator is aligned with a sixth end of the first parasitic radiator when the foldable electronic device is in the folded state.

9. The foldable electronic device of claim 1, wherein the antenna further comprises a second parasitic radiator disposed on the first device body and comprising a third end and a fourth end, wherein the main radiator comprises a fifth end and a sixth end, wherein the second parasitic radiator and the main radiator are disposed at an interval in a longitudinal end-to-end manner, wherein the third end and the fifth end have a first gap, wherein the second parasitic radiator is coupled to the main radiator through the first gap, and wherein the fourth end and the sixth end are connected to a second ground of the first device body.

10. The foldable electronic device of claim 9, wherein the second parasitic radiator further comprises a second connection point located at a position close to the third end, and wherein the foldable electronic device further comprises a second switch control circuit that comprises:
a plurality of different second matching branches disposed in parallel connection; and
a second switch component configured to switch between the plurality of different second matching branches, wherein the second connection point is electrically coupled to the second ground through the second switch control circuit.

11. The foldable electronic device of claim 10, wherein the plurality of different second matching branches comprise at least two second matching branches, wherein each of the at least two second matching branches comprises an inductor, and wherein inductance values of inductors on the at least two second matching branches are different.

12. The foldable electronic device of claim 9, wherein the second parasitic radiator is in a straight strip shape, and wherein the main radiator and the second parasitic radiator are arranged in a straight line.

13. The foldable electronic device of claim 9, wherein the antenna further comprises a third parasitic radiator comprising a third connection point, a seventh end, and an eighth end and configured to:
dispose on the second device body when the foldable electronic device is in an unfolded state, wherein the third parasitic radiator and the first parasitic radiator are configured to dispose at an interval in a longitudinal end-to-end manner, wherein the seventh end and a ninth end of the first parasitic radiator have a second gap, wherein the eighth end and a tenth end of the first parasitic radiator are connected to the first ground, and wherein the third connection point is located at a position close to the seventh end; and
dispose relative to the second parasitic radiator at a second interval and is coupled to the second parasitic radiator through the second interval when the foldable electronic device is in the folded state, wherein the third parasitic radiator is coupled to the first parasitic radiator through the second gap and the main radiator, wherein the foldable electronic device further comprises a third switch control circuit, wherein the third connection point is electrically coupled to the first ground through the third switch control circuit, and wherein the third switch control circuit comprises:
a plurality of different third matching branches disposed in parallel connection; and
a third switch component configured to:
switch between the plurality of different third matching branches, wherein the plurality of different third matching branches comprise a third matching sub-branch and a fourth matching sub-branch;
switch to the third matching sub-branch when the foldable electronic device is in the folded state and the earpiece is in the on state; and
switch to the fourth matching sub-branch when the foldable electronic device is in the folded state and the earpiece is in the off state,
wherein the third parasitic radiator is configured to have a third resonant frequency in the second frequency band when the third switch component switches to the third matching sub-branch.

14. The foldable electronic device of claim 13, wherein the third matching sub-branch comprises a 0-ohm resistor, and wherein the fourth matching sub-branch comprises an inductor.

15. The foldable electronic device of claim 13, wherein the third parasitic radiator is in a straight strip shape, wherein the third parasitic radiator and the first parasitic radiator are arranged in a straight line, and wherein when the foldable electronic device is in the folded state, the third parasitic radiator and the second parasitic radiator are configured to dispose in parallel, the seventh end is aligned with the third end, and the eighth end of the third parasitic radiator is aligned with the fourth end.

16. The foldable electronic device of claim 1, wherein the antenna is configured to be located at a top portion or a bottom portion when the foldable electronic device is in the folded state.

17. The foldable electronic device of claim 1, wherein the antenna comprises a metal frame on a top portion of the foldable electronic device, and wherein the earpiece is located on the top portion.

18. The foldable electronic device of claim 1, wherein the foldable electronic device further comprises a processor, and wherein when the foldable electronic device is in the folded state, the processor is configured to:

control, in response to a first trigger signal, the first switch component to switch to the first matching sub-branch when the earpiece is on and generates the first trigger signal; and control, in response to a second trigger signal, the first switch component to switch to the second matching sub-branch when the earpiece is off and generates the second trigger signal.

19. The foldable electronic device of claim 1, wherein the foldable electronic device further comprises a trigger apparatus and a processor, and wherein when the foldable electronic device is in the folded state, the processor is configured to:

control, in response to a first trigger signal, the first switch component to switch to the first matching sub-branch when the trigger apparatus generates the first trigger signal; and control, in response to a second trigger signal, the first switch component to switch to the second matching sub-branch when the trigger apparatus generates the second trigger signal.

20. The foldable electronic device of claim 19, wherein the trigger apparatus is an optical proximity sensor, an ambient light sensor, or a distance sensor, and wherein the trigger apparatus is configured to:

generate the first trigger signal when the trigger apparatus is blocked by a user body, and generate the second trigger signal when the trigger apparatus is far away from the user body.

* * * * *